US011556222B2

(12) United States Patent
Noda

(10) Patent No.: US 11,556,222 B2
(45) Date of Patent: Jan. 17, 2023

(54) INFORMATION MANAGING DEVICE, AND FILE MANAGING METHOD FOR VIEWING INFORMATION STORED IN A SPECIFIED FOLDER-TREE ON A HIERARCHY FORM

(71) Applicant: Masatsugu Noda, Tokyo (JP)

(72) Inventor: Masatsugu Noda, Tokyo (JP)

( * ) Notice: Subject to any disclaimer, the term of this patent is extended or adjusted under 35 U.S.C. 154(b) by 130 days.

(21) Appl. No.: 15/550,379

(22) PCT Filed: Feb. 18, 2016

(86) PCT No.: PCT/JP2016/054682
§ 371 (c)(1),
(2) Date: Jul. 31, 2018

(87) PCT Pub. No.: WO2016/133153
PCT Pub. Date: Aug. 25, 2016

(65) Prior Publication Data
US 2019/0384459 A1   Dec. 19, 2019

(30) Foreign Application Priority Data

Feb. 19, 2015   (JP) .............................. JP2015-030401

(51) Int. Cl.
*G06F 3/04817* (2022.01)
*G06F 3/0482* (2013.01)

(52) U.S. Cl.
CPC ........ *G06F 3/0482* (2013.01); *G06F 3/04817* (2013.01)

(58) Field of Classification Search
CPC ...... G06F 3/048; G06F 3/0643; G06F 3/1431; G06F 16/168; G06F 12/00; G06F 40/174; G06F 16/00; G06F 8/38; G06F 9/451

(Continued)

(56) References Cited

U.S. PATENT DOCUMENTS

| 5,644,736 A * | 7/1997 | Healy ................. G06F 3/04842 715/784 |
| 2004/0039732 A1* | 2/2004 | Huang .................. G06F 16/958 |
| 2007/0174482 A1* | 7/2007 | Yajima .................... G06F 40/18 709/238 |

FOREIGN PATENT DOCUMENTS

| JP | 2007-122707 | 5/2007 |
| JP | 2012-58835 | 3/2012 |

(Continued)

OTHER PUBLICATIONS

JP 2013-228964 A (published on Nov. 7, 2013) English machine translation.*

*Primary Examiner* — Rinna Yi
(74) *Attorney, Agent, or Firm* — Wenderoth, Lind & Ponack, L.L.P.

(57) ABSTRACT

A method or apparatus for viewing information stored in a specified folder-tree on a hierarchy form composed by a plurality of forms, wherein tagname-chains are obtained by merging one or more child-folder-name-chains, thereafter the tagname-chains are located on constituent forms of the hierarchy form in such a way that a first tagname-chain provided as a condition tagname with a tagname belonging to another second tagname-chain is located only on open forms, and an icon of information stored in the folder-tree is displayed in a cell of an open form, the full-pathname of which is in a specified relation with a set of the tagnames located in specified positions to the cell of the open form and the cell specified for the opening on the parent form, resulting in a decrease of a number of tagname-chains which users have to search in finding desired information on the hierarchy form.

9 Claims, 38 Drawing Sheets

(58) Field of Classification Search
USPC .............. 715/769, 770, 772; 705/7.29, 27.2; 707/609, 673, 705, 741, 756, 758, 805, 707/825
See application file for complete search history.

(56) References Cited

FOREIGN PATENT DOCUMENTS

| | | |
|---|---|---|
| JP | 2012-150582 | 8/2012 |
| JP | 2012-168663 | 9/2012 |
| JP | 2013-137829 | 7/2013 |
| JP | 2013-211040 | 10/2013 |
| JP | 2013-228964 | 11/2013 |
| JP | 2016-51421 | 4/2016 |
| JP | 6043899 | 12/2016 |

* cited by examiner

Parent-folder
fullpathname part

Connecting pointer

Related data pointer

Cell data pointer    Connecting data

Cell A

Cell located in lower position of cell A

Fig.34
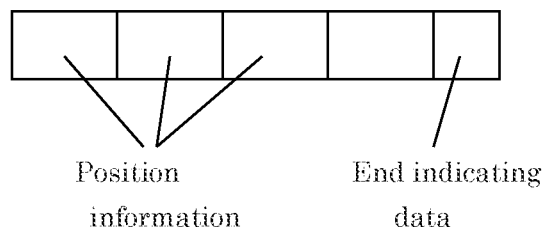
Position information    End indicating data
Fig.35
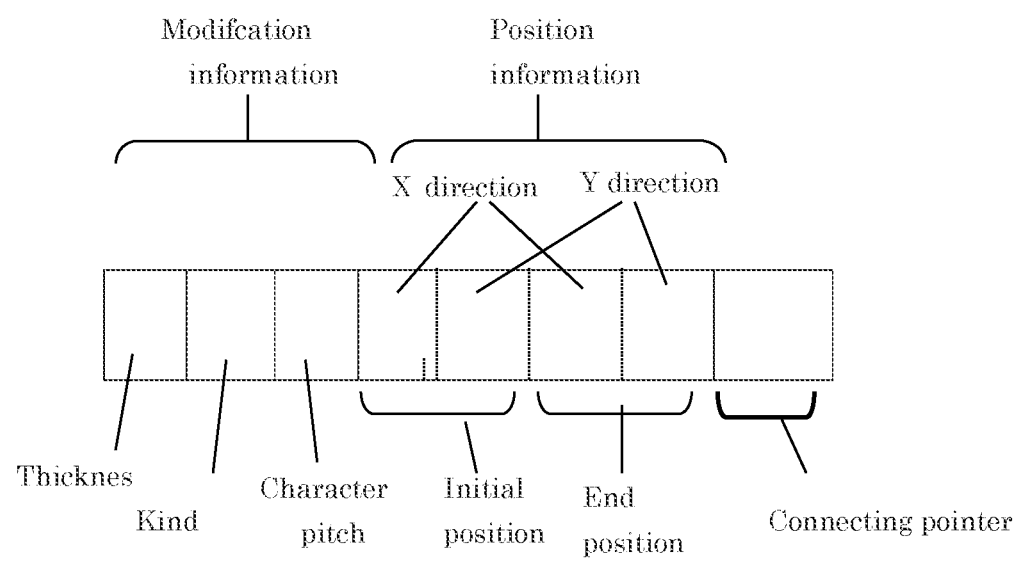
Modifcation information    Position information
                           X direction   Y direction
Thicknes  Kind  Character pitch  Initial position  End position  Connecting pointer
Fig.36
| | A | B | C |
|---|---|---|---|
| α | | | |
| β | | | |
| γ | | | |
1 5 3

classA fine class

| importance | A1 | A2 | A3 | A4 |
|---|---|---|---|---|
| large | | | | |
| medium | | □ | | |
| small | □ | | | |

A ⌇ 159
α ⌇

155

(b)

classA fine class

177

| | A1 | A2 | A3 | A4 |
|---|---|---|---|---|
| large | | | □ | |
| medium | | □ | | |
| small | □ | | | |

A ⌇ 159
α ⌇

155

INFORMATION MANAGING DEVICE, AND FILE MANAGING METHOD FOR VIEWING INFORMATION STORED IN A SPECIFIED FOLDER-TREE ON A HIERARCHY FORM

BACKGROUND OF THE INVENTION

Field of the Invention

The invention relates to an information managing apparatus for information management using a form on a desktop environment.

Description of the Related Art

As a method managing information on a desktop environment, several methods are proposed wherein an icon of information is located on a hierarchy form that is a hierarchical combination of forms wherein a specified operation to a cell of a constituent form of the hierarchy form makes another constituent form opened which is provided as a child form for the cell (JP2007-122707, JP2013-211040). The methods as methods managing information on the desktop environment aim at user benefits as described below which cannot be provided by the other methods using the folder which have now spread widely.

Thereby a series of cells designated on a form of each hierarchy rank in order to access information can be recognized with "visibility at a glance" based on classifying tagnames located on the same raw or column as the cell. Next thereby as tagnames of a classifying viewpoint are located as indexes on a raw or a column of a form, detailed classifying from many viewpoint can lie achieved with few hierarchy ranks provided. Especially user burden of moving up and down in a hierarchy can be largely decreased which has become a burdensome operation in heuristic search of information in a hierarchy tree. Furthermore thereby an tagnames characterizing information are controlled by item names that are viewpoints of classifying, retrieving noises and failures in retrieving information function by detecting accordance between tagnames given to information and input keywords can be largely decreased.

But in the proposed methods the numbers of forms constituting a hierarchy form increases exponentially in proportion to the number of the classifying viewpoint, so that effort of making a hierarchy form and memory dimension of memorizing a hierarchy form increases exponentially in proportion as well.

In order to respond to those problems, a method is proposed wherein with one form provided for each rank of a hierarchy form, open-designation for all cells on all forms of a hierarchy rank makes another prepared form is opened (JP2012-168663). But the method undermines the basic merit of the tree type classification that classification can be done freely for each classifying node, so that its use application is limited.

On the other hand a method is proposed wherein a form is automatically made where classifying tags (child node name) for each node of the designated folder-tree are located as index of a classifying viewpoint, and an icon of information stored in the folder tree is located at a cell relevant to corresponding index, so that users can access the information on contact with its icon located on the form (JP2018-228964).

But in the method (JP2013-228964) one form is prepared for each hierarchy rank in the case of a hierarchical composition, and consequently if the method is applied to a folder-tree wherein classification for each classifying node is done freely, forms must be prepared wherein many sets of index corresponding to various classification at each node of the folder-tree, so that in order to access intended information many forms having sets of index terms which is cannot help to be opened so that number of opening of forms in order to access information become large For example in the case illustrated in FIG. 7, when a user intends to access information with a tag "B", after designating a tag "B" he wants naturally to see soon a form having a set of index terms, {B1,B2,B3,B4} which is to be a selecting branch of the next classification. But herein he cannot help opening a form with having a set of index terms, {A1,A2,A3,A4} which is unnecessary as the selecting branch now the tag "B" is designated.

Furthermore the proposed method (JP 2013-228964) does not disclose a method respond to a basic need that a user wants new information to be stored on a form on which information are accessed.

BRIEF SUMMARY OF THE INVENTION

The present invention was conceived in view of the above problems and therefore an object of the present invention is to provide an information managing apparatus and a method to provide a hierarchical composition of forms for information managing, wherein a child form appropriate for each cell is prepared on a constituent form of the composition, in the way the exponential increase of the number of the constituent forms are minimized, and along with it the man-hours needed to make the hierarchy form and the memorizing capacity are minimized.

Another object of the present invention is to provide an information processing apparatus and a method of transforming a folder tree into a hierarchy form classifying information equivalently to classifying the information by the folder-tree, wherein an access to a desired information on a hierarchy form can be achieved efficiently by routing only forms which prepare classification needed for the access.

Another object is to provide a method wherein by storing operation of information on a form generated by transforming of a folder tree information can be stored actually in the source folder-tree.

In order to achieve the above objects, a method in an information managing apparatus according to a first aspect of the invention, wherein information made by an application is managed by such a way that the information is specified by a full-path-name generated by connecting each path-name that is the name of a folder containing the information, and further the name of the information by a specified method, and managing operation of information is performed as an operation for an icon on the screen of the apparatus, that is an image made for each information and specified for each kind of information, and said method constructing a hierarchy form that is a combination of forms, on the form cells each of which is a rectangle having an icon or icons of information located therein, being located in a matrix, and tag-names characterizing information being located outside of the cells grouped as a tag-name-chain, and in the hierarchy form an opening-designation to a cell on a form constituent of the hierarchy form having another form constituent of the hierarchy form opened as an open-form on the screen of the apparatus;

comprises the steps of:

after obtaining a child-name-chain for each folder contained within the designated folder, the child-name-chain being a sequence of a name of a child-folder which the folder contains directly as a parent-folder, making tag-name-chain data in which a tag-name-chain obtained by merging child-name-chains sharing a same name or child-name-chains designated by a merge-designating means is registered accompanied by a parent-full-path-name each of which is the full-path-name of the parent folder of each child-name-chain of the merged child-name-chains;
  selecting tag-name-chain data among the made tag-name-chain data as "selected tag-name-chain data" according to a specified rule;
  after selecting tag-name-chain data among the "selected tag-name-chain data" according to a specified allocating rule based on the hierarchy rank of the corresponding parent-folders in the folder tree,
displaying a form as a top form of the hierarchy on the screen of the apparatus based on form data which is made to represent the form, on the form the selected tag-name-chain data being located according to a specified method;
  in response to open-designation on a first form displayed on the apparatus screen,
  after identifying a set of tag-name located in a specified position to a cell within the corresponding form, to each of the selecting tag-name-chain data a parent folder full-path-name of which is in a specified relationship with the identified related tag-names,
  adding the selected tag-name-chain data to the "selected tag-name-chain data";
    after selecting tag-name-chain data according to the above locating rule among the selected tag-name-chain data from which tag-name-chain data are removed, the removed tag-name-chain data having been located on the superior forms ending with the first form,
  making a form data representing a second form on which selected data are located according to the above specified method so as to display the second form based on the form data on the apparatus screen; and
    displaying the icon of information related a cell on the second form, the information having a full-path-name in a specified relationship with all the related tag-names determined for the cell.

The method of according to a second aspect of the invention is the method according to the first aspect, further comprises the steps of:
  selecting a specified path-name among path-names constituent of parent-folder full-path-names of tag-name-chain data as "condition data" by a specified rule referring all the tag-name-chain data made;
  selecting tag-name-chains having no condition data in selecting tag-name-chains located on the top form; and
  selecting tag-name-chains having condition data in a specified relationship with the cell to which the open-designation is given in selecting tag-name-chains located on the open-form.

The method of according to a third aspect of the invention is the method according to the first aspect,
  wherein, in response to an operation storing information on a form constituent of the hierarchy form, on the form each of the tag-names being located related to the tag-name-chain to which the tag-name belong,
  the full-path-name of the top folder is set as an initial value of a "storing full-path-name",
  the procedure is repeated which comprises the steps of:
  selecting a related tag-name among the tag-names determined for the cell in which the information is stored based on tag-name-chain data related to the determined tag-names and the "storing full-path-name";
  updating the storing tag-name by connecting the selected related tag-name to the storing full-path-name across a specified code; and
  providing newly a folder the full-path-name of which is the corresponding full-path-name, in the case a folder the full-path-name of which is the updated full-path-name is not provided;
  and at the end the full-path-name of the information is obtained by connecting the name of the information to the storing full-path-name across the specified code.

The method of according to a fourth aspect of the invention is the method according to the first aspect, provided with the first steps of:
For each path-name constituent of a parent-full-path-name or a full-path-name of information, making related data in which the pair of the path-name and tag-name-chain identify data identifying a mother tag-name-chain to which the path-name belongs is registered; and
  making related data in which a pair of a related tag-name identified for a cell on the form and tag-name-chain identifying data of the mother tag-name-chain containing the tag-name is registered, the tag-name-chain being located on the form in such a way that its corresponding tag-names are located related to it;
  executing the second steps of:
  selecting tag-name-chains located on the top form based on a specified rule for related data made for each pathname constituent of its parent-folder full-path-names;
  selecting tag-name-chains located on the open-form by matching based on a specified rule related data made for each path-name constituent of its parent-folderfull-path-names and related data made for each cell of the form;
  selecting condition data based on a specified rule for related data made for each path-name constituent of its parent-folder-full-path-names; and
  selecting information located in a cell by matching based on a specified rule related data made for the cell and related data made for each of the information.

In order to achieve the above objects, a method in an information managing apparatus according to the fifth aspect of the invention wherein information made by an application is managed by such a way that the information is specified by a full-path-name generated by connecting each path-name that is the name of a folder containing the information, and further the name of the information by a specified method, and
  managing operation of information is performed as an operation for an icon on the screen of the apparatus, that is an image made for each information and specified for each kind of information;
  said method constructing a hierarchy form that is a combination of forms,
on the form cells each of which is a rectangle having an icon or icons of information located therein, being located in a matrix, and tag-names characterizing information being located outside of the cells grouped as a tag-name-chain, and in the hierarchy form an opening-designation to a cell on a form constituent of the hierarchy form having another form constituent of the hierarchy form opened as an open-form on the screen of the apparatus;
  comprises the stops of:
  for information stored on the apparatus, setting full-related data along with the full-path-name of the information in information manage data made for the information, the full-related data being generated by connecting related data each of which is made for each path-name of the full-path-name of the information and has the path-name registered therein;

after making tag-name-chain data in which a tag-name-chain is registered based on input information, for each tag-name-chain data, making condition data on which a tag-name belonging to a tag-name-chain different from the tag-name-chain so as to register the condition data in the corresponding tag-name-chain data;

after selecting tag-name-chain data as "selected tag-name-chain data" among the tag-name-chain data having no condition data registered therein according to a specified rule, making form data representing a form on which the selected tag-name-chain are located according to a specified method so as to display the corresponding form based on the form data as the hierarchy top form on the apparatus screen;

after for a designated cell on a first form displayed, obtaining all the tag-names located at a specified position determined in each corresponding form for the first cell and each of the all cells to which open-designation are given to open-display the first form, obtaining full-related data generated by connecting related data having each of the determined tag-names registered therein;

adding selected tag-name-chain data to the "selected tag-name-chain data", the added tag-name-chain data being selected as tag-name-chain data the condition data of which is in a specified relationship with the full-related data for the above designated cell;

after selecting tag-name-chain data according to the above locating rule among the selected tag-name-chain data from which tag-name-chain data have been removed, the removed tag-name-chain data having been located on the superior forms ending with the first form, making a form data representing a second form on which the selected data are located according to the above specified method so as to display the second form based on the form data on the apparatus screen; and for a cell on the second form, identifying information manage data in which full-related data in a specified relationship with the full-related data made for the cell is registered; and displaying the second form based on the form data on the apparatus screen, with an icon of information related to each cell on the form, the information manage data of the information being identified for the corresponding cell.

In order to achieve the above objects, an information managing apparatus according to the sixth aspect of the invention, wherein information made by an application is managed by such a way that the information is specified by a full-path-name generated by connecting each path-name that is the name of a folder containing the information, and further the name of the information by a specified method, and managing operation of information is performed as an operation for an icon on the screen of the apparatus, that is an image made for each information and specified for each kind of information;

said apparatus constructing a hierarchy form that is a combination of forms, on the form cells each of which is a rectangle having an icon or icons of information located therein, being located in a matrix, and tag-names characterizing information being located outside of the cells grouped as a tag-name-chain, and in the hierarchy form an opening-designation to a cell on a form constituent of the hierarchy form having another form constituent of the hierarchy form opened as an open-form on the screen of the apparatus;

comprises:

a means that after obtaining a child-name-chain for each folder contained within the designated folder, the child-name-chain being a sequence of a name of a child-folder which the folder contains directly as a parent-folder, makes tag-name-chain data in which a tag-name-chain obtained by merging child-name-chains sharing a same name or child-name-chains designated by a merge-designating means is registered accompanied by a parent-full-path-name each of which is the full-path-name of the parent folder of each child-name-chain of the merged child-name-chains;

a means that selects tag-name-chain data among the made tag-name-chain data as "selected tag-name-chain data" according to a specified rule;

a means that after selecting tag-name-chain data among the "selected tag-name-chain data" according to a specified allocating rule based on the hierarchy rank of the corresponding parent-folders in the folder tree, displays a form as a top form of the hierarchy on the screen of the apparatus based on form data which is made to represent the form, on the form the selected tag-name-chain data being located according to a specified method;

a means that, in response to open-designation on a first form displayed on the apparatus screen, after identifying a set of tag-name located in a specified position to a cell within the corresponding form, to each of the selecting tag-name-chain data a parent folder full-path-name of which is in a specified relationship with the identifies related tag-names, adds the selected tag-name-chain data to the "selected tag-name-chain data", a means that after selecting tag-name-chain data according to the above locating rule among the selected tag-name-chain data from which tag-name-chain data are removed, the removed tag-name-chain data having been located on the superior forms ending with the first form, makes a form data representing a second form on which selected data are located according to the above specified method so as to display the second form based on the form data on the apparatus screen; and a means that displays the icon of information related a cell on the second form, the information having a full-path-name in a specified relationship with all the related tag-names determined for the cell.

The apparatus according to a seventh aspect of the invention is the apparatus according to the sixth aspect further comprising:

a means that selects a specified path-name among path-names constituent of parent-folder full-path-names of tag-name-chain data as "condition data" by a specified rule referring all the tag-name-chain data made;

a means that selects tag-name-chains having no condition data in selecting tag-name-chains located on the top form; and a means that selects tag-name-chains having condition data in n specified relationship with the cell to which the open-designation is given in selecting tag-name-chains located on the open-form.

The apparatus of according to a eighth aspect of the invention is the apparatus according to the sixth aspect, wherein, in response to an operation storing information on a form constituent of the hierarchy form, on the form each of the tag-names being located related to the tag-name-chain to which the tag-name belong, the full-path-name of the lop folder is set as an initial value of a "storing full-path-name", the procedure is repeated which comprises:

a means that selects a related tag-name among the tag-names determined for the cell in which the information is stored based on tag-name-chain data related to the determined tag-names and the "storing full-path-name";

a means that updates the storing tag-name by connecting the selected related tag-name to the storing full-path-name across a specified code; and a means that provides newly a folder the full-path-name of which is the corresponding full-path-name, in the case a folder the full-path-name of which is the updated full-path-name is not provided;

and at the end the full-path-name of the information is obtained by connecting the name of the information to the storing full-path-name across the specified code.

The apparatus of according to a ninth aspect of the invention is the apparatus according to the sixth aspect, provided with the first means comprising:

a means that, for each path-name constituent of a parent-full-path-name or a full-path-name of information, makes related data in which the pair of the path-name and tag-name-chain identify data identifying a mother tag-name-chain to which the path-name belongs is registered; and a means that makes related data in which a pair of a related tag-name identified for a cell on the form and tag-name-chain identifying data of the mother tag-name-chain containing the tag-name is registered, the tag-name-chain being located on the form in such a way that its corresponding tag-names are located related to it;

executing the second means comprising:

a means that selects tag-name-chains located on the top form based on a specified rule for related data made for each path-name constituent of its parent-folder-full-path-names;

a means that selects tag-name-chains located on the open-form by matching based on a specified rule related data made for each path-name constituent of its parent-folder-full-path-names and related data made for each cell of the form;

a means that selects condition data based on a specified rule for related data made for each path-name constituent of its parent-folder-full-path-names; and a means that selects information located in a cell by matching based on a specified rule related data made for the cell and related data made for each of the information.

In order to achieve the above objects, the information managing apparatus according to a tenth aspect of the invention;

wherein information made by an application is managed by such a way that the information is specified by a full-path-name generated by connecting each path-name that is the name of a folder containing the information, and further the name of the information by a specified method, and managing operation of information is performed as an operation for an icon on the screen of the apparatus, that is an image made for each information and specified for each kind of information;

said method constructing a hierarchy form that is a combination of forms, on the form cells each of which is a rectangle having an icon or icons of information located therein, being located in a matrix, and tag-names characterizing information being located outside of the cells grouped as a tag-name-chain, and in the hierarchy form an opening-designation to a cell on a form constituent of the hierarchy form having another form constituent of the hierarchy form opened as an open-form on the screen of the apparatus;

comprises:

a means that for information stored on the apparatus, sets full-related data along with the full-path-name of the information in information manage data made for the information, the full-related data being generated by connecting related data each of which is made for each path-name of the full-path-name of the information and has the path-name registered therein;

a means that, after making tag-name-chain data in which a tag-name-chain is registered based on input information, for each tag-name-chain data, makes condition data on which a tag-name belonging to a tag-name-chain different from the tag-name-chain so as to register the condition data in the corresponding tag-name-chain data;

a means that, after selecting tag-name-chain data as "selected tag-name-chain data" among the tag-name-chain data having no condition data registered therein according to a specified rule, makes form data representing a form on which the selected tag-name-chain are located according to a specified method so as to display the corresponding form based on the form data as the hierarchy top form on the apparatus screen;

a means that, after for a designated cell on a first form displayed, obtaining all the tag-names located at a specified position determined in each corresponding form for the first cell and each of the all cells to which open-designation are given to open-display the first form, obtains full-related data generated by connecting related data having each of the determined tag-names registered therein;

a means that adds selected tag-name-chain data to the "selected tag-name-chain data", the added tag-name-chain data being selected as tag-name-chain data the condition data of which is in a specified relationship with the full-related data for the above designated cell;

a means that, after selecting tag-name-chain data according to the above locating rule among the selected tag-name-chain data from which tag-name-chain data have been removed, the removed tag-name-chain data having been located on the superior forms ending with the first form, makes a form data representing a second form on which the selected data are located according to the above specified method so as to display the second form based on the form data on the apparatus screen; and a means that, for a cell on the second form, identifies information manage data in which full-related data in a specified relationship with the full-related data made for the cell is registered; and a means that displays the second form based on the form data on the apparatus screen, with an icon of information related to each cell on the form, the information manage data of the information being identified for the corresponding cell.

In order to achieve the above objects, a computer control program according to a eleventh aspect of the invention, wherein information mode by an application is managed by such a way that the information is specified by a full-path-name generated by connecting each path-name that is the name of a folder containing the information, and further the name of the information by a specified method, and managing operation of information is performed as an operation for an icon on the screen of the apparatus, that is an image made for each information and specified for each kind of information;

the method actualized by the program constructing a hierarchy form that is a combination of forms, on the form cells each of which is a rectangle having an icon or icons of information located therein, being located in a matrix, and tag-names characterizing information being located outside of the cells grouped as a tag-name-chain, and in the hierarchy form an opening-designation to a cell on a form constituent of the hierarchy form having another form constituent of the hierarchy form opened as an open-form on the screen of the apparatus;

actualizes the method comprising the steps of:

after obtaining a child-name-chain for each folder contained within the designated folder, the child-name-chain being a sequence of a name of a child-folder which the folder contains directly as a parent-folder, making tap-name-chain data in which a tag-name-chain obtained by merging child-name-chains sharing a same name or child-name-chains designated by a merge-designating means is registered accompanied by a parent-full-path-name each of which is the full-path-name of the parent folder of each child-name-chain of the merged child-name-chains;

selecting tag-name-chain data among the made tag-name-chain data as "selected tag-name-chain data" according to a specified rule;

after selecting tag-name-chain data among the "selected tag-name-chain data" according to a specified allocating rule based on the hierarchy rank of the corresponding parent-folders in the folder tree, displaying a form as a top form of the hierarchy on the screen of the apparatus based on form data which is made to represent the form, on the form the selected tag-name-chain data being located according to a specified method;

in response to open-designation on a first form displayed on the apparatus screen, after identifying a set of tag-name located in a specified position to a cell within the corresponding form, to each of the selecting tag-name-chain data a parent folder full-path-name of which is in a specified relationship with the identified related tag-names, adding the selected tag-name-chain data to the "selected tag-name-chain data";

after selecting tag-name-chain data according to the above locating rule among the selected tag-name-chain data from which tag-name-chain data are removed, the removed tag-name-chain data having been located on the superior forms ending with the first form, making a form data representing a second form on which selected data are located according to the above specified method so as to display the second form based on the form data on the apparatus screen; and displaying the icon of information related a cell on the second form, the information having a full-path-name in a specified relationship with all the related tag-names determined for the cell.

The program according to a twelfth aspect is the program according to the eleventh aspect, the method actualized by the program further comprising the steps of:

selecting a specified path-name among path-names constituent of parent-folder full-path-names of tag-name-chain data as "condition data" by a specified rule referring all the tag-name-chain data made;

selecting tag-name-chains having no condition data in selecting tag-name-chains located on the top form; and selecting tag-name-chains having condition data in a specified relationship with the cell to which the open-designation is given in selecting tag-name-chains located on the open-form.

The program according to a thirteenth aspect is the program according to the eleventh aspect, wherein, in response to an operation storing information on a form constituent of the hierarchy form, on the form each of the tag-names being located related to the tag-name-chain to which the tag-name belong, the full-path-name of the top folder is set as an initial value of a "storing full-path-name", the procedure is repeated which comprises the steps of:

selecting a related tag-name among the tag-names determined for the cell in which the information is stored based on tag-name-chain data related to the determined tag-names and the "storing full-path-name";

updating the storing tag-name by connecting the selected related tag-name to the storing full-path-name across a specified code; and providing newly a folder the full-path-name of which is the corresponding full-path-name, in the case a folder the full-path-name of which is the updated full-path-name is not provided;

and at the end the full-path-name of the information is obtained by connecting the name of the information to the storing full-path-name across the specified code.

The program according to a fourteenth aspect is the program according to the eleventh aspect, the method actualized by the program provided with the first steps of:

for each path-name constituent of a parent-full-path-name or a full-path-name of information, making related data in which the pair of the path-name and tag-name-chain identify data identifying a mother tag-name-chain to which the path-name belongs is registered; and making related data in which a pair of a related tag-name identified for a cell on the form and tag-name-chain identifying data of the mother tag-name-chain containing the tag-name is registered, the tag-name-chain being located on the form in such a way that its corresponding tag-names are located related to it;

executes the second steps of:

selecting tag-name-chains located on the top form based on a specified rule for related data made for each path-name constituent of its parent-folder-full-path-names;

selecting tag-name-chains located on the open-form by matching based on a specified rule related data made for each path-name constituent of its parent-folder-full-path-names and related data made for each cell of the form;

selecting condition data based on a specified rule for related data made for each path-name constituent of its parent-folder-full-path-names; and selecting information located in a cell by matching based on a specified rule related data made for the cell and related data made for each of the information.

In order to achieve the above objects, a computer control program according to a fifteenth aspect of the invention comprises the step of:

wherein information made by an application is managed by such a way that the information is specified by a full-path-name generated by connecting each path-name that is the name of a folder containing the information, and further the name of the information by a specified method, and managing operation of information is performed as an operation for an icon on the screen of the apparatus, that is an image made for each information and specified for each kind of information;

said method constructing a hierarchy form that is a combination of forms, on the form cells each of which is a rectangle having an icon or icons of information located therein, being located in a matrix, and tag-names characterizing information being located outside of the cells grouped as a tag-name-chain, and in the hierarchy form an opening-designation to a cell on a form constituent of the hierarchy form having another form constituent of the hierarchy form opened as an open-form on the screen of the apparatus;

said method actualized by the program comprises the steps of:

for information stored on the apparatus, setting full-related data along with the full-path-name of the information in information manage data made for the information, the full-related data being generated by connecting related data each of which is made for each path-name of the full-path-name of the information and has the path-name registered therein;

after making tag-name-chain data in which a tag-name-chain is registered based on input information, for each tag-name-chain data, making condition data on which a tag-name belonging to a tag-name-chain different from the tag-name-chain so as to register the condition data in the corresponding tag-name-chain data;

after selecting tag-name-chain data as "selected tag-name-chain data" among the tag-name-chain data having no condition data registered therein according to a specified rule, making form data representing a form on which the selected tag-name-chain are located according to a specified method so as to display the corresponding form based on the form data as the hierarchy top form on the apparatus screen;

after for a designated cell on a first form displayed, obtaining all the tag-names located at a specified position determined in each corresponding form for the first cell and each of the all cells to which open-designation are given to open-display the first form, obtaining full-related data generated by connecting related data having each of the determined tag-names registered therein;

adding selected tag-name-chain data to the "selected tag-name-chain data", the added tag-name-chain data being selected as tag-name-chain data the condition data of which is in a specified relationship with the full-related data for the above designated cell;

after selecting tag-name-chain data according to the above locating rule among the selected tag-name-chain data from which tag-name-chain data have boon removed, the removed tag-name-chain data having been located on the superior forms ending with the first form, making a form data representing a second form on which the selected data are located according to the above specified method so as to display the second form based on the form data on the apparatus screen; and for a cell on the second form, identifying information manage data in which full-related data in a specified relationship with the full-related data made for the cell is registered; and displaying the second form based on the form data on the apparatus screen, with an icon of information related to each cell on the form, the information manage data of the information being identified for the corresponding cell.

In order to achieve the above objects, a medium encoded with the program according to a sixteenth aspect of the invention, wherein information made by an application is managed by such a way that the information is specified by a full-path-name generated by connecting each path-name that is the name of a folder containing the information, and further the name of the information by a specified method, and managing operation of information is performed as an operation for an icon on the screen of the apparatus, that is an image made for each information and specified for each kind of information;

said method constructing a hierarchy form that is a combination of forms, on the form cells each of which is a rectangle having an icon or icons of information located therein, being located in a matrix, and tag-names characterizing information being located outside of the cells grouped as a tag-name-chain, and in the hierarchy form an opening-designation to a cell on a form constituent of the hierarchy form having another form constituent of the hierarchy form opened as an open-form on the screen of the apparatus;

said method comprises the steps of:

after obtaining a child-name-chain for each folder contained within the designated folder, the child-name-chain being a sequence of a name of a child-folder which the folder contains directly as a parent-folder, making tag-name-chain data in which a tag-name-chain obtained by merging child-name-chains sharing a same name or child-name-chains designated by a merge-designating means is registered accompanied by a parent-full-path-name each of which is the full-path-name of the parent folder of each child-name-chain of the merged child-name-chains;

selecting tag-name-chain data among the made tag-name-chain data as "selected tag-name-chain data" according to a specified rule;

after selecting tag-name-chain data among the "selected tag-name-chain data" according to a specified allocating rule based on the hierarchy rank of the corresponding parent-folders in the folder tree, displaying a form as a top form of the hierarchy on the screen of the apparatus based on form data which is made to represent the form, on the form the selected tag-name-chain data being located according to a specified method;

in response to open-designation on a first form displayed on the apparatus screen, after identifying a set of tag-name located in a specified position to a cell within the corresponding form, to each of the selecting tag-name-chain data a parent folder full-path-name of which is in a specified relationship with the identified related tag-names, adding the selected tag-name-chain data to the "selected tag-name-chain data";

after selecting tag-name-chain data according to the above locating rule among the selected tag-name-chain data from which tag-name-chain data are removed, the removed tag-name-chain data having been located on the superior forms ending with the first form, making a form data representing a second form on which selected data are located according to the above specified method so as to display the second form based on the form data on the apparatus screen; and displaying the icon of information related a cell on the second form, the information having a full-path-name in a specified relationship with all the related tag-names determined for the cell.

The medium according to a seventeenth aspect is the medium according to the sixteenth aspect, said method actualized by the program comprises the steps of:

selecting a specified path-name among path-names constituent of parent-folder full-pathnames of tag-name-chain data as "condition data" by a specified rule referring all the tag-name-chain data made;

selecting tag-name-chains having no condition data in selecting tag-name-chains located on the top form; and selecting tag-name-chains having condition data in a specified relationship with the cell to which the open-designation is given in selecting tag-name-chains located on the open-form.

The medium according to a eighteenth aspect is the medium according to the sixteenth aspect, wherein, in response to an operation storing information on a form constituent of the hierarchy form, on the form each of the tag-names being located related to the tag-name-chain to which the tag-name belong, the full-path-name of the top folder is set as an initial value of a "storing full-path-name", the procedure is repeated which comprises the steps of:

selecting a related tag-name among the tag-names determined for the cell in which the information is stored based on tag-name-chain data related to the determined tag-names and the "storing full-path-name";

updating the storing tag-name by connecting the selected related tag-name to the storing full-path-name across a specified code; and providing newly a folder the full-path-name of which is the corresponding full-path-name, in the case a folder the full-path-name of which is the updated full-path-name is not provided;

and at the end the full-path-name of the information is obtained by connecting the name of the information to the storing full-path-name across the specified code.

The medium according to a nineteenth aspect is the medium according to the sixteenth aspect, the method actualized by the program stored by the medium provided with the first steps of:

For each path-name constituent of a parent-full-path-name or a full-path-name of information, making related data in which the pair of the path-name and tag-name-chain identify data identifying a mother tag-name-chain to which the path-name belongs is registered; and making related data in which a pair of a related tag-name identified for a cell on the form and tag-name-chain identifying data of the mother tag-name-chain containing the tag-name is registered, the tag-name-chain being located on the form in such a way that its corresponding tag-names are located related to it;

executing the second steps of:

selecting tag-name-chains located on the top form based on a specified rule for related data made for each path-name constituent of its parent-folder-full-path-names;

selecting tag-name-chains located on the open-form by matching based on a specified rule related data made for each path-name constituent of its parent-folder-full-path-names and related data made for each cell of the form;

selecting condition data based on a specified rule for related data made for each path-name constituent of its parent-folder-full-path-names; and selecting information located in a cell by matching based on a specified rule related data made for the cell and related data made for each of the information.

In order to achieve the above objects, a medium encoded with the program according to a twentieth aspect of the invention comprises the step of:

wherein information made by an application is managed by such a way that the information is specified by a full-path-name generated by connecting each path-name that is the name of a folder containing the information, and further the name of the information by a specified method, and managing operation of information is performed as an operation for an icon on the screen of the apparatus, that is an image made for each information and specified for each kind of information;

said method constructing a hierarchy form that is a combination of forms, on the form cells each of which is a rectangle having an icon or icons of information located therein, being located in a matrix, and tag-names characterizing information being located outside of the cells grouped as a tag-name-chain, and in the hierarchy form an opening-designation to a cell on a form constituent of the hierarchy form having another form constituent of the hierarchy form opened as an open-form on the screen of the apparatus;

said program comprising the steps of:

for information stored on the apparatus, setting full-related data along with the full-path-name of the information in information manage data made for the information, the full-related data being generated by connecting related data each of which is made for each pathname of the full-path-name of the information and has the path-name registered therein;

after making tag-name-chain data in which a tag-name-chain is registered based on input information, for each tag-name-chain data, making condition data on which a tag-name belonging to a tag-name-chain different from the tag-name-chain so as to register the condition data in the corresponding tag-name-chain data;

after selecting tag-name-chain data as "selected tag-name-chain data" among the tag-name-chain data having no condition data registered therein according to a specified rule, making form date representing a form on which the selected tag-name-chain are located according to a specified method so as to display the corresponding form based on the form data as the hierarchy top form on the apparatus screen;

after for a designated cell on a first form displayed, obtaining all the tag-names located at a specified position determined in each corresponding form for the first cell and each of the all cells to which open-designation are given to open-display the first form, obtaining full-related data generated by connecting related data having each of the determined tag-names registered therein;

adding selected tag-name-chain data to the "selected tag-name-chain data", the added tag-name-chain data being selected as tag-name-chain data the condition data of which is in a specified relationship with the full-related data for the above designated cell;

after selecting tag-name-chain data according to the above locating rule among the selected tag-name-chain data from which tag-name-chain data have been removed, the removed tag-name-chain data having been located on the superior forms ending with the first form, making a form data representing a second form on which the selected data are located according to the above specified method so as to display the second form based on the form data on the apparatus screen; and for a cell on the second form, identifying information manage data in which full-related data in a specified relationship with the full-related data made for the cell is registered; and displaying the second form based on the form data on the apparatus screen, with an icon of information related to each cell on the form, the information manage data of the information being identified for the corresponding cell.

a hierarchy form providing many classification viewpoint can be obtained only with inputting man-hours and memory dimension proportional to the number of the classification view-points, as a user can obtain a hierarchy form wherein a child form appropriate to each cell of a constituent form can be provided automatically only by input a tagname characterizing information for each classification view-point related to another tagname of another classification view-point.

Besides as a child form provided for each cell of a constituent form can be made with each open displaying by the system, necessary memory dimension can be minimized furthermore.

Furthermore as in the method transforming a folder-tree into a hierarchy form classifying information equivalent to the folder-tree, a hierarchy form can be obtained wherein a child form appropriate to each cell of a constituent form is provided in response to free classification for each cell, a user can access information effectively by opening only necessary forms, that is, without opening unnecessary form.

As in the method transforming a folder-tree into a hierarchy form classifying information equivalent to the folder-tree, information can be stored in the source folder-tree by storing operation of an information icon on a form constituting it, a user can achieve storing operation of information more speedily and with more visibility.

Furthermore as in the method transforming a folder-tree into a hierarchy form classifying information equivalent to the folder-tree, a folder storing the information can be made automatically within the source folder-tree, and the folder stores the information, a user can achieve storing operation of information more easily and speedily.

BRIEF DESCRIPTION OF THE DRAWINGS

FIG. 34 depicts a data format of row position data or column position data in the system of the embodiment;

FIG. 35 depicts a data format of line data in the system of the embodiment;

FIG. 36 depicts the top form of the hierarchy-form of the example in the system of the embodiment;

FIG. 41 depicts a procedure of fullpathname making process in the system of the embodiment;

FIG. 47 depicts the top form of the hierarchy-form of the example in the system of the embodiment;

FIG. 48 depicts an open-form of the example in the system of the embodiment;

FIG. 49 depicts a procedure of information storing process in the system of the embodiment;

Figure 1:
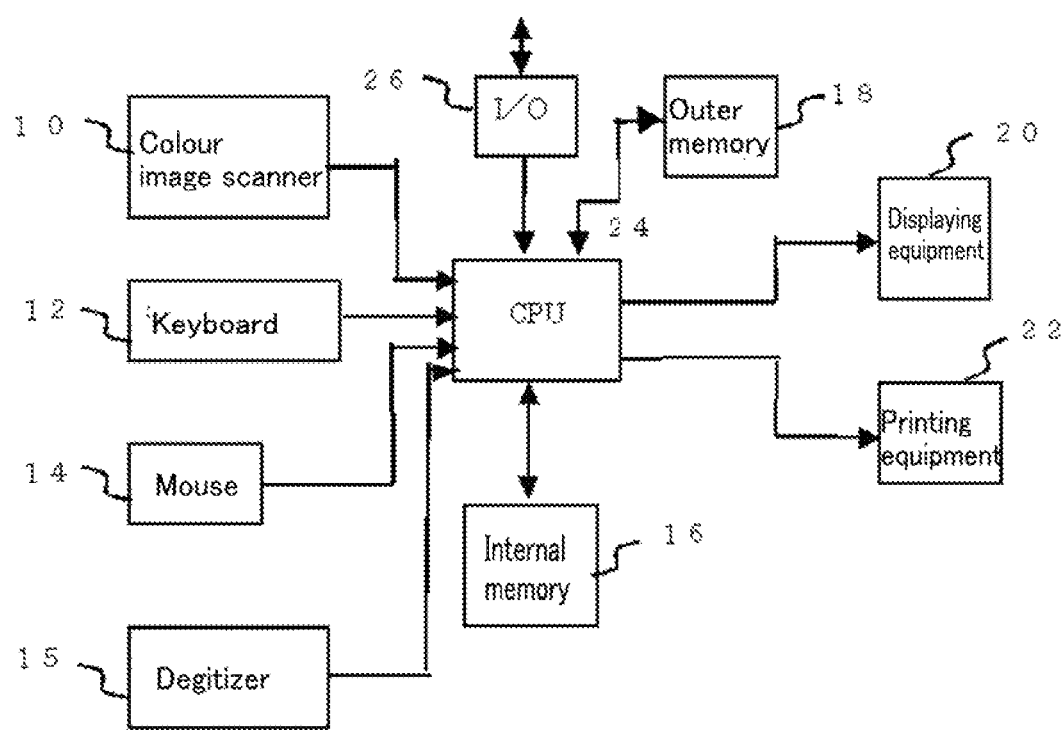
FIG. 1 is a block diagram of an example of a system configuration on hardware of an information processing apparatus according to one embodiment of the present invention.

EXPLANATIONS OF LETTERS OR NUMERALS 12 keyboard
14 mouse
16 internal memory
18 external memory
20 displaying apparatus
20a display screen
24 CPU
26 communicating apparatus
27 communicating line
30 desktop screen
31 main menu
32 program menu
33 form manage application screen
35 program button
36 icon of data object
41 icon field
42 horizontal index field
43 vertical index field
45 common condition text
51 input part
52 tagname-chain data making unit
53 tagname-chain data memorizing unit
54 condition data providing unit
55 form-source tagname-chain selecting unit
56 form data making unit
57 form data memorizing unit
58 form displaying unit
60 information attribute data providing unit
61 output information relating unit
62 open-designation unit
70 function menu
71 form make button
72 transform button
73 child form providing button
75 setting button
77 hierarchy button
79 store button
90 name field
93 manage target folder designating sub-screen
95 execute button
150 cell area
153 form icon
155 icon of information
157 third icon
159 common condition character string
160 in-cell information displaying screen
170 icon of information "Report1"
171 icon of information "Report2"
175 item name character string
177 icon of information "Report3"
210 parent folder displaying screen
211 form name displaying field
213 parent folder displaying field
214 an icon representing a folder
215 upward button
216 downward button
218 remove button
219 execute button
230 tagname-chain displaying field
231 tagname-chain displaying field
235 merge designating field
237 item name input field
239 execute button
250 tagname-chain input screen
251 form name input field
252 execute button
253 input block
255 hierarchy rank input field
256 locating direction designating field
257 tagname-chain input field
258 condition tagname input field
261 item name input field
262 tagname input field
263 item name input field
264 tagname input field

DETAILED DESCRIPTION OF THE INVENTION

Hereafter the embodiment of the invention is explained in reference to the appended figures. FIG. 1 depicts a system configuration on hardware of an information processing apparatus according to one embodiment of the present invention. This system includes a keyboard 12, a mouse 14 acting as input apparatuses, an internal memory 16 and an external memory 18 acting as storage apparatuses, and a displaying apparatus 20 and a printing apparatus 22 acting as output apparatuses, which are connected to a CPU 24 through appropriate interface circuits (not shown). The CPU 24 is also connected to a telephone line or communication line 27 through a communicating apparatus 26. The internal memory 16 and the external memory 18 have stored thereon various programs regulating processes and control operations of the CPU 24 as well as various electronic dictionaries, character fonts, files, etc. The communicating apparatus 26 has a facsimile communication function.

Figure 2:
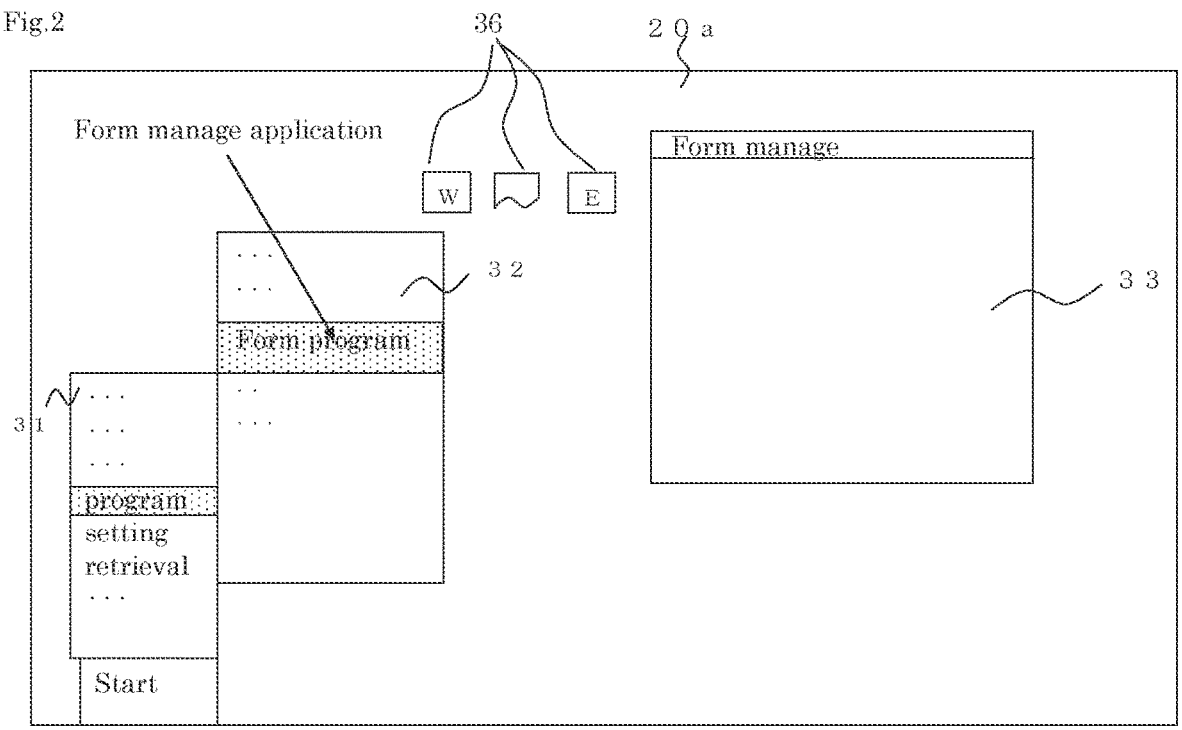
FIG. 2 depicts a desktop screen displayed by an environment controlling program in the system of the embodiment.

When the apparatus is powered on, an environment control program controlling a GUI environment of the apparatus is automatically activated to display, for example, a desktop screen 30 shown in FIG. 2 on a display screen 20a of the displaying apparatus 20.

In the apparatus information made by users are managed by the environment control program, with file information being as a unit of managing. Furthermore in the apparatus a folder is provided beside the file information as a data object that is a unit of information managing, so that classifying of file information is executed in the way file information is contained in a folder.

In the specification file information and a folder is named "information" together. A folder is managed in a way of a folder hierarchy structure wherein a folder is contained as a child folder in another folder that is a parent folder repeatedly and located in the system forming a folder tree the root of which is located in an external memory 18.

Figure 3:
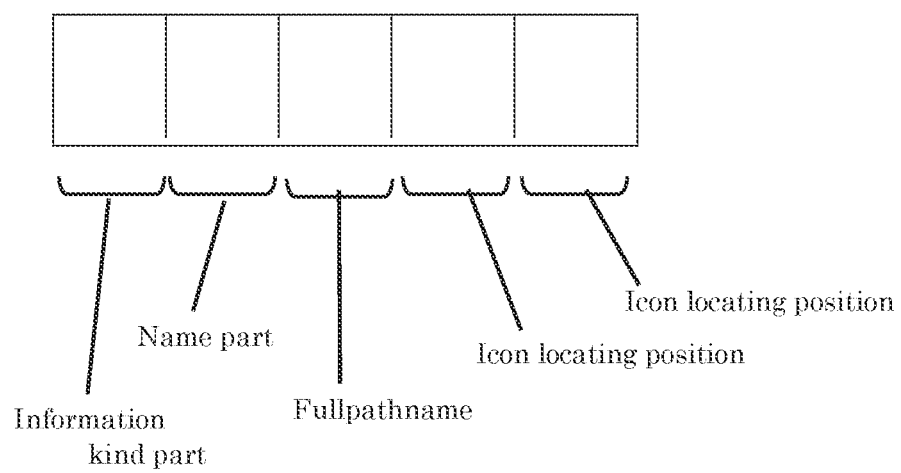
FIG. 3 depicts a format of data-object manage data in the system of the embodiment.

A data object comprising of file information and a folder is managed with data object data attached by the environment control program, data object data comprising of "kind information", "name", "fullpathname", "icon image data pointer", and "icon locating position" by the environment control program (FIG. 3). The "kind information" first discriminates file information and a folder, and further in the case of file information represents the kind of the application regarding to the file information. "Name" is a name input by the user and determined uniquely in the parent folder that is another folder containing the information directly each "kind information", and can be named "informationlder name" to discriminate "name" used representing the other meaning.

A "fullpathname" is a key used by the environment control program for identifying each data object in the system, and is obtained by connecting a first text obtained based on the names of the upper folders of the data object to the name text of the information, the first text being obtained by connecting the names of the upper folders in sequence across a determined dividing symbol repeatedly beginning from the root. In the specification the dividing symbol is named a first dividing symbol. The function to contain a data object in another folder is realized in the system by connecting the name of the data object that is an object of containing to the name of the containing destination folder.

Furthermore the environment control program displays an icon by a method known on the desktop screen 30, the icon being an specified image for each "kind information" above described, beside which a text representing the "name" information of the corresponding data object is displayed.

File information or a folder is opened by a specified operation for the corresponding icon using a mouse 14 on the desktop screen 30. The environment control program recognizes the corresponding data object by comparing the "icon displaying position" of the icons displayed on the desktop screen 30 to the position designated by the above operation repeatedly.

In the case the recognized data object is file information, the content of the file information is displayed on a "file information screen" provided for the file information. The environment control program fetches the corresponding app program based on the "kind information" of the designated file information and the program fetched displays the content of the file information.

In the case the recognized data object is a folder, a "folder screen" is displayed on an appropriate position on the desktop screen 30, and on the folder screen the icon of the data object contained directly by the corresponding folder is displayed.

Therein the environment control program recognizes data objects contained directly by the folder by comparing the fullpathname of the folder to the fullpathname of each data object in the system repeatedly, to display image data specified in the "information kind" data of the recognized data object manage data in the specified way in the folder screen.

An icon representing file information or a folder can be moved on the desktop screen 30 by the specified drag operation using a mouse 14, and its position on the desktop screen 30 is registered in the "icon displaying position" of the data object manage data. In addition storing function of information contained in a folder into another folder is realized by dragging the icon of the information to the icon of the storing destination folder.

If a "start" button always displayed at the lower left corner is selected and specified on this desktop screen 30, a "main menu" 31 having a list of selection buttons such as "program", "set", and "retrieve" appears on the display screen 20a, and if a "program" button 35 is clicked and specified on this "main menu" 31, a "program menu" 32 showing a list of application programs installed on the apparatus appears on the display screen 20a. FIG. 2 depicts a state after clicking and specifying the "program button" 35 to display the "program menu" 32.

Figure 4:
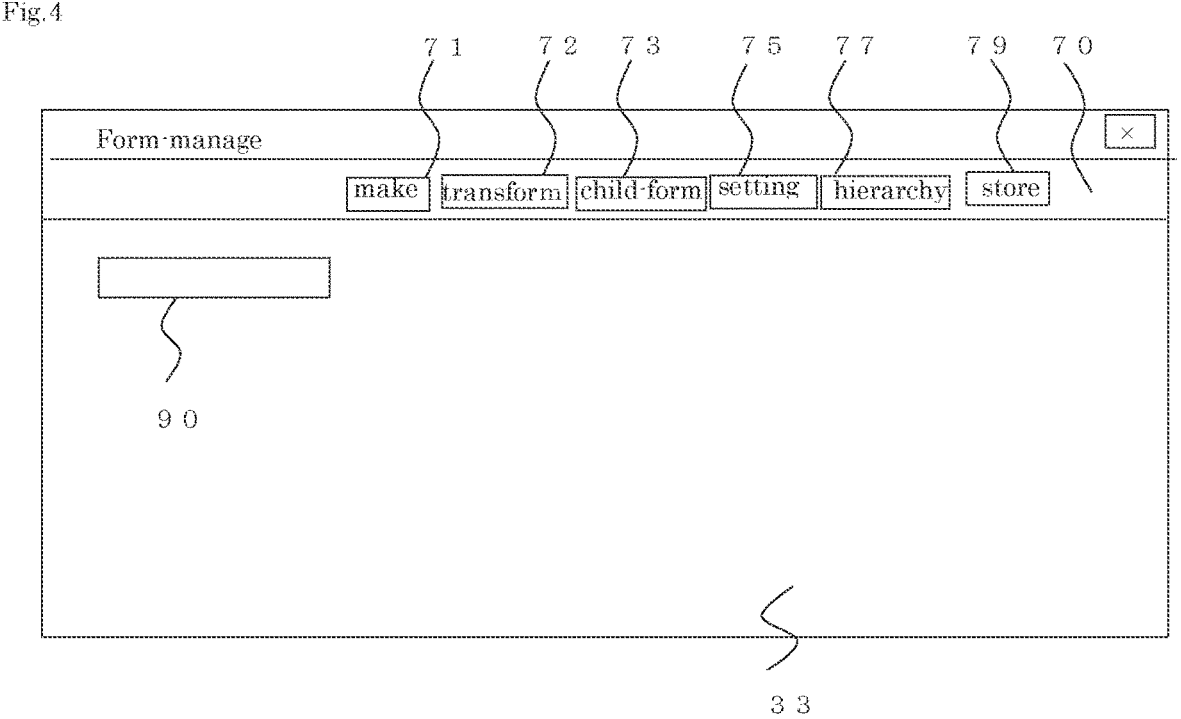
FIG. 4 depicts a form-manage application screen in the system of the embodiment.

When a user clicks a button corresponding "form manage application program" that is an application program controlling features implicated in the invention on the "program menue" 32, The environment controlling program fetches the source program of the "form manage application program" from a determined storing position in the external memory 18, and activates the program by deploying the program in the execution format on an appropriate area of the internal memory 16 and displays, for example a form manage application screen 33 shown in FIG. 4 on the display screen 20a.

The object of the form manage application is managing information using a form on the desktop screen 30, and thereto functions such as "form making", "transform", "retrieval", "store", and "setting" etc. are provided. The functions are implemented by a system wherein the form manage application program cooperatively operates with the environment control program and the hardware making up the apparatus.

Figure 5:
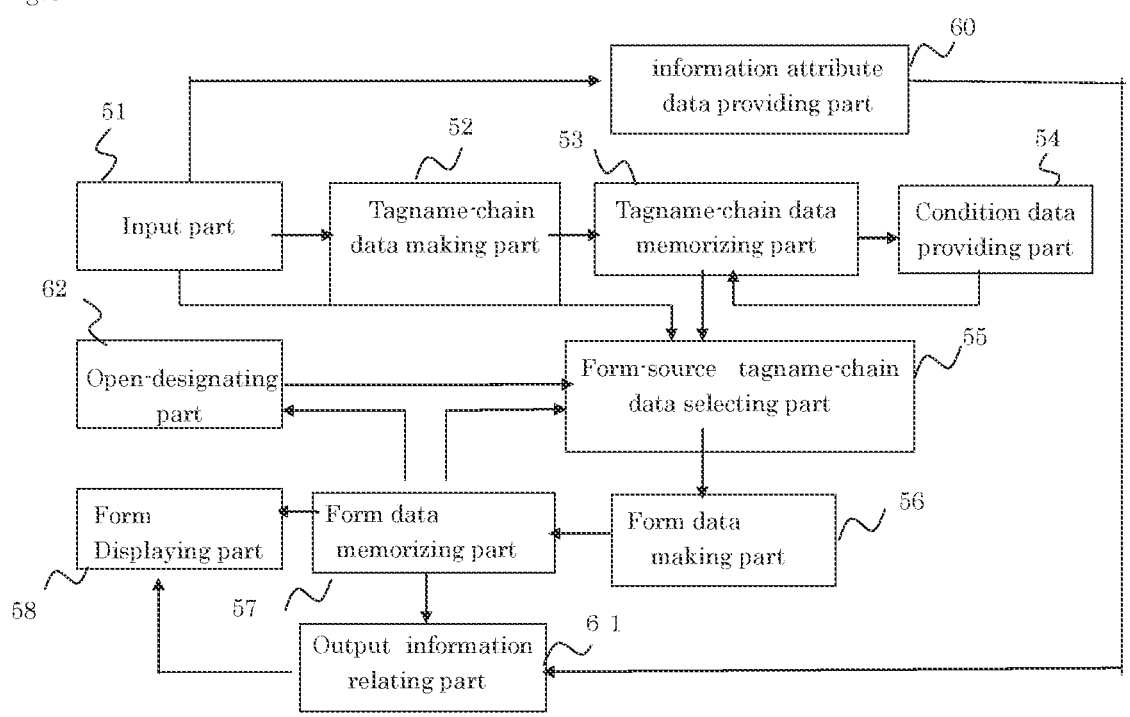
FIG. 5 depicts a block diagram of function configuration of in the system of the embodiment.

Among the implemented functions by this invention first form-transforming function is explained. The form-transforming function makes a form which provides classifying of information managed by a designated folder-tree. The classifying being equivalent to the classifying by the folder-tree, and displays icons of the information managed by the folder-tree thereon, which has configuration of the process shown in FIG. 5.

A input unit 51 inputs a folder-tree which is the object of the transforming, which comprises a display 20a displaying folders made and managed by the environment control program, input devices comprising a keyboard 12 and a mouse 14 etc, a CPU 24 executing the corresponding process, an internal memory 16 and an external memory 18 memorizing the input information for the moment.

A tagname-chain data making unit 52 makes tagname-chain data representing a tagname-chain that is a sequence of tagnames, the sequence characterizing information from a viewpoint. The part comprises the CPU 24, the internal memory 16 and the external memory 18 wherein work areas for the process are allocated.

The tagname-chain data memorizing unit 53 memorizes the tagname-chain data made, which uses a determined area of the internal memory 16 and the external memory 18.

A condition data providing unit 54 provides tagname-chain data with condition data representing the applied condition of the tagname-chain data, based on fullpathname of each folder contained by the folder-tree designated by the input unit 51 and the tagname-chain data memorized in the tagname-chain data memorizing unit 53, which comprises the CPU 24 executing the corresponding process, the internal memory 16 and the external memory 18 wherein work areas for the process are allocated.

A form-source tagname-chain selecting unit 55 selects tagname-chain data forming a form among the tagname-chain data memorized in the tagname-chain data memorizing unit 53, based on the condition data provided for the tagname-chain data and tagname-chain selecting condition input by a 62. The part comprises the CPU 24 executing the corresponding process, the internal memory 16 and the external memory 18 wherein work areas for the process are allocated.

A form data making unit 56 makes form data representing a form wherein the tagname-chain data selected by the form-source tagname-chain selecting unit 55 are located as index, which comprises the CPU 24 executing the corresponding process, the internal memory 16 and the external memory 18 wherein work areas for the process are allocated.

A form data memorizing unit 57 memorizes the form data made by the form data making unit 56, which comprises the internal memory 16 and the external memory 18.

A open-designation unit 62 outputs tagname-chain data selecting condition in a form-source tagname-chain selecting unit 55, the tagname-chain data selecting condition being determined based on a input open-designating position and the form data memorized in the form data memorizing unit 57, and thereon displays a form given open-designation. The part comprises the 20a, the input devices comprising the mouse 14 etc., the CPU 24 executing the corresponding process, and the internal memory 16 and the external memory 18 wherein work areas for the process are allocated.

A information attribute data providing unit 60 provides information managed on the folder-tree input by the input unit 51 with information attribute data representing classification by the folder-tree, which comprises the CPU 24 executing the corresponding process, and the internal memory 16 and/or the external memory 18 wherein work areas for the process are allocated.

A output information relating unit 61 relates information to a cell that is a unit output area on the form based on the form data and the information attribute data obtained for information managed on the folder-tree, which comprises the CPU 24 executing the corresponding process, and the internal memory 16 and/or the external memory 18 memorizing the output information for each cell on which the icons of information are out putted for the moment.

A form displaying unit 58 displays the form on which icons of the information is located, based on the form data memorized in the form data memorizing unit 57 and the information related to the cell on the form by the output information relating unit 61, which comprises the CPU 24 executing the corresponding process, the internal memory 16 and/or the external memory 18 memorizing the output data transformed for displaying for the moment, and the displaying apparatus 20.

Figure 6:
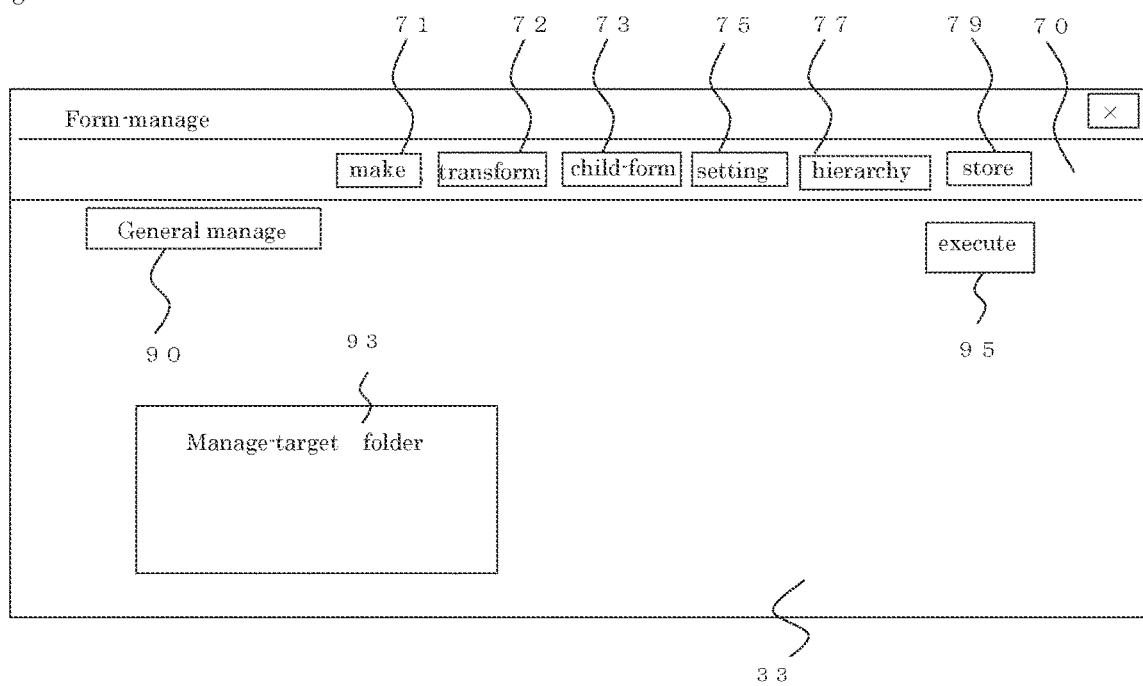
FIG. 6 depicts a form-manage application screen of form-transforming mode in the system of the embodiment.

At the beginning of the form-transforming function, a user designates the "transform" button 72 on function menu 70 on a form manage application screen 33 after opening the form manage application screen 33, and the system sets the form manage application screen 33 to form-transforming mode in response to the designation of the button 72, the form manage application screen 33 is illustrated in FIG. 6.

Figure 7:
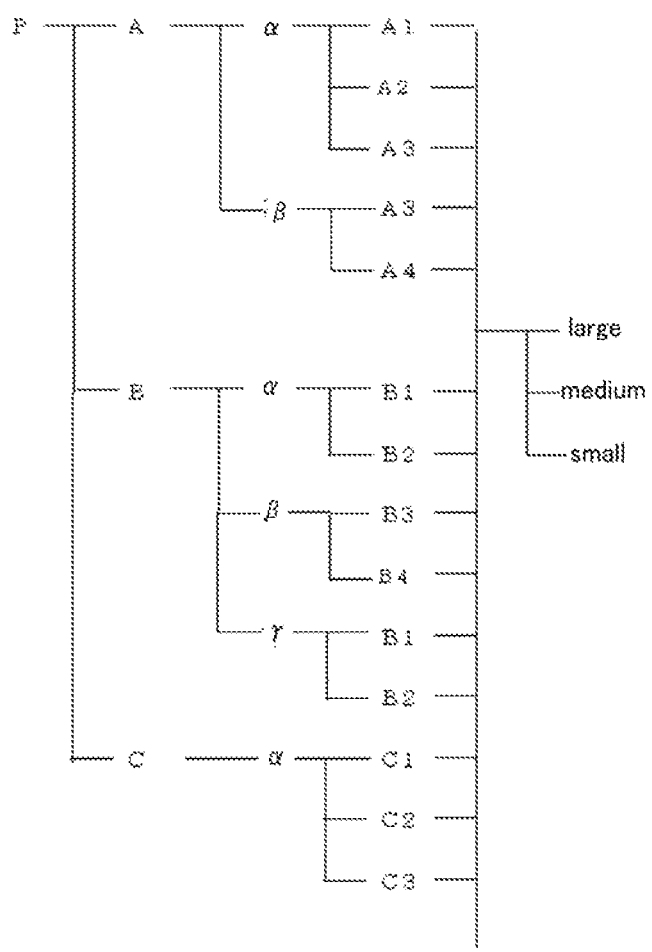
FIG. 7 depicts a folder-tree of an example in the system of the embodiment.

Hereafter the detail of the form-transforming function is explained in an example wherein a folder tree assuming a classification shown in FIG. 7 is transformed to a form. In the figure node names "large", "medium", and "small" written in the rightmost column represent a classification common for each of node names "A1", "A2", "A3", etc., "C2", "C3" written in the adjacent column in the left side of the right most column.

The user first drags an icon of the top folder of the intended folder tree on the form manage application screen 33. Hereafter the folder is named as the top folder of the transforming destination (shortly, a top folder).

In the form-transforming function a folder name of each folder constituent of a designated folder tree is placed as a tagname which characterizes managed information to be an index term of the transformed form. As the exception of the above the user can designate on the form manage application screen 33 a folder the name of which is not to be a tagname but is to be a managed target. Therein the user can click the folder using a mouse 14 in the folder tree displayed on the form manage application screen 33 and thereafter drag the folder into a manage target folder designating subscreen 93 displayed the form manage application screen 33 of the form-transforming mode.

Figure 8:
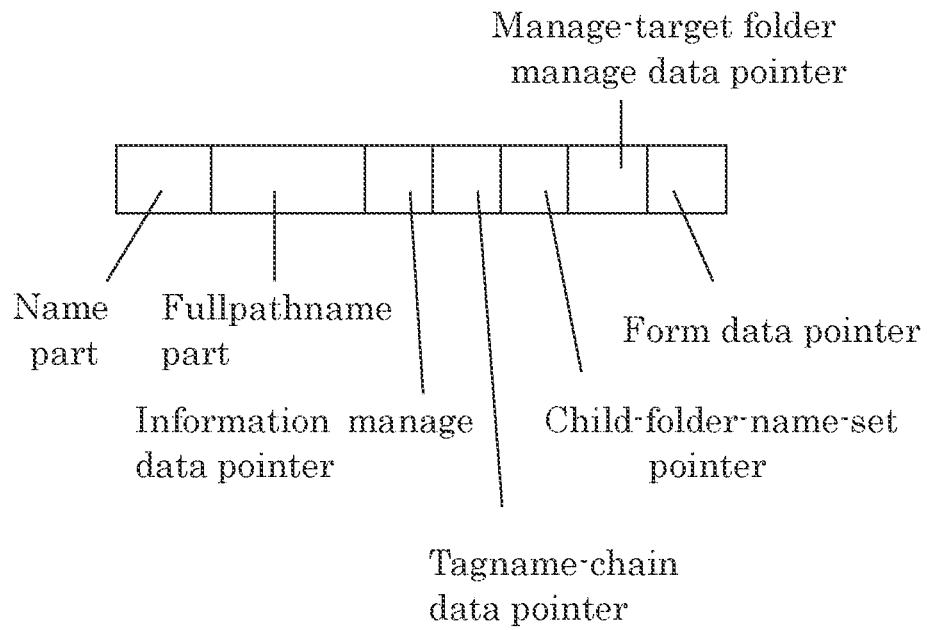
FIG. 8 depicts general manage data in the system of the embodiment.

When the user designates an execute button 95 on the form manage application screen 33 after designating the top folder and the managed target folder, the system as the process by input unit 51 makes a general managing data (FIG. 8) in response to the designation by the 95, and set the name and full-pathname respectively the lop folder in the "name part" and "the fullpathname part", to display the name of the top folder in a name field 90 on the form manage application screen 33. In the example "general manage" is displayed.

Figure 9:
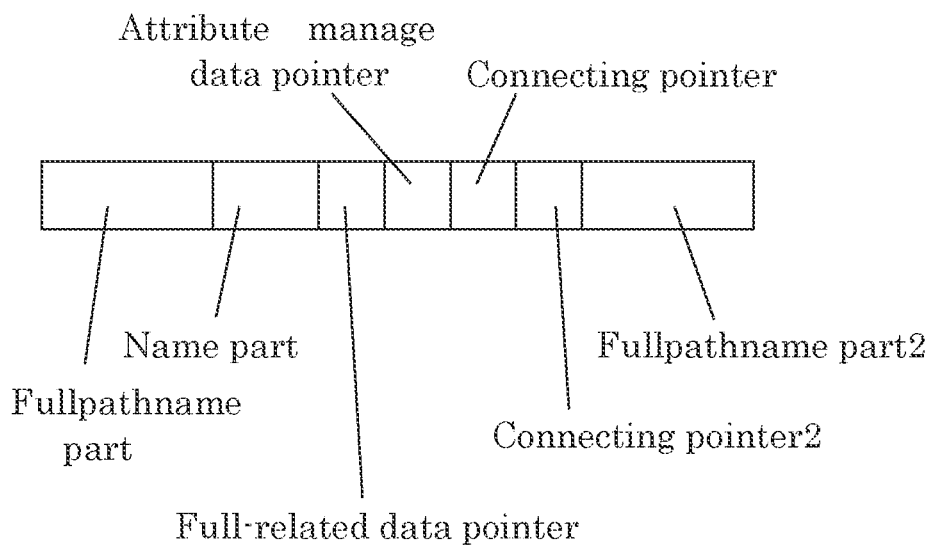
FIG. 9 depicts a data format of information manage data in the system of the embodiment.

The system furthermore makes information manage data (FIG. 9) for the folder dragged in the manage target folder designating subscreen 93, and set the name and the full-pathname respectively in the "name part" and the "full-pathname" of the data. The information manage data made for each designated folder is connected in sequence by its connecting pointer, and the address of the loading data of the sequence is set in "information manage data pointer part of managed folder" of the general manage data.

Figure 10:
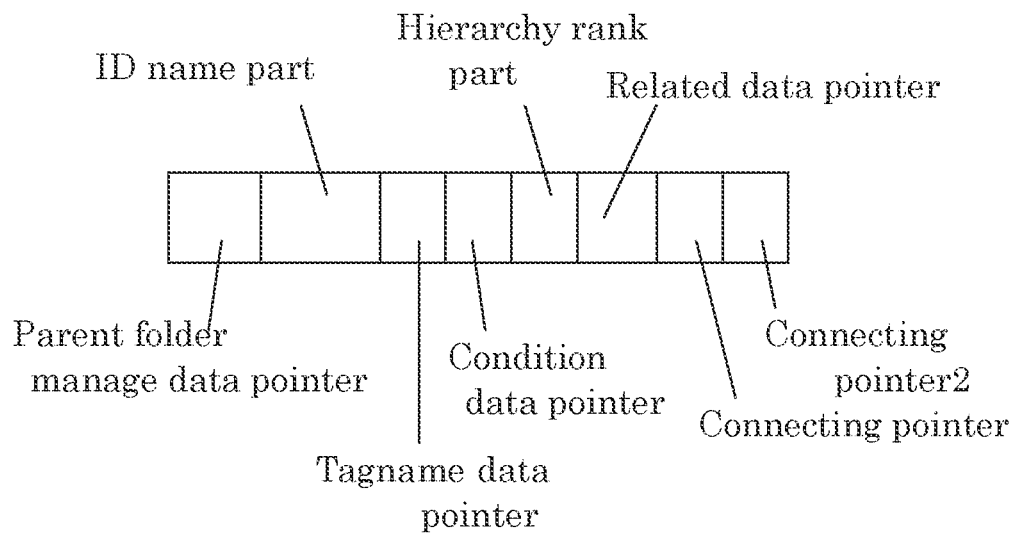
FIG. 10 depicts a data format of tagname-chain data in the system of the embodiment.
Figure 11:
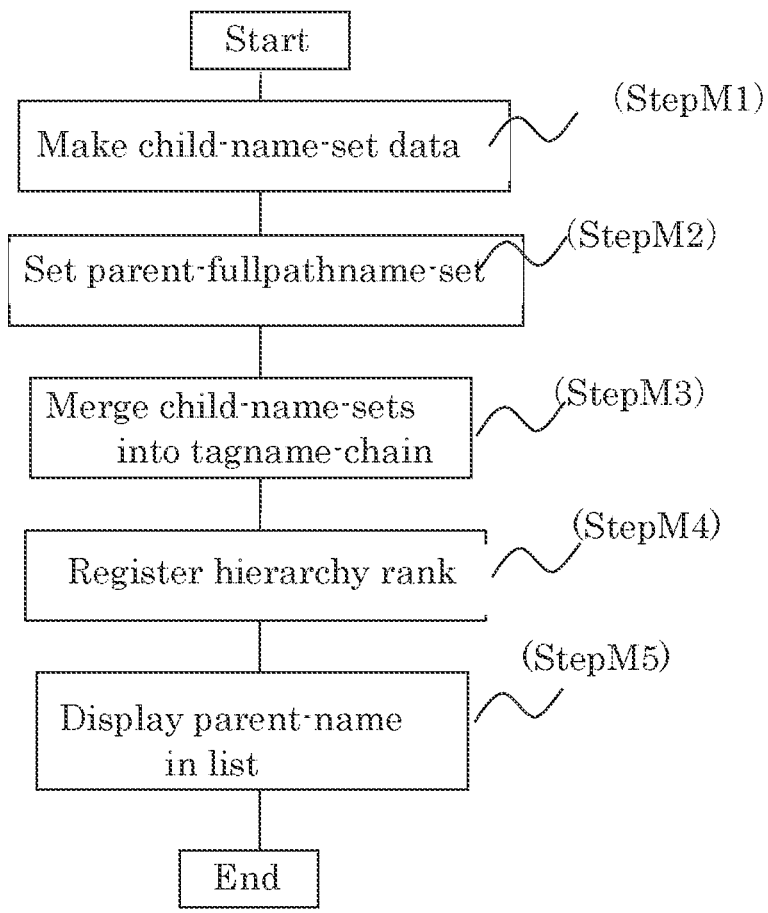
FIG. 11 depicts a procedure of tagname-chain data making process in the system of the embodiment.

The system subsequently execute a tagname-chain data making process which makes tagname-chain data (FIG. 10) representing tagname-chain that is a set of tagnames characterizing information from a viewpoint, based on names of child-folders stored directly in each folder constituting the folder tree. The sequence of the tagname-chain data making process is illustrated in FIG. 11.

Figure 12:
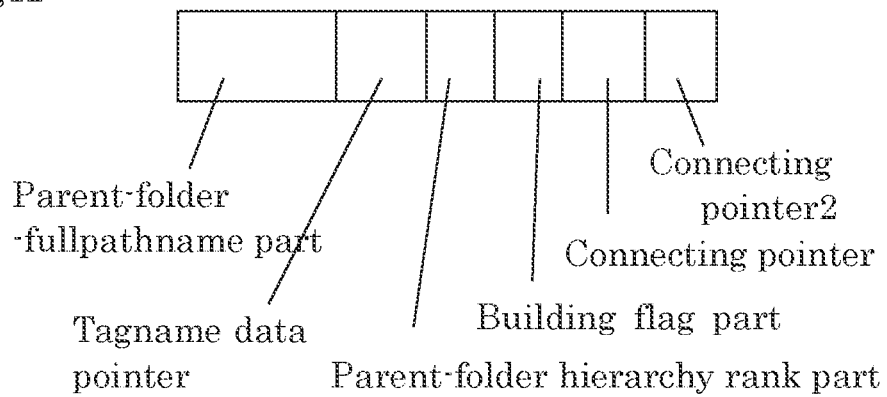
FIG. 12 depicts a data format of child-fold or chain data in the system of the embodiment.

The tagname-chain data making process first recognizes child folders stored directly in each folder constituting the designated folder tree by a known method and registers a child-folder-name-chain. that is a set of name of the child folder recognized on the child folder-name-chain data (FIG. 12) made for the folder (Step M1).

Figure 13:
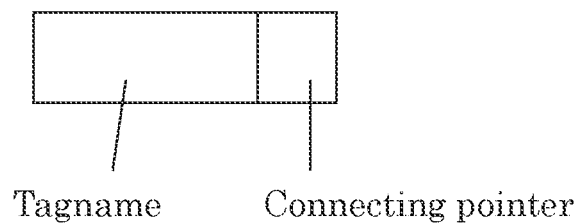
FIG. 13 depicts a data format of tagname data in the system of the embodiment.

Step M1 makes tagname data (FIG. 13) for each of the child folders recognized, on the data part of which the name of the folder being set, and sets the addresses of the leading data of the tagname data chain in the "tagname data pointer" of the child-folder-name-chain data, each tagname data being connected by its "connecting pointer" to form a tagname data chain.

In the "parent-folder full-pathname part" and the "parent-folder rank part" of the child-folder name-chain data, the full-pathname and the hierarchy rank of the parent folder of the corresponding child folders is respectively set. The hierarchy rank of the parent folder can be obtained based on the number of the pathnames constituting the full-pathname.

Each of the child folder name-chain data made is connected each other by its "connecting pointer" to form a child folder-name-chain data chain, the leading data of which is set in the "child folder-name-chain data pointer" of the general manage data.

The system subsequently identifies a set of parent folders as a child folder sharing set, for each of the set a child folder name chain registered in the child-folder-name-chain data chain is recognized, and each of the set sharing at least a same child folder with another of the set. And the system registers a parent fullpathname set on the tagname-chain data made for the identified child-folder sharing set, the parent full-pathname chain being a set of the full-pathname of the folders constituting the identified child folder sharing set (Step M2). Herein the parent full-pathname set is registered in parent manage data in the tagname-chain data as ID data identifies the tagname chain data.

Figure 14:
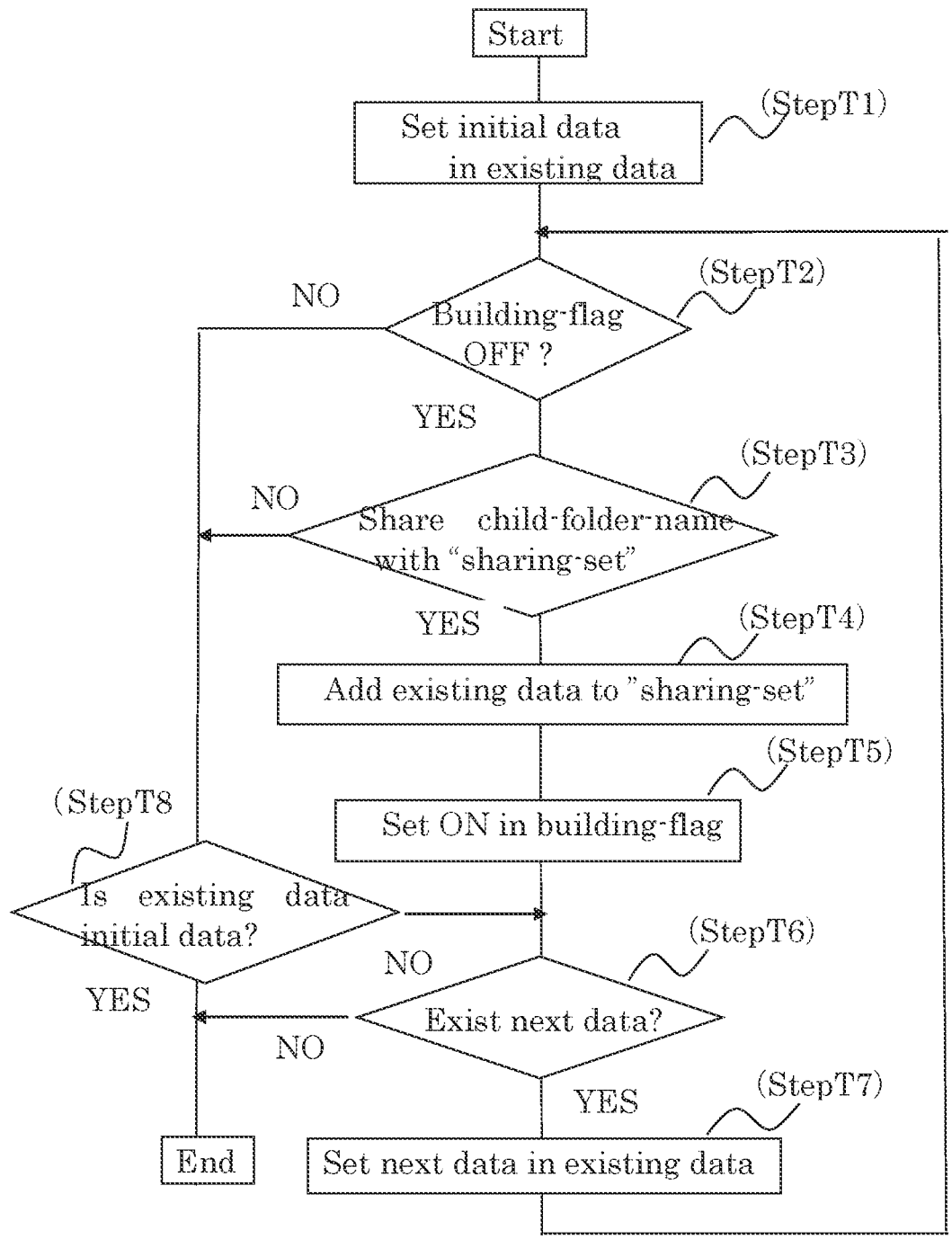
FIG. 14 depicts a procedure identifying child-folder sharing set in the system of the embodiment.

A child-folder sharing set can be identified as below. After setting the corresponding parent fullpathname set to be a empty set as a initial setting, the procedure illustrated in FIG. 14 is repeated for each child-folder-name-chain data recognized in sequence as a first child-folder-name-chain data in the child-folder-name-chain data chain made.

The procedure sets the first child-folder-name-chain data as "the existing data" that is child-folder-name-chain data recognized in sequence in the procedure repeated hereafter (StepT1).

The procedure subsequently refers the "building flag part" of the existing data. Then if a initial value is set in the "building flag part", the procedure proceeds to StepT3, while if a special value different from the initial value is set in the "building flag part", the procedure branches to StepT8 (StepT2).

In subsequent StepT3, it is judged that a folder the full-pathname of which is registered in the "parent-folder full-pathname part" of the existing data shares at least a child-folder name at least with another folder the full-pathname of which constitutes the parent-fullpathname set. If the judge is obtained the full-pathname set in the existing data is added to the parent full-pathname set (Step T4), and if the judge is not obtained the process branches to Step T8.

Figure 15:
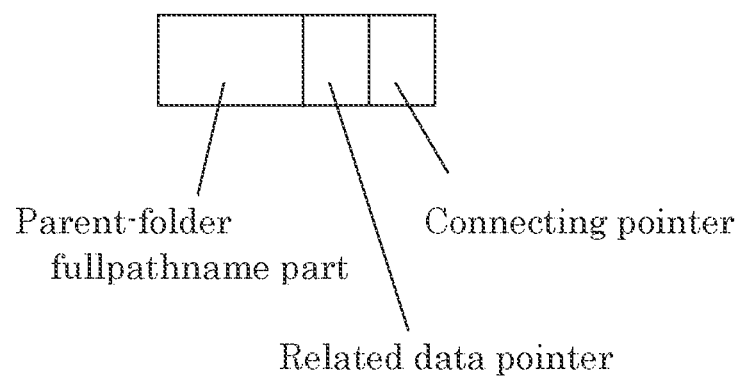
FIG. 15 depicts a data format of parent-folder manage data in the system of the embodiment.

In StepT4 each of parent-fullpathname consisting the parent full-pathname set is set in the "parent folder full-pathname part" of parent folder manage data (FIG. 15) made for each parent folder full-pathname, and the parent folder manage data made is connected by its connecting pointer to form a parent-folder manage data chain with its loading data being set in the "parent folder manage data pointer" of the corresponding tagname-chain data.

In Step T8 it is judged that the existing data is not the first child-folder-name-chain data. If the judge is obtained the process proceeds to Step T6, and if the If the judge is not obtained it is ended.

In Step T5 subsequent to StepT4, the above special value is set in the "building flag part" of the existing data, and then the process proceeds to the judge in StepT6.

In StepT6, it is judged that next child-folder-name-chain data is connected with the existing data in the child-folder-name-chain data chain. If the judge is obtained, the next data is set as the existing data (Step T7), and subsequently the process returns to StepT2 again. On the other hand if the judge is not obtained, the process ends.

In the example, parent folder manage data which is made for a child-folder-name-chain (A1,A2,A3) and has a full-pathname "*¥*¥P¥A¥甲" registered and parent folder manage data which is made for a chfset (A3,A4) and has a full-pathname" *¥**¥P¥A¥乙 " registered therein are connected each other, and the both data are managed by the "parent folder manage data pointer" of the tagname-chain data made for a tagname-chain {A1, A2, A3, A4} generated by merging the two tagname-chain.

The system next makes a tagname-chainformationr each of identified child-folder-name sharing set by merging child-folder-name-chains registered in the child-folder-name-chain data on the "parent-fullpathname part" of which a parent-folder fullpathanme constituent of the corresponding parent-fullpathname set is registered, and registers the tagname-chain on the tagname-chain data (Step M3).

StepM3 recognizes in sequence repeatedly constituent data from parent-folder manage data chain registered in the tagname-chain data, and identifies child-folder-name-chain data with a parent-folder fullpathname registered in its "parent-folder fullpathname part", the parent-folder full-pathname being registered in the recognized parent-folder manage data, so as to merge the child-folder-name-chains registered in the identified child-folder-name-chain.

First the leading address of a tagname chain pointed by child-folder-name-chain data is set in "tagname data pointer" of the tagname-chain data, the child-folder-name-chain data having a parent-folder fullpathname registered therein, which is registered in the parent-folder manage data first recognized, then only child-folder-names different from all tagnames constituent of the tagname chain pointed the tagname-chain data are selected from child-folder-name-chain registered in child-folder-name-chain data recognized in sequence are added to the tagname-chain data repeatedly.

Tagname-chain data made as above are connected in sequence with its "connecting pointer" so as to form total tagname-chain data chain, the address of the leading data set in the "tagname-chain data pointer" of the general manage data, Tagname-chain {A,B,C}, {α,β,γ}, { }, {A1,A2,A3,A4}, {B1,B2}, {B3,B4}, {(C1,C2,C3} and {large,medium, small} are obtained by merging folder constituent of the folder tree of the example.

In addition in SteoM3 as ID data identifying tagname-chain data, an ID name defined uniquely for the tagname-chain can be used additionally. The defined ID name is set in "ID name part" of the tagname-chain data. An item name as ID data can be generated automatically by the system. For example numerical character representing the generating sequence can be provided. For example "1" is provided the tagname-chain {A, B, C}, "3" is provided to tagname-chain {A1, A2, A3, A4}, and "6" is provided to tagname-chain {large,medium,small}.

Tagname_chain data making process registers a number in the "hiearchy rank part" of each tagname-chain data, the number being generated by adding "1" to "parent-folder hiearchy rank" registered in the child-foldername-chain data which are merged so as to generate the child-folder-name-chain (StepM4). In the case plural parent folders are found for one of tagname-chain data, the average number of numbers obtained by adding "1" to the hierarchy rank of the parent folders.

The tag-name_chain data making process displays at the end a parent folder displaying screen 210 made as described above on the 33 and subsequently allocates each tagname-chain data to each parent folder display field 213, each parent folder display field 213 being located on a row of the parent folder displaying screen 210, on each parent folder display field 213 the icons of folders constituent of the corresponding child folder sharing set being located and displayed in sequence (Step M5).

Figure 16:
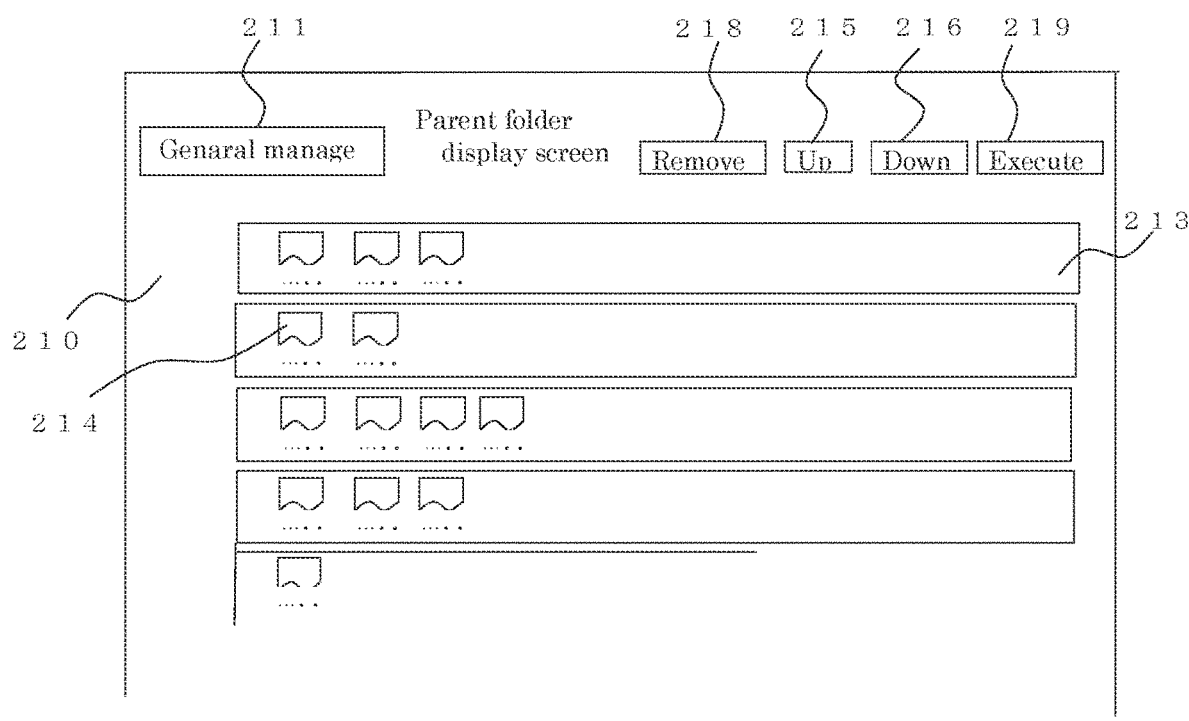
FIG. 16 depicts a parent-folder displaying screen in the system of the embodiment.

In the example the parent folder displaying screen 210 shown in FIG. 16 is displayed. In a parent folder display field 213 icons 214 each of which represents the corresponding folder are located at a regular intervals with the corresponding pathname appended below to it.

A user can do instruct the system to eliminate a folder or folders classifying from a classifying viewpoint different from that of the other folders located in the same parent folder display field 213.

For example, in the case a folder the name of which is "2010" classifying from a classifying viewpoint of "occurrence date" is located mixed in the parent folder display field 213, in which the folder name "2009" and "2010" etc. from a classifying viewpoint of "making date" are located, a folder classifying from a classifying viewpoint of "occurrence date" is to be removed.

A user can recognize the classifying viewpoint of each folder displayed in a parent folder display field 213 by the operation mentioned below. First, after having a folder screen displayed by a double-click on the folder using 14, thereon the user can recognize information and child folders contained directly by the folder.

Further after clicking a folder displayed on a parent folder display field 213 using 14 for example, the user can have the folder screen of the parent folder of the corresponding folder displayed by designating 215 located on the parent folder displaying screen 210. Furthermore by repeating to designate 215 on the parent folder displaying screen 210 after designating the displayed folder screen by 14, the user can display in sequence the folder screen of a folder superior by a rank to the folder.

In the above operation the system first identifies tagname-chain data allocated to a parent folder display field 213 identified based on the designating position by the 14, and can identify the designated folder by repeating to recognize each parent folder fullpathname in sequence from the parent folder manage data attached to the identified tagname-chain data, then so as to determine the locating position of the folder corresponding to each of the recognized parent folder fullpathname and, then to match each of the determined position to the clicking position by the 14.

If the user intends to remove a folder or folders from each parent folder display field 213 on the parent folder displaying screen 210, the user has only to click the folder with the 14 and designate the "Remove" button 218 on the parent folder displaying screen 210.

The tagname-chain data making unit 52 identifies the parent-folder manage data of the clicked folder according to the above procedure in response to the designation of the "Remove" button 218, and subsequently removes the parent-folder manage data from the parent-folder manage data chain appended to the corresponding tagname-chain data, and newly remakes the corresponding tagname data chain based on the parent-folder manage data chain renewed by removing the designated parent-folder manage data.

On the other hand the tagname-chain data making unit 52 executes a process to recognize the child-folder sharing set described above, makes newly tagname-chain data for each child-folder sharing set, and displays the parent-folder display screen 210 on the 33 again.

Figure 17:
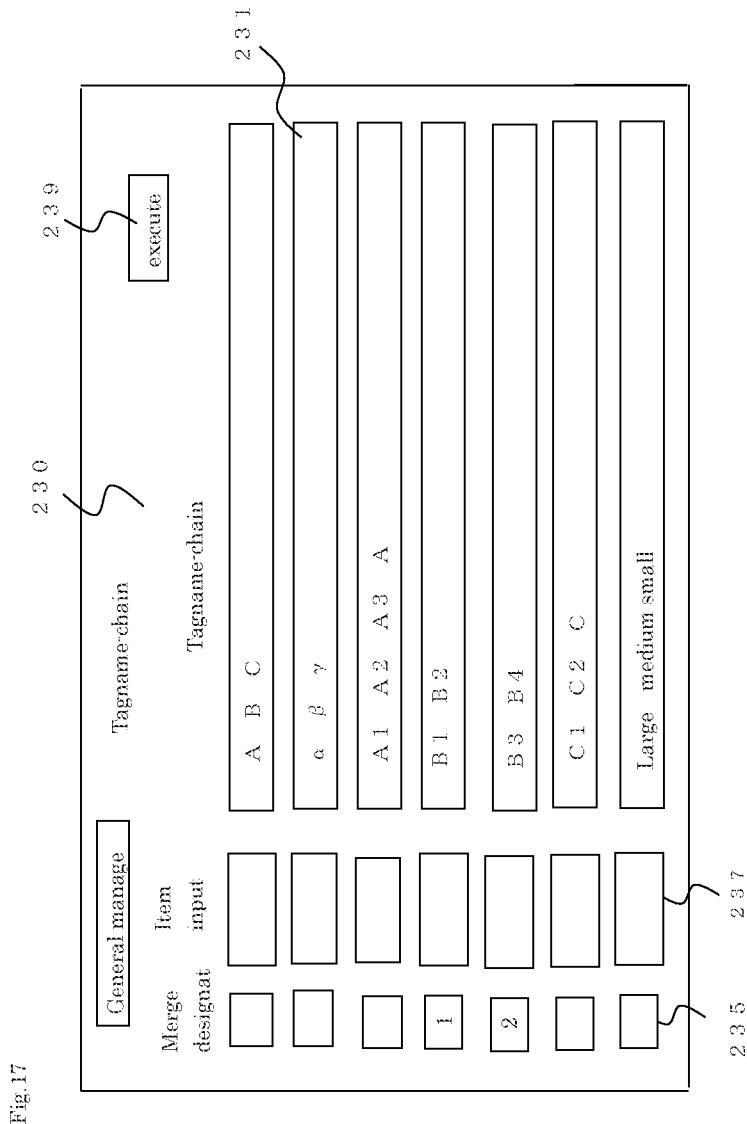
FIG. 17 depicts a tagname-chain display screen in the system of the embodiment.

When the user designates the "execute" button 219 after executing the operation to remove folders classifying from different viewpoint as described above, the tagname-chain data making process displays the tagname-chain display screen 230 on the form manage application screen 33 based on the tagname-chain data made as described above, with each tagname-chain data allocated to the tagname-chain display field 231 provided on a row of the tagname-chain display screen 230, tagnames constituent of the tagname-chain being located and displayed in sequence in each tagname-chain display field 231. In the example the tagname-chain display screen 230 shown in FIG. 17 is displayed.

On the tagname-chain display screen 230 the user designates plural tagname-chain located on the tagname-chain display field 231, which share a same classifying viewpoint but do not share common tagnames so as to be not merged to each other by the tagname-chain data making process.

The user writes a number representing the order of connecting in the merging in the merge designating field 235 provided in the leftside of the tagname-chain display field 231 located the tagname-chains to be merged using a keyboard 12, and successively designates the "execute" button 239 on the 230. In the example, as shown in the FIG. 17, "1" is written in the 235 corresponding the tagname-chain {B1,B2}, and "2" is written in the 235 corresponding the tagname-chain {B3,B4}.

In the item name input field 237 provided in the left side of each tagname-chain display field 231, the item name of the corresponding tagname-chain can be input. The input item name is to be defined uniquely as data identifying the corresponding tagname-chain in the hierarchy form, and is set in the " " of the tagname-chain data.

Responding to the designation by the "execute" button 239 the system deletes the tagname-chains on the tagname-chain display screen 230, and displays a new tagname-chain generated by the merging on the tagname-chain display field 230.

The system connects tagname-data-chains pointed the tagname-chain data designated by the designation to the merge designating field 235, by its "connecting pointer" in the designated order and has the connected the tagname-chain pointed by one of the merged tagname-chain data. Further, parent-fullpathnames provided to each of the merged tagname-chain data are merged together and the merged parent-fullpathnames are provided to the tagname-chain data pointing the merged tagname-chain.

Figure 18:
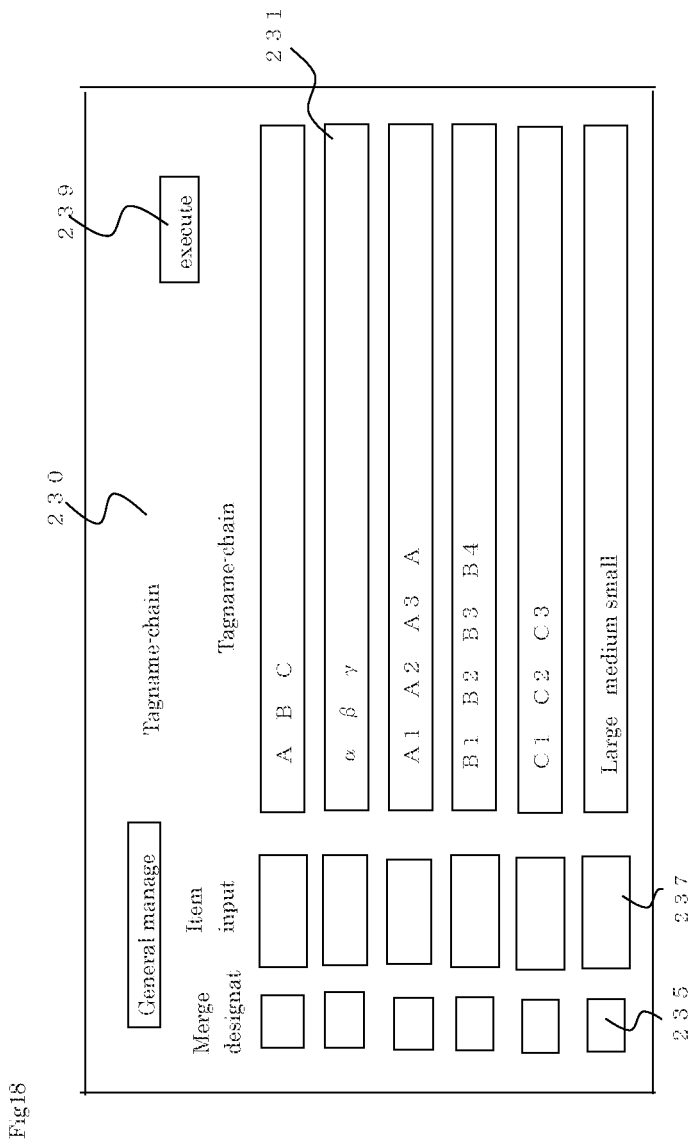
FIG. 18 depicts a tagname-chain display screen after merge-designation in the system of the embodiment.

In the example the designated two tagname-chains {B1, B2} and {B3,B4} are deleted and a tagname-chain {B1,B2, B3,B4} generated by the merging is newly displayed one tagname-chain display field 231 (FIG. 18).

Figure 19:
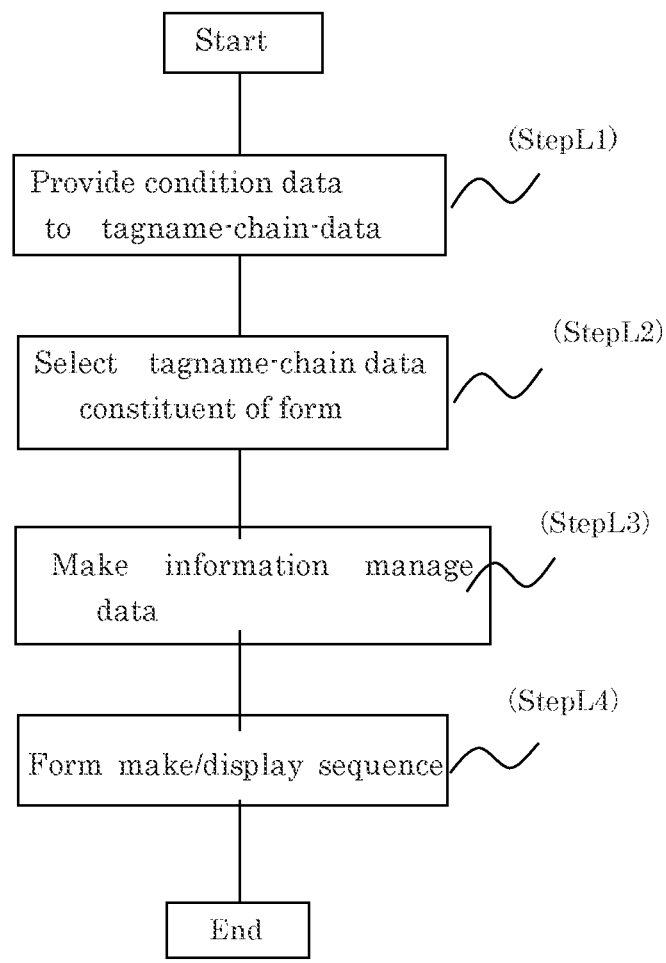
FIG. 19 depicts a overall procedure of form transforming process in the system of the embodiment.

In response to a designation by the user to the execute button 239 on the screen, the system starts the form-transforming process (FIG. 19). First as a process by the condition data providing unit 54 condition data is made for each tagname-chain data which represents condition by which the classification by the tagname-chain is applied, and is pointed by "condition data pointer" of the tagname-chain data (Step L1).

Figure 20:
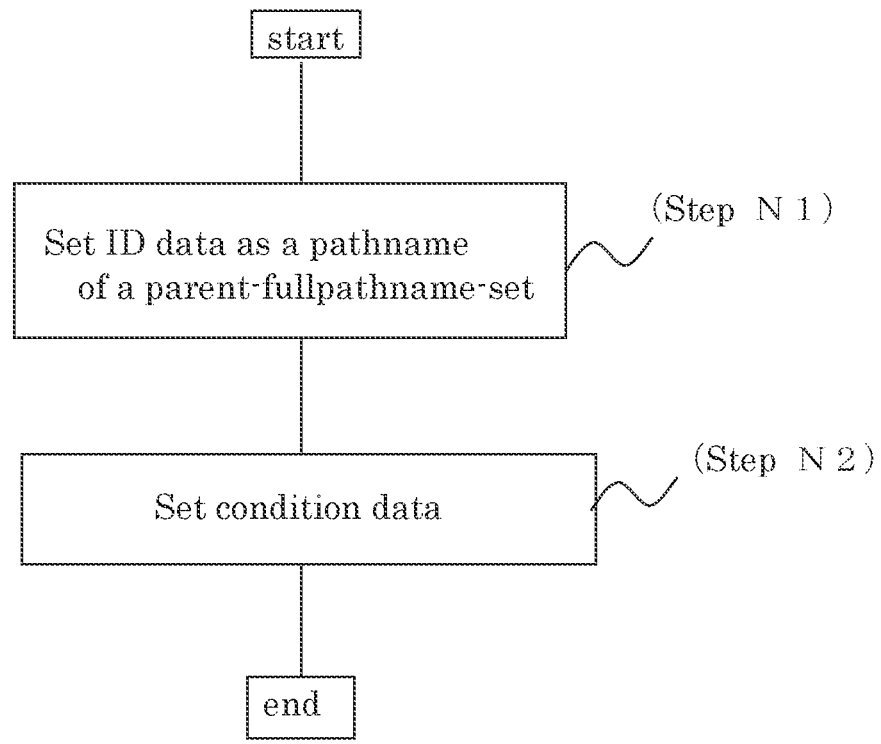
FIG. 20 depicts a procedure of condition data making process in the system of the embodiment.

StepL1 is executed according to a sequence illustrated in FIG. 20. First ID data as described below is given to each pathname constituent of each parent-folder-fullpathname given to the tagname-chain data (Step N1). Step N1 identifies for each pathname a parent full-pathname, the parent full-pathname being determined corresponding to a parent pathname that is a pathname located adjacent upper to the pathname in the parent-folder-fullpathname, and identifies a tagname-chain data the parent-fullpathname set of which contains the identified parent full-pathname, and then relates the ID data of the identified tagname-chain data to the pathname.

In the example for ID data of a pathname "α" constituent of a parent-folder fullpathname "*¥¥P¥A¥a" determined for a tagnamechain {A1, A2, A3, A4}, a parent fullpathnameset {*¥**¥P¥A, *¥**¥P¥B, *¥****¥P¥C}, or item name "2" is identified as the data identifying the tagname-chain {α,β,γ}, the parent-fullpathname set being given to the tagname-chain {α,βγ}, the tagname-chain {α,βγ} having a parent-fullpathname {\*\*\*¥\*\*\*¥P¥A} given, the parent-fullpathname {\*\*\*¥¥P¥A} corresponding to the parent pathname "A" of the pathname "α".

Furthermore for ID data of a pathname "A" constituting the parent folder fullpathname "\*\*\*¥\*\*\*¥P¥A¥α" a parent fullpathname set {\*\*\*¥\*\*\*¥P}, or item name "1" is identified as the data identifying the tagname-chain {A,B,C}, which has a parent folder full-pathname {\*\*\*¥\*\*\*¥P} of the pathname "A" registered.

Furthermore for another pathname "P" constituent of the parent-folder full-pathname "\*\*\*¥\*\*\*¥P¥A¥α", ID data cannot be made as tagname-chain data which has a parent-folder fullpathname {\*\*\*¥\*\*\*} of the pathname "P" registered is not made. For the other pathnames constituent of the parent-folder fullpathname "\*\*\*¥\*\*\*¥P¥A¥α", ID data cannot be made as well.

Figure 21:
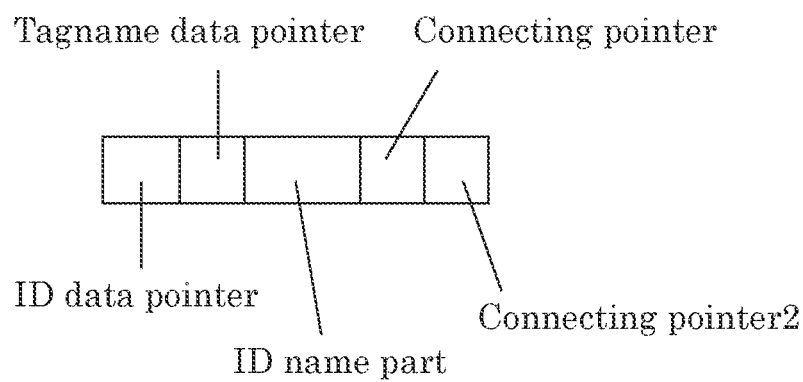
FIG. 21 depicts a data format of related data in the system of the embodiment.

ID data obtained as above for each pathname constituent of the parent folder fullpathname given to the tagname-chain data in related to the corresponding pathname in the form of related data (FIG. 21). The "ID data pointer" of th related data points the leading data of parent-folder manage data chain which has parent-fullpathname obtained as the ID data registered therein, in "ID data name part" of the rotated data a ID data name defined is set, and the "tagname data pointer" of the related data points the tagname data having the corresponding pathname registered in its data part. The "tagname data pointer" of related data can point a tagname data chain connecting plural tagname data.

Related data obtained from a parent-folder fullpathname are connected one after another by its "connecting pointer" so as to form parent-folder related data chain, so that the address of the leading data of the chain is set in the "related data pointer" of the corresponding parent-folder manage data.

Step L1 next finds ID data to which only one pathname related among ID data related to all pathnames constituent of all parent-fullpathname given to a tagname-chain data, and makes related data chain connecting related data having the identified ID data and the corresponding pathname registered therein by pointer2, so as to point the related data chain as "condition data" of the tagname-chain data by its "condition data pointer" (Step N2).

A number of the kind of the corresponding pathnames can be obtained as a number of groups of related data, the corresponding pathname being determined for each ID data related to each pathname constituent of the parent fullpathname set appended to the tagname-chain data, the group of the related data being obtained by grouping realalod data on which tagnames of a same name are registered, and the corresponding ID data is registered, among the related data constituent of the parent-folder related data chain.

For example among ID data corresponding to each pathname constituent of the parent fullpathname set {\*\*\*¥\*\*\*¥P¥A¥甲, \*\*\*¥\*\*\*¥P¥A¥β} given to the tagname-chain {A1、A2、A3、,A4}, {\*\*\*¥\*\*\*¥P} to which only pathname "A" is related is selected, so that the related data in which ID date "\*\*\*¥\*\*\*¥P" (or "1") and a tagname "A" are registered in couple is identified as the condition data.

The form-transforming process next as a process by the form-source tagname-chain selecting unit 66 executes form-source data selecting process which selects form-source tagname-chain data, that is a set of tagname-chain data tagname-chains of which are located as index terms on a form based on condition data given to tagname-chain data among tagname-chain data made as above (Step L2).

Figure 22:
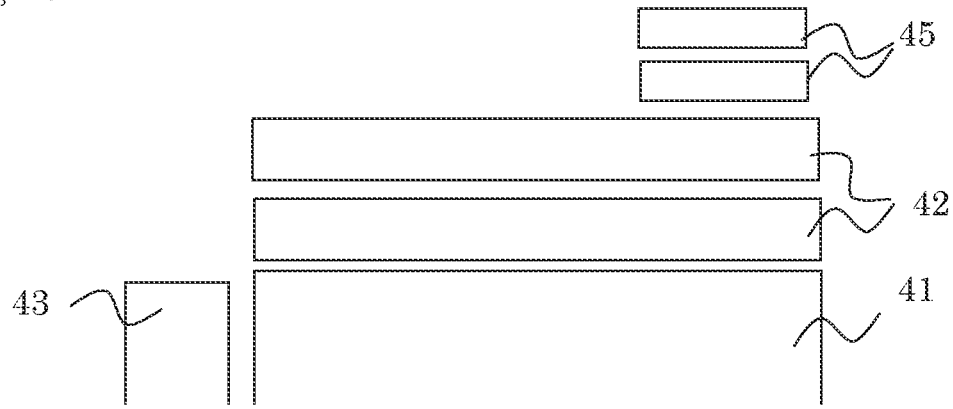
FIG. 22 depicts a format of a form in the system of the embodiment.

A form which the form management application handles is made according to the format illustrated in FIG. 22. That is, a form consists of an icon field 41, a horizontal index field 42 and a vertical index field 43, wherein the horizontal index field 42 are placed directly upside of the icon field 41, and the vertical index field 43 are placed directly leftside of the icon field 41. Now the horizontal index field 42 and the vertical index field 43 are called jointly.index term field.

In the icon field 41, cells, that is a rectangular area are placed in a form of matrix, in the cell icons of information being displayed as managing targets. In index term field tagnames characterizing cells in the icon field 41, are placed, with each of the tagnames being placed as a index term of the corresponding cell in the icon field 41 in the same row or in the same column as the cell.

A tagname-chain is allocated to an index term field, and an index term field is located on a row or a column of the form.

An index term field is divided into cells, each of the cells being a rectangular area wherein a tagname is written. And the icon field 41 is divided by prolonged lines, which separate each cell in each index term field, so as to form a matrix of cells above mentioned. A form the form manage application handles can be made freely as long as the format complies with the format.

In the case all the tagname-chain constituent of the total tagname-chain data chain cannot be located in a form, the tagname-chain data are allocated to plural forms constituting a hierarchy form. Each form constituent of the hierarchy form is related each other form in the tree form. When a user gives a specified open-designating operation to a cell in the icon field 41 of a form constituent of the hierarchy form (for example double click operation by a mouse 14), another form correlated as a child-form to the designated cell is opened as a open-form on the form manage application screen 33.

Figure 23:
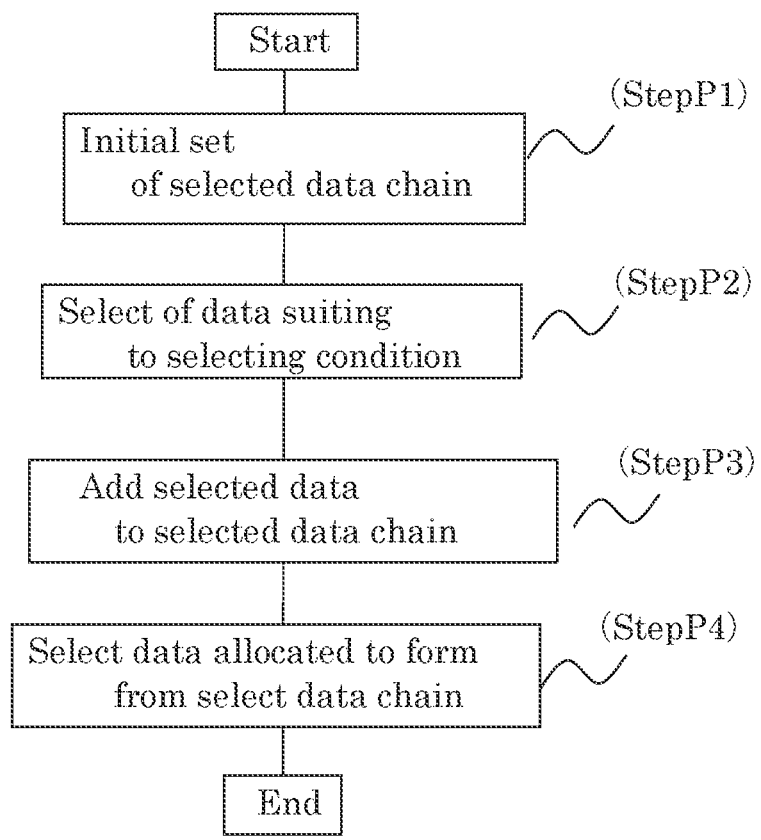
FIG. 23 depicts a procedure of form source data selecting process in the system of the embodiment.

In the system the process selecting tagname-chain data allocated on a form constitunt of a hierarchy form is executed according to the form-source data selecting sequence, and in the case forms made based on a total tagname-chain data chain build a hierarchy form, the sequence is executed for the top form of the hierarchy form. The sequence is illustrated in FIG. 23.

Figure 24:
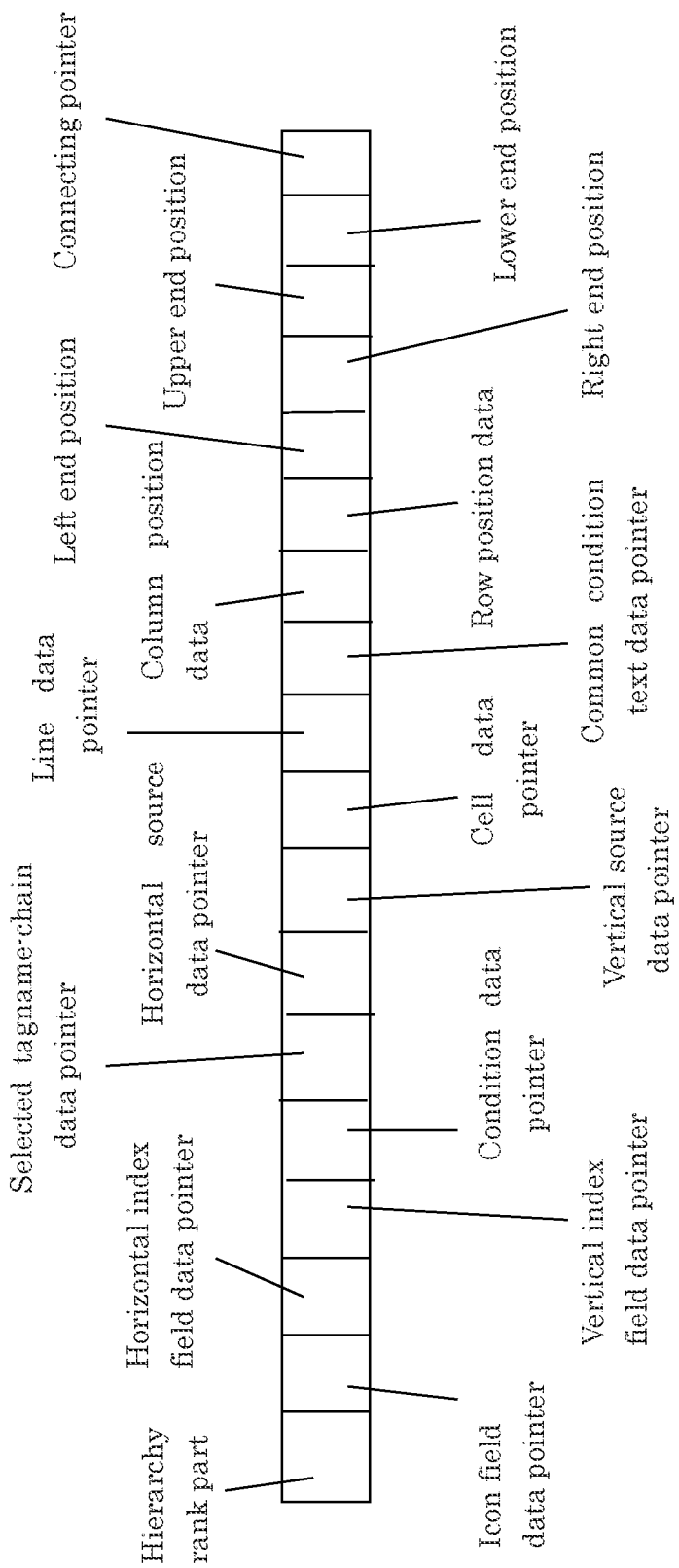
FIG. 24 depicts a data format or form manage data in the system or the embodiment.

The sequence first makes the form manage data (FIG. 24) managing data implicated in the intended form, and initializes the tagname-chain data selecting condition and the selected tagname-chain data chain, that is a set of tagname-chain data selected (Step P1).

In Step P1 as the tagname-chain data selecting condition "NULL" is set (data configuration representing tagname-chain data selecting condition is described below), the tagname-chain data selecting condition is pointed by "the selected tagname-chain data pointer of the form manage data, and in the case of the leading form "NULL" is set in the pointer. Further "0" is set in the "hierarchy rank part" of the form manage data of the leading form. The inializing of the tagname-chain data selecting condition and the selected tagname-chain data chain in the case of open-form is described below, the open-form being displayed by open-designation on another form after the displaying of the loading form.

Successively tagname-chain data d which comply the tagname-chain data selecting condition are selected among the total tagname-chain data chain (Step P2). Now in the case of the leading form tagname-chain data having no condition data is selected as tach data complying the tagname-chain data selecting condition as which "NULL" is set as described above.

The form-source data selecting sequence subsequently connects the selected tagname-chain data one after another in sequence by its connecting pointer2, and adds the connected data to the selected tagname-chain data chain (Step P3). In the case of the leading form the initial selected tagname-chain data chain is made from tagname-chain data selected in step P2, and in general the address of the leading data of tagname-chain data selected in Step P2 is set in the connecting pointer2 of the last data of the selected tagname-chain data chain.

The sequence next selects tagname-chain data in order of its hierarchy rank from the selected tagname-chain data chain and allocates the selected tagname-chain data to each index field by a specified method (Step P4). In the case a hierarchy rank is not registered in tagname-chain data constituent of the total tagname-chain data chain, tagname-chain data is selected by a specified method, for example by a method according to its connecting order in the total tagname-chain data chain. In the case plural tagname-chain data have the same hierarchy rank the selection is done by a specified method as well.

In the example first tagname-chain data is allocated to the horizontal index field 42 and next tagname-chain data is allocated to the vertical index field 43. In general plural index fields can be provided for each locating direction. In the case, for example each of the selected tagname-chain data is allocated to 42 first and to 43 next repeatedly, each tagname-chain data being recognized in sequence according to its order in the selected tagname-chain. Therein each of tagname-chain data selected for the horizontal index field 42 is allocated lop-to-bottom, and each of tagname-chain data selected for the vertical index field 43 is allocated left-to-right.

The form-source tagname-chain data which is tagname-chain data allocated to each index field is eliminated from the selected tagname-chain data chain, and form-source tagname-chain data sharing the locating direction of the allocated index field are connected one after another by its connecting pointer2, so as to generate a horizontal form-source data chain and a vertical form-source data chain, the horizontal form-source data chain and the vertical form-source data chain being pointed respectively by the "horizontal form-source data pointer" or the "vertical form-source data pointer" of the form manage data. In the example tagname-chain data in which tagname-chain {A, B, C} or tagname-chain {α,β,γ} are registered is selected respectively as horizontal form-source data or vertical form-source data.

The form-transforming process next makes information manage data for each information stored in the designated folder tree as a process by the information attribute providing unit 60 (Step L3). The information manage data is made for file-information and a folder designated as a manage-target folder among information recognized from the folder tree by method known in public. The information manage data has the name and the fullpathname of the corresponding information registered in its "name part" and "fullpathname part" respectively, and is connected in sequence by its connecting pointer to form information manage data chain, with the leading data of the chain set in "information manage data pointer part" of the general manage data.

Step L3 identifies ID data for each pathname constituent of the fullpathname of each information recognized in the folder-tree by the method of Step N1 described above, so as to makes related data in which the pathname and the identified ID data are registered, and subsequently makes information attribute data which connects the related data made by "connecting pointer2" for the information so as to set the leading data of the information attribute data in "attribute manage data pointer" of the corresponding information manage data.

Figure 25:
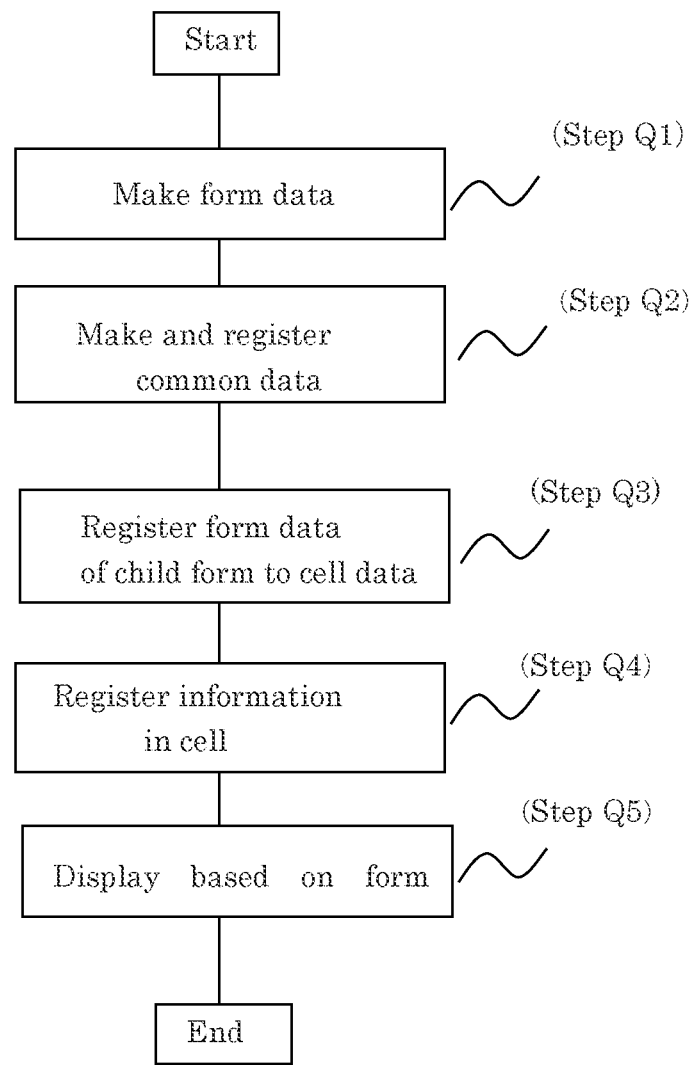
FIG. 25 depicts a procedure of form making/displaying process in the system of the embodiment.

The form transforming process subsequently as the form making/displaying sequence makes form data representing a form in its index fields of which tagname-chains selected as above are located, and displays the form based on the form data made (Step L4). The form making/displaying sequence is executed according to the sequence illustrated in FIG. 25. The sequence first makes form data representing the intended form based on horizontal form source data chain and vertical form source data chain as the process by the form data making unit 56 (Step Q1). In the specification the set of date representing a form is named as form data, form data being managed by the form manage data.

Figure 26:
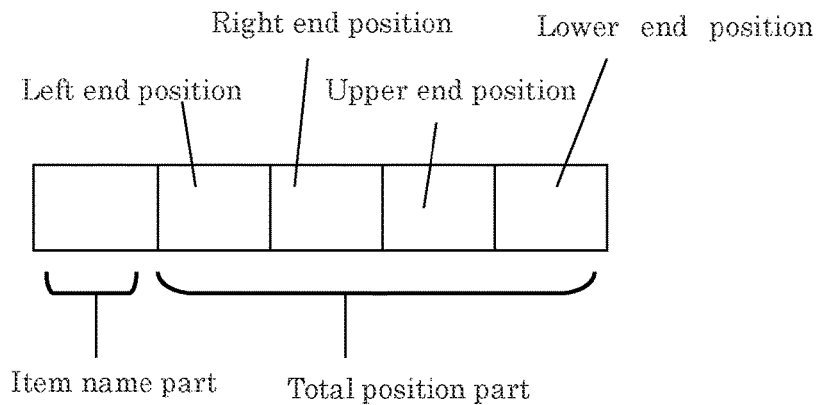
FIG. 26 depicts a data format of icon field data in the system of the embodiment.

StepQ1 first makes icon field data (FIG. 26) (Step A1). In StepA1 first in the example a term "icon" is set in the "item name part" of the icon field data as a reserved term. Further as position information representing the range where the icon field 41 is located on the form, the position of the upper end row and the leftend column is set respectively in the "upper end position part" and the "left end position part" of the "total position part". The "lower end position part" and "righ tend position part" of the "total position part" have not data registered in the present stage therein. (In step A3 described below data is set therein.)

The row position mentioned here is a row position counted from the top of the form, and the column position mentioned here is a column position counted from the left end of the form.

Herein "a row" or "a column" in the form as a unit for representing a row position or a column position can be defined as a row or column separated by lines which are the boundary of icon locating cells or divide the whole the horizontal index field 42 or the vertical index field 43 described below, the icon locating cell is a unit rectangle constituent of the 41. Herein a cell wherein indexs are written can straddle plural rows or columns.

The row position of the upside of the icon field 41 is a number which is a sum of the number of the icon field 41 and "1", and the column pos of the leftside of the horizontal index field 42 is a number which is a sum of the number of the horizontal index field 42 and "1". A number of the horizontal index field 42 and the vertical index field 43 in a form can be obtained as the number of the form-source data constituent respectively of the horizontal form-source data chain and of the vertical form-source data chain. The address of the icon field data made as described above is set in the icon field data pointer of the form manage data.

Figure 27:
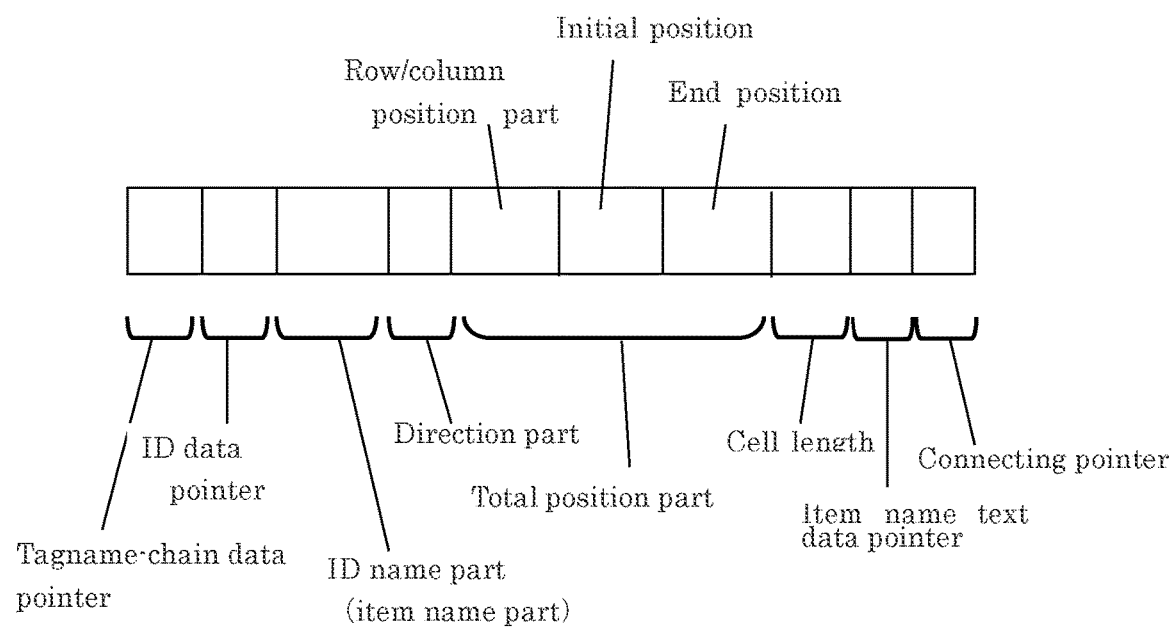
FIG. 27 depicts a data format of index field data in the system of the embodiment.

StepQ1 subsequently makes index field data (FIG. 27) for the horizontal index field 42 and the vertical index field 43 of the form (StepA2). The index field data are made based on the "horizontal form-source data chain" oand the "vertical form-source data chain set in the form manage data.

In the "item name part" of the index field data an item name corresponding to the horizontal index field 42 or the vertical index field 43 is set, and in the "direction part" of the data a code representing a direction in which the corresponding indexes are located. In the example "0" is set for the "horizontal direction" and "1" is set for the "vertical direction".

As position information representing the location or the range of the horizontal index field 42 or the vertical index field 43 in the form, a row/column position of the horizontal index field 42, or the horizontal index field 42 is set into the "row/column position part" of the "total position part". In the case the index field located in the horizontal direction the row position is set, while in the case the index field located in the vertical direction the column position is set. Into the "initial position art" and the "end position part" of the "total position part", the row/column position of the both end of the horizontal index field 42, or the vertical index field 43 is set. That is, in the case the index field located in the horizontal direction the row position of them is set, while in the case the index field located in the vertical direction the column position of them is set.

The index data made for each of the horizontal index field 42 or the vertical index field 43 are connected in sequence one after another for each "direction" in which corresponding indexes are located so as to form a index field data chain, the address of the leading data of them are set in the "horizontal index field 42 data pointer" or the "vertical index field data pointer" of the form manage data.

Figure 28:
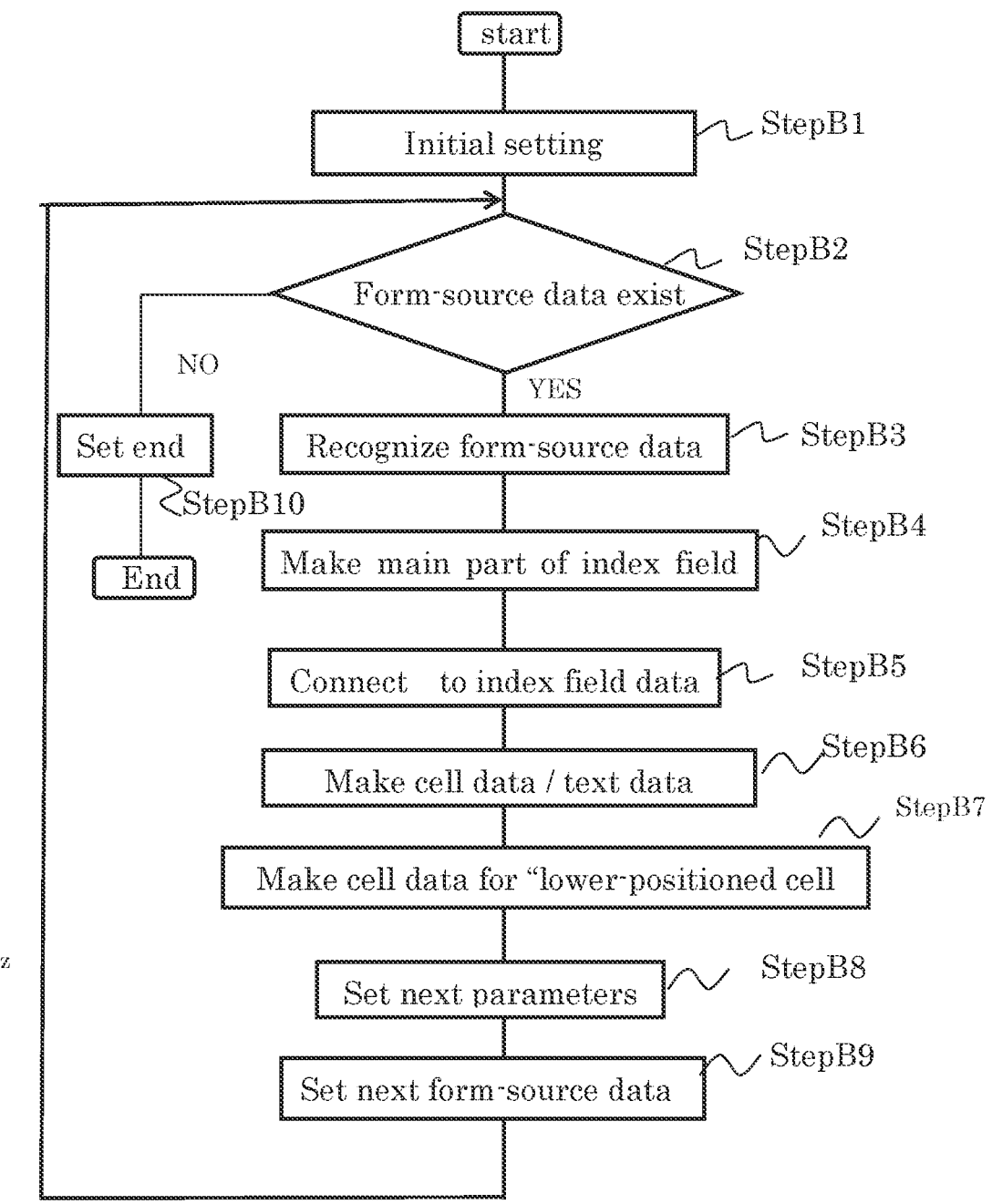
FIG. 28 depicts a procedure or index field data-chain data making process in the system of the embodiment.

Index data is made for each "direction" based on the corresponding form-source data. For example index data for the horizontal index field 42 of "horizontal direction" are made based on the corresponding "horizontal form-source data" according to the sequence illustrated in FIG. 28. The sequence sets first in the initial setting of the whole of the sequence (Step B1), a number obtained by deducting "1" from the number set in the "upper end position part" of the "total position part" of the icon field data, as a initial value of the "existing row position" parameter, the number set in the "upper end position part" being set before as the row position of the top row of the 41, the "existing row position" parameter being the row position of the target row by the process in each following process loop begin with StepB1, ending with StepB7.

In the step as the initial value of the "existing fdata pointer", that is the address of form-source data recognized from the horizontal source data chain in each loop of the process, the The address of the end data of the horizontal form-source data chain. In the case the horizontal form-source data chain has no constituent data, a specified value is set therein.

StepB1 further set "1" as the initial value of the "cell length" that is a number of columns locating in a cell. A "cell length" of a cell is a number of column or row included in the cell in the direction of the index field. The "cell longth" represents the length of cells in 42 or 43 in the direction in which the corresponding index field is located, by the number of the columns included in the direction of the corresponding index field. Here the direction of an index field is "horizontal" in the case the index field is located in a row above the 41, and is "vertical" in the case the index field is located in a column on the left of the 41.

Next the "existing data pointer" is judged, and if the data is the specified data above described, the process is ended, and if else proceeds from StepB3 onward (StepB2). In subsequent StepB3 a form-source data is recognized indicated by "the existing data pointer" on the horizontal form-source data chain.

Subsequently index field data is made in the "direction part" of which a code "0" is set. And the address of the loading data of the form-source data and the character string registered in the "ID name part" of the form-source data is set respectively in the "tagname-chain data pointer" und the "item name part" of the index field data (StepB4). And together in the "ID data pointer" of the index field data, the address set in the "ID data pointer" of the form source data.

Further StepB4 sets the value set the "existing row position" parameter in the "row/column position part" of the "total position part" of the index field data, and further sets a number set in the "left end position part" of the "total position part" of the icon field data into the "initial position part" of the "total position part" of the index field data.

Subsequently the index field data made as above is roistered in the form manage data (StepB5). The address of the index field data first made is set into the "horizontal index field 42 data pointer" of the form mange data, and the address of the index field data made thereafter is set into the connecting pointer" of the end data of the index field data.

Subsequently Step B6 makes character string data for each index located in the corresponding index field, and cell data containing the index. Bach index located in a index field can be recognized in sequence as a constituent tagname of the tagname-chain registered in the form-source data, the address of the leading data of which is set in the "tagname-chain data pointer" of the index data.

Figure 29:
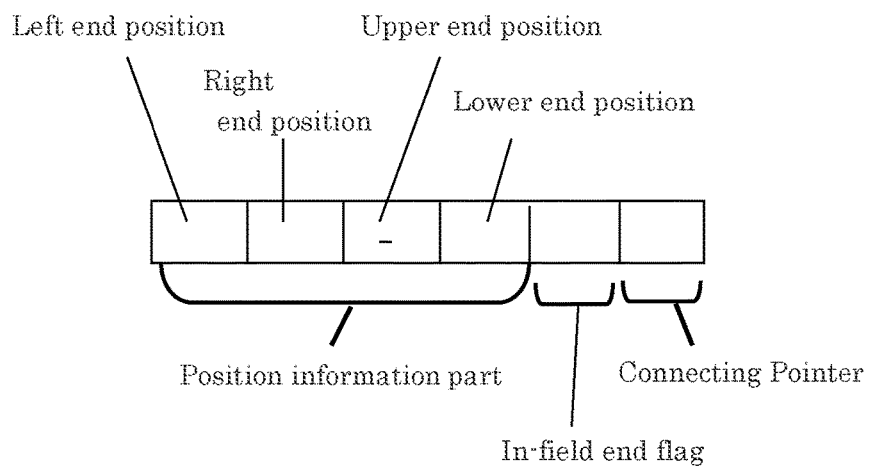
FIG. 29 depicts a data format of cell data in the system of the embodiment.
Figure 30:
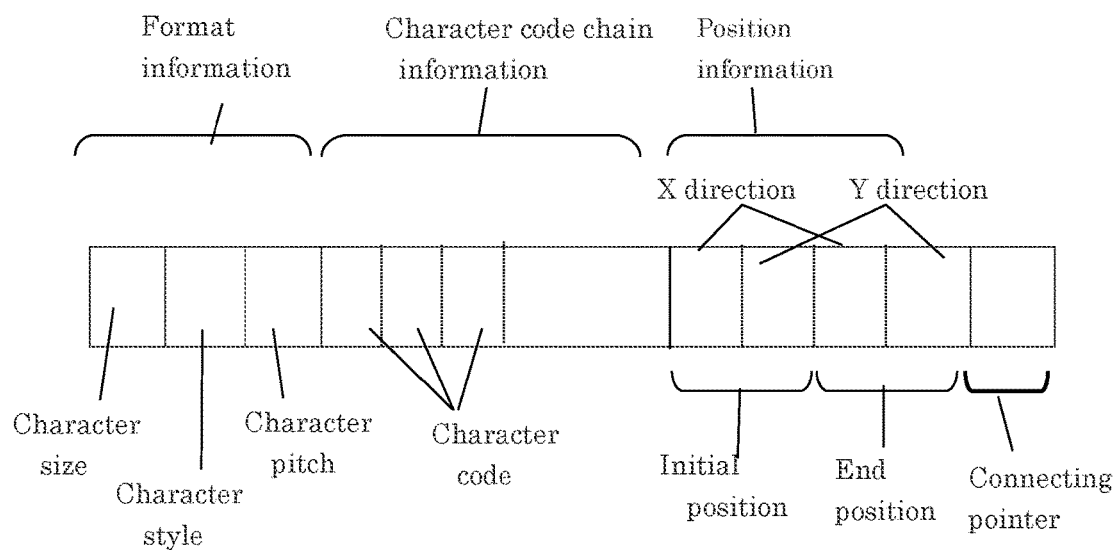
FIG. 30 depicts a data format of text data in the system of the embodiment.

The format of cell data and character string data is illustrated in FIG. 29 and FIG. 30 respectively. In the "kind part" of cell data a special value representing a cell located in index field. Character string data made is pointed by the character string data pointer of the corresponding cell data. Position data of the character string data is set in Step A6 described below.

Position information of cell data representing a cell containing a index is determined as follows. As each index belong to a index field the horizontal index field 42 is located within a row, first, the locating row position of the horizontal index field 42 registered in the "row/column position part" of the corresponding index field data is set into the "vertical initial position" and the "vertical end position" of the cell data representing the vertical position of each cell.

The "horizontal initial position" and the "horizontal end position" of cell data representing the horizontal position of each cell can be set as described below. First regarding to the leading cell located in the left-end of the horizontal index field 42, into the "horizontal initial position" of the corresponding cell data, the value set into the "initial position part" or the "total position part" of the corresponding index field data is set, and into the "horizontal end position" of the corresponding cell data, a number is set which is obtained by adding another number obtained by detracting "1" from the "cell length" to the "horizontal initial position". For example in the case the "cell length" is "1", the "horizontal initial position" and the "horizontal and position" is the same oomun position, and in the case the "cell length" is "2", the "horizontal end position" is the column position adjacent right to the "horizontal initial position".

Within the horizontal index field 42, into the "horizontal initial position" of the cell located at the next position of the leading cell, a column position is set which is obtained by adding the cell length that is "1" to the "horizontal end position" of the loading cell, and into the "horizontal and position" of the cell>A column position is set which is obtained by adding a number obtained by distructing "1" from the cell length to the "horizontal initial position" of the cell. Regarding cells located in the successive position in the horizontal index field 42, the "horizontal initial position" and "horizontal end position" can be set in the similar method.

Next index-cell information manage data is made for each cell data made for each index in the horizontal index field 42.

Figure 31:
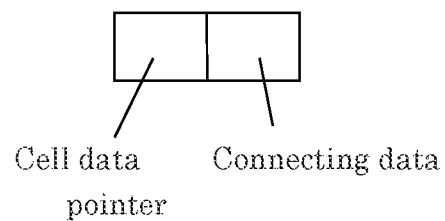
FIG. 31 depicts a data format of in-cell information manage data in the system of the embodiment.

The "cell information manage data pointer" of the index-cell information manage data made points the cell data. The format of index-cell manage data is shown in FIG. 31.

The index-cell information manage data chain made is connected one after another inorder of making by its connecting pointer so as to form index-cell information manage data chain, the address of leading data of which is set into the index-cell information manage data pointer of the index field data. The "cell information manage data pointer" of the index-cell information manage data made can point the address of the character string data in the cell data.

Each cell data made is connected ono after another by its connecting pointer in order in which it is made to form a cell data chain, the address of the loading data of which is set in " " of the form manage data. Herein regarding cell data chain made for the horizontal index field 42 recognized, the address of the leading data is connected to the end cell of the ceil data chain ponted by "cell data pointer". In addition into the "field end flag" of the cell data made lastly for the index field "1" is set, while into the part of the cell data "0" is set.

Figure 32:
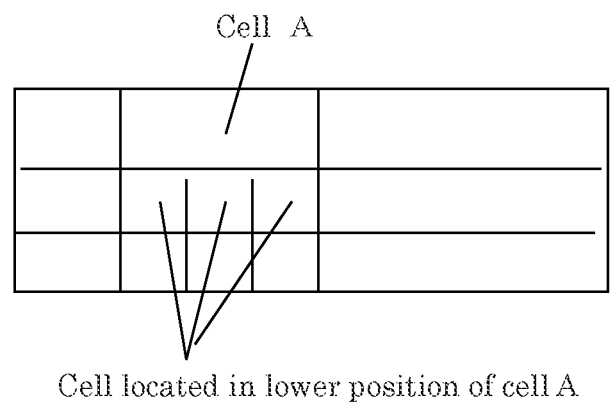
FIG. 32 depicts an image of a cell "located in the lower position" of the first cell.

Next cells and indexes in other index fields "located in the lower position" of the leading cell in the horizontal index field 42, are copied "in the lower position" of each cell following the leading cell in the horizontal index field 42 (StepB7). Here a cell located "in the lower position" of another celKhereafter named a first cell) is defined as a cell which belongs to anolho horizontal index field 42 located in the lower position of the horizontal index field 42 to which the first cell belongs, its column position is included by the column position of the first cell. An image or a cell "located in the lower position" of the firstcell is shown in FIG. 32.

Figure 33:
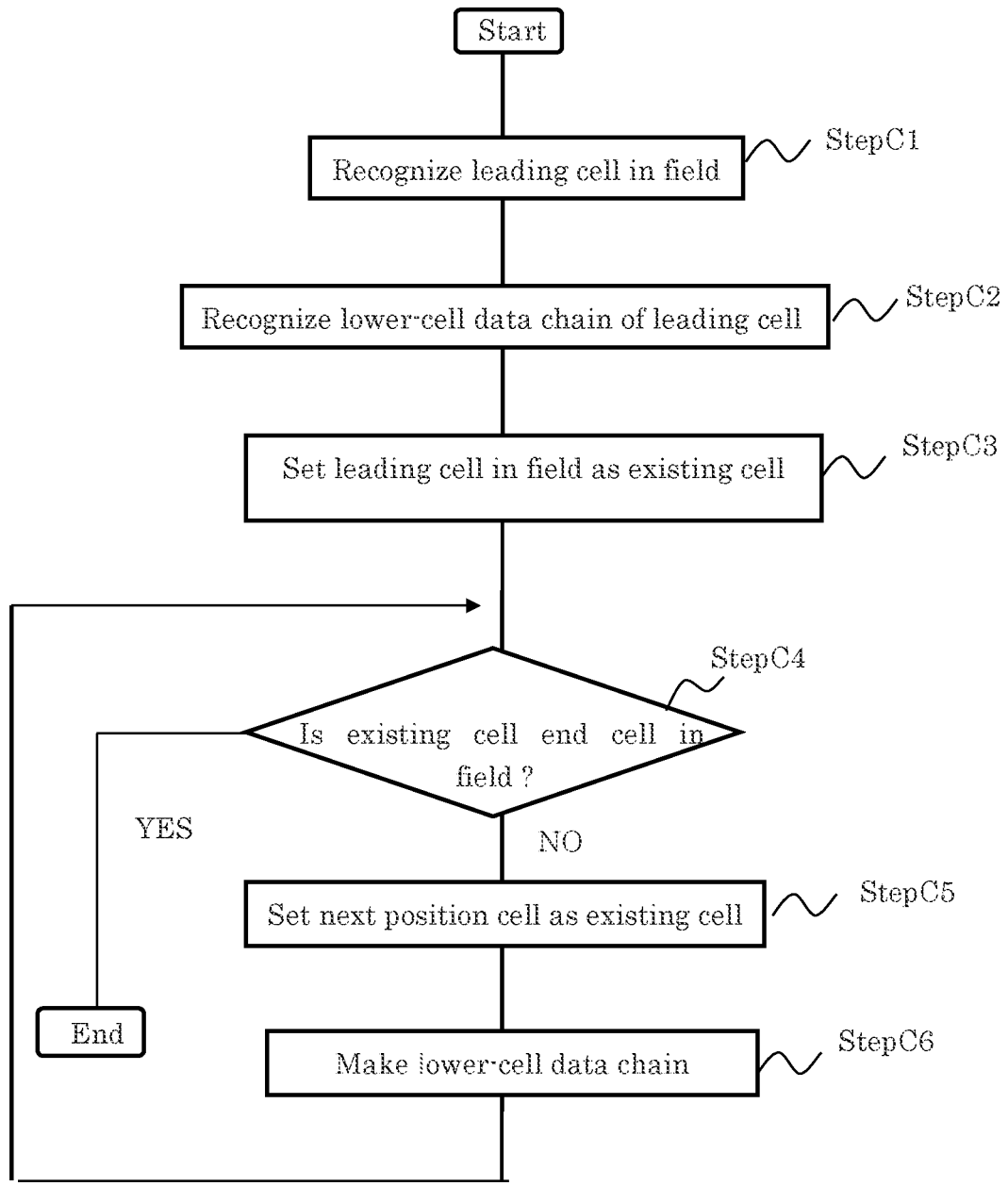
FIG. 33 depicts a procedure of copying cells "located in the lower position" of a cell in the system of the embodiment.

StepB7 judges firdt the horizontal index field 42 is located in a row in the upside of the row adjacent to the icon field 41. If the judge is obtained, lower-cell data making process illustrated in FIG. 33, if else StepB7 is ended. The judgement can be performed by judging the "row/column position" of the index field data is larger than the number obtained by deducting "1" from the "upper end position" of the icon field data.

In the lower-cell-making sequence, first, cell data of the leading cell of the horizontal index field 42 (StepC1). It is recognized as cell data the "vertical initial position" of which is the same as the "row/column position" of the index field and the "horizontal initial position" of which is the same as the "initial position" of the index field, among the cell data constituent of the cell data chain pointed by the form manage data.

Successively cell data representing cells "located in the lower position" of the leading cell of the horizontal index field 42 are recognized insequence, and a "leading-cell-lower cell data chain" is made which is obtained by connecting cell data one after another by its connecting pointer, the connected cell data being obtained by copying the cell data recognized (StepC2).

Cell data representing the cells "located in the lower position" of the leading cell can bo recognized cell data the "vertical initial position" is larger than the "vertical end position" of the leading cell, the "horizontal initial position" of which is smaller than the "horizontal end position" of leading cell, and the "horizontal end position" of which is smaller tha the the leading cell, among cell data chain pointed by the form manage data.

In subsoquont Step C3 the addross of the cell data of the leading cell of the horizontal index field 42 is set as a initial value of the "existing cell data address" pointing the cell data of "existing cell" that is a cell of the processing object in each processig loop.

In subsequent Step C4, it is judged that the "existing cell" is the "field end cell" that is located in the end position of the horizontal index field 42 by refering to the "field end flag" in the cell data. If the judgement is obtained the sequence (StepB) is ended, else proceeds to StepC5.

Step C5 sets the "next position cell" that is a cell located adjacent in the right side of the "existing cell" in the horizontal index field 42 as the "existing cell" in the next loop of the process by updating the "existig cell data address" by the address of the cell data of the "next position cell" recognized.

As for the position information of the "next position cell", the "horizontal initial position" is obtained by adding "1" to the "end position" to the "existing cell" of the "existing cell", and the "vertical initial position" is the "row/column position" of the horizontal index field 42. Cell data representing the "next position cell" can be recognizod by repeating comparing the position information of the "next position cell" described above with the position information of cell data recognized sequentially from the cell data chain.

Subsequent Step C6 recognizes sequentially cell data of cells "located in the lower position" of the "existing cell" and makes the "lower existing cel data chain" wherein cell data obtained by the recognized cell data is connected one after anothor by its connecting pointer.

The "lower existing cel data chain" can be obtained by connecting cell data one after another by its connecting pointer, the cell data beig obtained by copying cell data recognized in sequence from the "leading cell lower cell data chain", and successively by adding a horizontal relative position of the "existing cell" in the corresponding index field 42 to the "horizontal initial position" and "horizontal end position" of each cell data constituent of the made cell data chain.

The horizontal relative position of the "existing cell" in the horizontal index field 42 can be obtained by deducting the "initial position" of the horizontal index field 42 from the "horizontal initial position" of the "existing cell". The "lower existing cel data chain" is connected to the end of the cell data chain pointed by the cell data pointer of the form manage data, the system returns the control to Step C4 again after StepC6.

After executing StepB7, paremeters for muking index field data for the horizontal index field 42 in the next upper row are set as described below (Step B8), and along a form-source data in the next upper position of the form-sourco data chain is set as the "existing data" (Step B9), successively returning to the judgement of StepB2.

Step B8 updates the "existing row position" parameter by deducting "1" from it, and along sets a number of columns as the "cell length" parameter of index fields 42 to be next recognized, the columns being included horizontally by the range occupied by the set of cells in the horizontal index field 42 in the row located in the next lower position of the existing row, the cell data of the set of cells being made as described above.

If in the judgement of StepB2, the "existing data pointer" is the specified value representing the end described above.

the "horizontal end position" of the cell data made last is set in the "right end position part" of the form manago data and in "the end position part" of the "total position part" of each index field data made for the form (StepB10), and the sequence making the index field data defining the horizontal index field 42 is ended. The cell data made at the end as described here is the cell data of the rightmost cell in the uppermost horizontal index field 42.

Index field data defining the vertical index field 43 can be made by similar sequence, the address of the leading data of the index field data chain connecting the index field data made is set in the vertical index field data pointer of the form manage data.

Index data made for each horizontal index field 42 or vertical index field 43 of the form is connected by its "connecting ponter in sequence" for each "direction" according to which the corresponding indexs are located to form index field data chain, and the address of leading data of which is set in "hor index field data chain" or "vert index field data chain" of the form manage data.

After executing StepA2, the row position registered in the "bottom position part" and column position registered in the "right-end position part" of the form manage data are respectively set into the "bottom position part" and the "bottom position part" of the "right-end position part" of the "total position part" of the icon field data. Further the column position set into the "right end posit ion part" of the form manage data is set in the "end position part" of the "total position part" of each index field data of each index data 42 of the horizontal index fields 42, and the row position set into the "bottom end position part" of the form manage data is set in the "end position part" of the "total position part" of each index field data of each index field data 42 of the vertical index fields 43 (Step A3).

In subsequent Step A4 cel data is made for each cell in the icon field 41, wfich is connected to the cell data chain pointed by the form manago data. Therein cell data is made for a cell recognized in sequence from the icon field 41, in the "position information part" of which the position information determined as above for the cell, and the cell data made is connected to the last data of the cell data chain by its connecting pointer repeatedly. In the "kind part" of the cell data made, a specified value for the cell in the icon field 41 is set.

Each cell constituent of the icon field 41 is recognized in sequence for example as below. First in the top row the position of the left up cell of the icon field 41 being recognized as "leading cell position", Thereafter after recognizing a cell the cell position adjacent right to the cell is recognized as the "next cell position" repeatedly. When the "noxt cell position" passes the row end within the icon field 41, in the next row the "next cell position" is recognized repeatedly in the same way, and finally when all cells in the end row of the icon field 41 are recognized, recognizing all cells constituont of the icon field 41 is ended.

The column position and row position of the "left up" cell of the icon field 41 is respectively the position of the leftside column and the position of the upside row of the icon field 41, and a column position of a first cell adjacent in the rightside of a second cell is obtained by adding "1" to the col position of the second cell. And a row position of a cell in a first row next to a second row is obtained by adding "1" to the row position of the second raw. Furthermore the column position of oach row in the icon field 41 is the leftmost position of the icon field 41.

Next "row position data" and "column position data" are made which relate a "row position" and a "column position" to a logical position on the displaying screen, the "row position" and the "column position" representing the position information of the icon field 41, eachindex field and each cell (StepA5).

The logical position on the displaying screen is represented as a pair of a right side position and downside position, the left up position of the form manage application screen 33 being set as the origin.

The format of "row position data" and "column position data" is shown in FIG. 34. "Row position data" is a sequence of the position of the leftside of the icon field 41 and the positions dividing each constituent cell of the icon field 41, "column position data" is a sequence of the position of the upside of the icon field 41 and the positions dividing each constituent cell of the icon field 41.

"Row position data" and "column position data" is obtained as below based on the "leftmost position", the "top position" of the whole form, "index field dimension" and the "horizontal/vertical dimension" of the icon locating cell. In the case of "column position data", first setting the leftside position of the form in the leading data, vertical index field data is recognized in sequence repeatedly starting from the end data of the index field data chain, so as to make a constituent data in which a position is set for each index field data recognized, the position being obtained by adding the "index field width" to the previous constituent data.

After column position data is made for the vertival index field data, column position data is made repeatedly for each icon locating cell in the horizontal direction, in which a position obtained by adding the determined "horizontal width" to the position recognized directly before. The number of the cells of the icon field counted in the horizontal direction can be obtained by adding "1" to the number obtained duducting the "left end position" from the "right end position" of the icon field data. The "row position data" can be made in a similar way. The address of "column position dat" or "row position data" is set respectively in "column position data" or "row position data" of the form manage data.

Subsequently position data is set in each character string data representing each character string on the form (Step A6). Each character string data on the form can be recognized by recognizing each cell data in sequence from the cell data chain of the form.

On the other hand the boundary position of the cell represented by the recognized cell data is calculated based on the position data of the cell and "row dividing position data" or "column dividing position data" made beforehand. The position of the left side of a cell is the value set in the "column position data" located at an order in the sequence of "column position data", the order being set in the "starting column position" of the correspondinding cell data, while the position of the right side of a cell is the value set in the "column position data" located at an order in the sequence of "column position data", the order being obtained by adding "1" to a number set in the "end column position" of the corresponding cell data.

The position of the upside and downside of a cell is calculated in the similar way based on the "initial row position" and "end row position" of the cell data. The position at which a character is written is determined based on the boundary position of the cell and "character margin in a cell" specified before and the determined position is set in the position data of the character string data.

In the form making sequence at the end, line data are made which represent lines being the boundary of the icon field 41 and index fields and lines being the boundary of cells in the icon field 41 and index fields (Step A7). The format of line data is illustrated in FIG. 35.

The end positions of the lines can be determined based on the left side and the right side position and the upside and down side position of the icon field 41, the index fields, and the cells. The leftmost position and rightmost position of the icon field 41 can be respectively obtained based on the column positions set in the "leftmost position part" and "right most position" and the "column position data" in the "total position part" of the icon field defining data. The top position and bottom position of the icon field 41 can be respectively obtained based on the row positions set in the "top position part" and "bottom position part" and the "row position data" in the "total position part" of the icon field defining data.

The left end position and right end position of a horizontal index field 42 can be obtained based on the column positions registered rosjxictivoly in the "initial position part" and "end position part" of the "total position part" of the index field data, and the "column position data". The upper end position and lower end position of a horizontal index field 42 can be obtained based on the row positions registered in the "row/column position part" of the "total position part" of the index field data, and the "row position data".

The left end position, the right end position, the upper end position and lower end position of a vertical index field 43 can bo obtained similarly based the "initial position part" and "end position part" of the "total position part" of the index field data, the "column position data", and the "row position data". The left end position, the right end position, the upper end position and lower end position of each cell can be obtained as described above based the position information of the cell data, the "column position data", and the "row position data".

The end position determined as above is set in the position data of the boundary lines. Furthermore as modification data data specified before is set. The line data made is connected to another line data insequence by its "connecting pointer" to form line data chain, the leading data of the chain is set in "line data pointer" in the form manage data.

In addition character string data can be made for an item name of a index and be located related to the index on the form (Step A8). The position where the item name character string is located can be determined as below for example. An item name of a vertical index field is located at a position adjacent to the upper end of the index field, while an item name of a horizontal index field is located at a position adjacent to the left end of the index field. But according to the method the locating position of index field data 42 located at the bottom row overlaps the locating position of the item name of the index field data located at the rightmost column, and then it is located at a position determined appropriately outside of the index fields connected to the corresponding index field by a outgoing line.

The locating position of each item name can be obtained based on the positions of the upper end and the bottom end of the corresponding index field and the predetermined locating margin between the item name and the corresponding index field. Character string data is made as the position data of which the position determined as above for each item name is set and as the code data of which a character siring set in the "item name part" of the index field data, and the address of the character string data is set in the "item name character siring data pointer" provided in the corresponding index field data.

By the process described above in the case of the example a form illustrated in FIG. 36 is made. A form data made for the leading form is managed in the form data memorizing unit 57 in the way it's the address of the form manage data is set in " " of the general manage data, and form data made thereafter is managed in the way its form manage data is connected by its "connecting pointer" one after another to form a form manage data chain.

Form making/displaying sequence nex registers common condition data in the corresponding form manage data(Step Q2). Common condition data is described below. As the top form of the hierarchy form now described has no common condition data, " " value is set in the "common condition data pointer" managing the common condition data.

The system next executes the form-source selecting sequence as a process of 62, which selects form-source tagname-chain data constituent of an open-form displayed by open-designation for each cell in the icon field 41 of a form (a first form) the form data of which is made by the above process, and makes form manage data in which the obtained vertical and horizontal source data chain registered so as to the address of the form manage data in "open-form data address part" of the corresponding cell data (Steo Q3).

Cell data of each cell constituent of the icon field 41 of the first form can be recognized in sequence as cell data in the "kind part" of which the corresponding value is set among the cell data chain pointed by the "cell data pointer part" of the form manage data of the first form.

In Step P1 of the form source data selecting sequence for each cell in the icon field 41 of the first form, as initializing of a selected tag name-chain data chain to be made for each cell, the address of the leading data of a tagname-chain data chain is set in the "selected tagname-chain data pointer" of the form manage data made for the cell, the tagname-chain data chain being made as unplaced tagname-chain data by copying the tagname-chain data chain pointed by "selected tagname-chain data chain" of the form manage data of the first form. Furthermore in the "hierarchy rank part" of the form manage data made for the cell, a number got by adding "1" to the set value of the "hierarchy rank part" of the form manage data of the first form.

Subsequent Step P2 is executed with full-related data set as the tagname-chain selecting condition.

In the specification, as data which characterizes information stored in a cell in the icon field 41, a pair consisting of a index term and ID data or ID name, is named index related data determined for the information or for the cell, the index term being written on the same row and on the same column as the cell, and the ID data or ID name being identified for the index term field in which the index term is located.

An index term located on the same row or on the same column as the cell can be identified by repeating to compare the position data of the cell data and the position determined for each index term on the form. Each index term located on the form can be recognized by recognizing in sequence cells constituent of each index following index-cell manage data chain provided for the corresponding index field data.

Index related data is represented by the format shown in FIG. 21 above, wherein the "ID data pointer part" points the ID data pointed by the corresponding index field data, and "tagname data pointer part" points the tagname data in the data part of which the corresponding index text is set. Further in the case ID name is defined for the tagname-chain, the ID name is set in its "ID data name part".

Further in the specification as data which identifies within a form information stored in a cell in the icon field 41, a set of all index related data identified for the cell on the form is named form related data determined for the information or for the cell, which can be obtained by connecting each constituent related data by its connecting pointer.

Furthermore in the specification as data which identifies within a hierarchy form information stored in a cell in the icon field 41 on a form constituent of the hierarchy form, a set of all index related data obtained for the cell containing the information is named full-related data denned for the information or for the cell containing the information, the index related data constituent of the set being obtained for the cell in which the information is stored, and for each cell to which open-designation operation is given on each form beginning with the top form so as to display the form in which the information is stored. The full related data is represented as a chain of the constituent related data using its connecting pointer.

In the specification further full related data made for a cell to which open-designation is given in a constituent form of the hiorarchyform is named common condition data of the open-form, the full related data being determined commonly determined for each cell of the open-form. The address of the leading data of the common condition data is set in the "common condition data pointer" of the open-form.

Full related data made for a cell in the icon field 41 on a first form, that is a constituent form of the hierarchy form can be obtained by adding the form related data for the cell to common condition data for the form.

As the top form of the hierarchy form in the example has no form of higher hierarchy, in the "common condition data pointer" of the form "NULL" is set.

In Step P2 tagname-chain data which has no condition data given are selected or tagname-chain data are selected each related data constituent of the condition data of which is included by the full-related data made for the cell. Here a relation in which a first related data includes a second related data means a relation in which a same ID data is registered in the two related data and further any tagname registered in the second related data is included by the tagnames registered in the first related data.

In the example for a cell corresponding to a index "A" and a index "a" in the icon field 41 in the top form, tagname-chain {A1,A2,A3,A4} and tagname-chain {large, mid, small} are selected Step P3 and Step p4 is executed similarity as above, the address of horizontal source data and vertical source data obtained are respectively set in the "horizontal source data pointer" or "vertical source data pointer" of the form manage data made for the cell. In the case of the example tagname-chain data with tagname-chain {A1, A2, A3, A4} registered and tagname-chain data with tagname-chain {large, mid, small} registered are pointed respectively by the horizontal source data pointer" or "vertical source data pointer.

The form making/display sequence next as a process by the output information relating unit 61 selects information related to each cell on the form among information stored in the folder tree so as to register the fullpathname of the selected information in the corresponding cell data (StepQ4). The Step Q4 is described below in the explanation of displaying of the open-form.

The sequence displays at the end a form represented by the form data made as above as the process by the form displaying unit 58 on the form manage application screen 33 (Step Q5). Step Q5 displays character strings and lines, constituent of the form based on the form data made, and displays icons of information located on the form and form-icons 153 showing existence of child-form based on both form data and the designated transform-target folder treet.

Texts written in the form is displayed based on the following character string data, character string data pointed by oach cell data pointed by the cell data pointer of the form manage data.

character string data pointed by the item name character string data of each index field definition data.

character string data pointed by the common condition character string data or the form manage data.

Among the texts above displaying of the common condition text described in (3) is explained in displaying of an open-form.

Further lines constituting a form are displayed based on line data pointed by the "line data pointer" of form nag data.

Character string data and line data made for the form are recognized in sequence and their poisition data are transformed to corresponding physical positions on a display screen 20*a* so that the corresponding character strings or lines are displayed at the corresponding physical positions on the display screen 20*a*.

Position information constituent of character string data and line data first are transformed to physical positions in the form manage application screen 33 based on "ratio of logical position to physical position" specified before in the system, and thereafter are transformed to physical positions on the display screen 20*a* by adding the relative position of the form manage application screen 33 to the display screen 20*a* memorized in the system as "relative position of the form application screen".

In StepQ5 form-icon 153 is displayed in e cell in the icon field 41 of the form, open-designation to the icon making the corresponding open-form displayed. The form icon form 153 is displayed for a cell in the "open-form data pointer part" of the cell data of which real address is set. A user can save vain open-designation to a cell with no form-icon displayed by displaying of form icons. Displaying of icons of information on a form is describerd below in the explanation of displaying process open-forms.

Now when a user makes open-designation operation to a cell in the icon field 41 of a form displayed on the form manago application scroon 33 by double click using a mouse 14, the system as the process of the information attribute providing unit 60 executes the information manage data making process making information manage data for all information stored in the folder tree and the form making/displaying seqence. The information manage data making process is executed also in Step L2 described above, and is executed responding to each open-designation.

In Step Q1 of the seqence the form data of the open-form is made based on the horizontal form source data or the vertical form source data registered in the form manage data pointed by the the "open-form data pointer" of the cell data to which the open-designation is given.

The cell data to which the open-designation is given can be recognized by comparing position of each cell data of the cell data chain made for the form to the position of the open-designation repeatedly. The position of a open-designation on the display screen 20*a* is transformed to a physical position on the form manage application screen 33 based on the position of the form manage application screen 33 relative to the display screen 20*a*, and subsequently transformed to a logical position on the form manage application screen 33 based on a "ratio of logical position to physical position" specified before so as to be compared with the position data of each cell data.

In the case a open-designation is given to a cell corresponding to the index "A" and the index "a" in the icon field 41 on the top form in the example, the tagname-chain data registering the tagname-chain {A1, A2, A3, A4} and the tagname-chain data registering the tagname-chain {large, mid, small} are made respectively as the horizontal source data and the vertical source data.

Common condition data set in stepQ2 of the form making/displaying sequence is obtained as described above as the full-related data obtained for the open-designated cell on the parent form to which the open-designation is given, In the case a parent form to which open-designation is given is the leading form of the hierarchy form as in the example, the leading form having no common condition data as described above, form related data obtained for the open designated cell on the leading form is the common condition data of the open-form as the full-related data determined for the cell.

Common condition data of a open-form obtained by a open-designation to a cell corresponding to an index "A" and "a" in the icon field 41 of the leading form in the example can be obtained as the form related data determined for the cell, that is a related data chain combining related data relating a tagname "A" to ID data "*¥*¥P" and another related data relating a tagname "a" to ID data "*¥*¥P¥A、*¥*¥P¥B、*¥*¥P¥C".

Furthermore in StepQ2 common condition character string data is made based on common condition data, and is pointed by the "common condition character string data pointer part" of the form manage data. A character string set in the tagname part of the related data constituting the common condition character string data is located as common condition text at a proper position outside of the form, each of which is located in the same position in the horizontal direction and across a determined distance from each other in the vertical direction. In the example text "A" and "a" are located in FIG. 39 as shown below.

A common condition character string data representing common condition is made for each character string set in the "tagname part" of each related data constituent of the common condition data. In the "tagname part" of which a character string set in the tagnamepart of the corresponding related data is set, in the position part of which the position determined accoroding to the locating method described above is set. In the case plural character string data are made, the leading data of the character string data chain connecting each character string data by its connecting pointer.

Steo Q3 that is the form-source tagname-chain data selecting seqence is executed in the same way as in the case of the top form as described above. For each cell in the icon field 41 on an open-form displayed by an open-designation on the top form in the example, form tagname-chain data cannot be selected, and therefore form mange data cannot be made, so that in the "open-form data pointer part" of the cells "NULL" as the initial value remains set.

Steo Q4 as the process by the output information relating unit 61 selects information related to each cell in the icon field 41 of the open-form to registers the selected information in the corresponding cell. Herein full-related data is made for each cell recognized in the icon field 41 of the opon-form and information is selected to which the same attribute manage data as the made full-related data is given. The information manage data of the selected information is connected tone after another in sequence by its connecting pointer2 to form a information manage data chain, the address of the leading data of which is set in the "information manage data pointer" of the corresponding cell data.

In the example information which is named "report1" and is stored in a folder the full-pathname of which is "*¥*¥P¥A¥a¥A1¥大", is registered in the cell data of the cell corresponding to the index "A1" and the index "large" in the icon field 41 on the open-form, which is displayed by open-designation for a cell corresponding to an index "A" and an index "a" in the icon field 41 on the top form.

In Step Q6 displaying an open-form an cpenform is displayed with common condition character string added based on common condition character string data pontce by the "common condition character string data ponter" of the form manage data as described above. Further, a form-icon 153 can be displayed in the same way as in the top form a described above, and an icon of information related to a cell by the output information relating unit 61 before is displayed as below.

Figure 37:
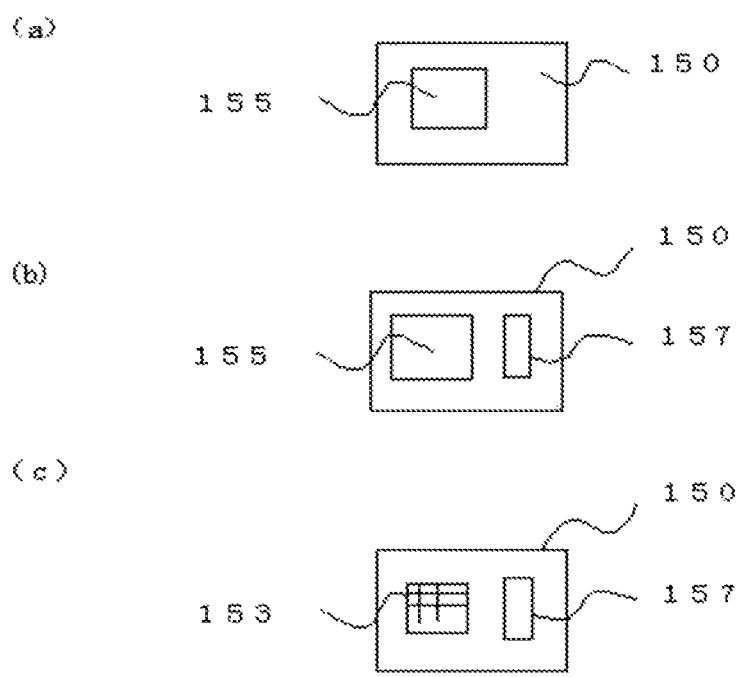
FIG. 37 depicts locating of an icon/icons in a cell in the system of the embodiment.

Among cells in the icon field 41, for cells having no form-icon 153 displayed therein, an icon of the loading data of the data chain is displayed within the corresponding cell area 150 (FIG. 37(a)), and in the case plural information are related to the cell, for example, a third icon 157 is displayed right-side of the icon of the loading information (FIG. 37(b)). Users can recognize information other than the information displayed in the cell area 150 is/are related to the cell by the third icon.

In the case information is related to a cell area 150 in which a form icon 153 is displayed, the third icon 157 described above is displayed adjacent right of the form icon 153 (FIG. 37(c)). The user can recognize information is related to the cell at the third icon 157.

Users can have in-cell-information-displaying screen 160 (FIG. 38) displayed by giving to the third icon 157 a specified operation for example a double click etc. wherein the icons 163 of all the information related to the cell are displayed. On in-cell-information-displaying screen 160, icons 163 defined for the corresponding information of the infomation manage data connected in the information manage data chain of the corresponding cell data, are displayed.

Figure 39:
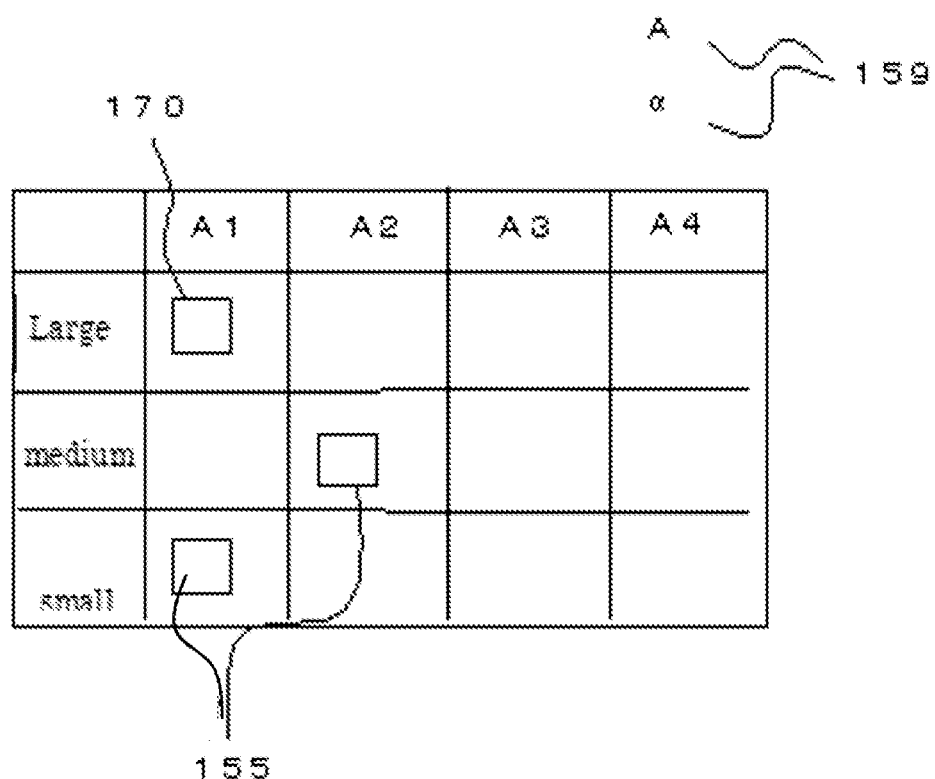
FIG. 39 depicts an open-form of the example in the system of the embodiment.

An open-form displayed by open-designation to a cell corresponding to an index "A" and an index "a" in the icon field 41 on the top form of the example is illustrated in FIG. 39. At the right up of the form illustrated in FIG. 39, Character string "A" and "a" are located as a common condition character string 159.

Figure 38:
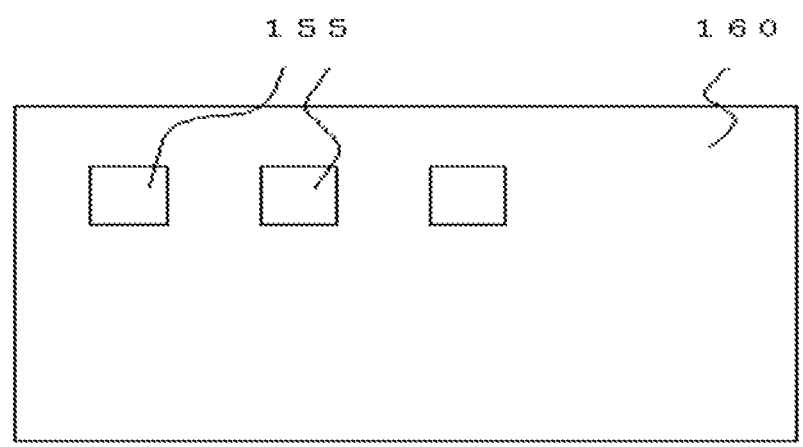
FIG. 38 depicts a cell-information-displaying screen in the system of the embodiment.

Each cell in the icon field 41 of the open-form illustrated in FIG. 38 has no open-form defined and therefore has no form-icon 153 displayed therein. Further an icon 170 of an information is displayed in the cell corresponding to an index "A" and an index "a" on the open-form, if only the information is stored in the cell, the information being named "report1" and stored in a folder the full-pathname of which is "*¥*¥P¥A¥a¥A1¥large".

As described above on a hierarchy form an icon of information is displayed related to a cell each index of which is a path name of a folder containing the information, or on a form displayed by opening-designation to the cell is displayed related to a second cell each index of which is a path name of a folder containing the information.

Now when open-designation operation is given to an icon of information displayed in a cell in the icon field 41, first cell data of the cell is identified based on the opening-designation position, and next the corresponding information mange data is identified as the leaing data of the cell information manago data chain of the cell data, and subsequently the data object of the corresponding information is identified based on the full-pathname registered in the identified information manage data, so that the file information screen of the data object is opened on the form manage application screen 33.

Further when open-designation operation is given to an icon of information displayed in the in-cell displaying screen 160, the corresponding information manage data is identified among the corresponding cell information manage data chain, based on the opening designation position, so that the corresponding file information screen is opened the form manage application screen the form manage application screen 33 based on the full-pathname registered in the identified information manage data.

In addition, as a modified example in step Q3 for each cell in the icon field 41, form data of child form that is a form that is to be opened by the open-designation to the cell can be made based on the hor and vert source data made for the cell, and the form manago data managing the made form can be pointed by the "open-form data poniter part" provided in the corresponding cell data. Consequently in the form making/displaying sequence executed responding to open-designation Step Q2 and are executed directly.

Further in the form making/displaying sequence Step Q3 can be eliminated. Instead in Step Q5 for each cell in the icon field 41 full-related data is made, and after the form-source tagname-chain data selecting seqence a form icon is displayed for a cell having a child form repeatedly.

In the apparatus information can bo stored into a folder tree also by dragging its icon into a cell in the icon field 41 of a form on the form manage application screen 33, the form being obtained by transforming of the folder tree by the above sequence.

Figure 40:
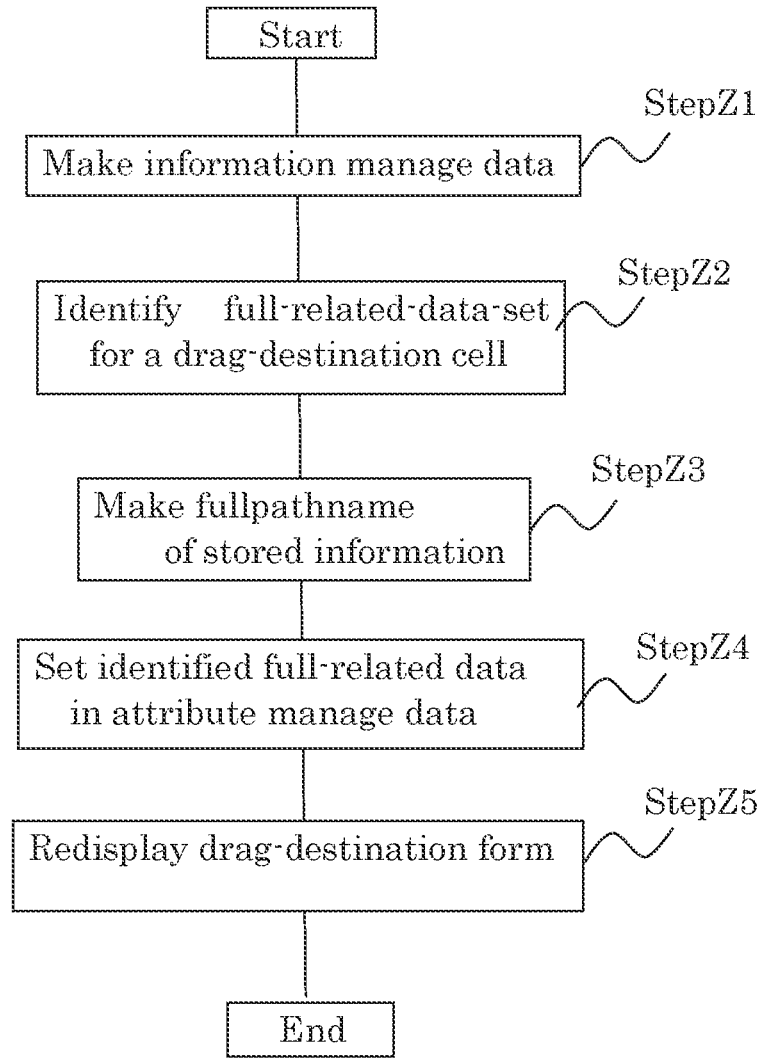
FIG. 40 depicts a procedure of information storing process in the system of the embodiment.
Figure 4:
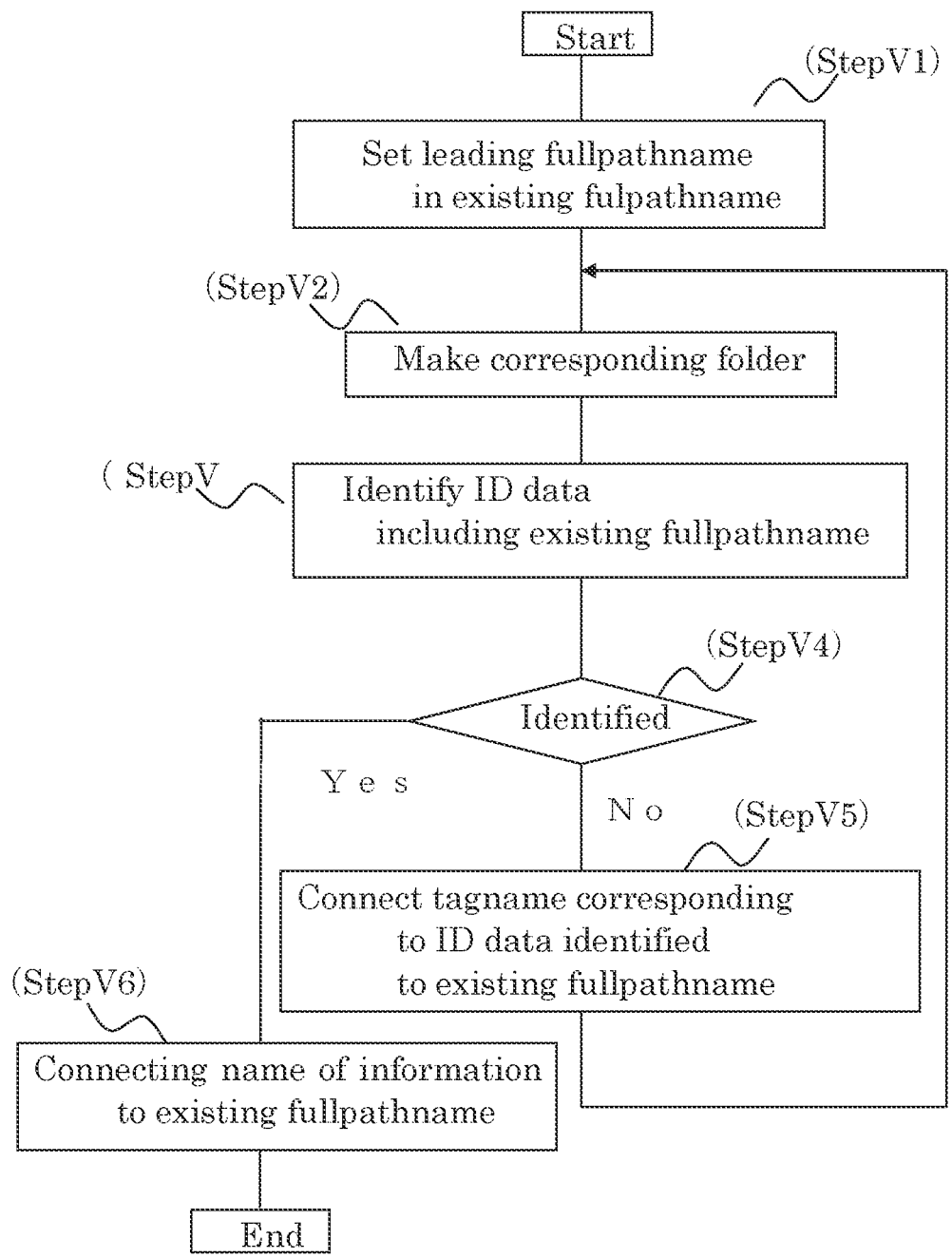

Now when an icon of information which is named "Report 2" and stored in a folder the name of which is "Report folder, and "the full-pathname of which is "*¥*¥eport Folder" is dragged into a cell corresponding to an index "A4" and an index "large" on a form (FIG. 39, the system executes the information storing sequence illustrated in FIG. 40, the form (FIG. 39) being opened by open-designating a cell corresponding to an index "A" and an index "a" on the top form of the hierarchy form in the above example.

The sequence makes first information manage data in the "full-pathname part" of which the full-pathname of the information "*¥*¥ReportFolder¥Report2" is set, and connects the information manage data to the information manage data chain made for the hierarchy form (Step Z1).

The sequence subsequently makes full-related data identified for the drag destination cell in the hierarchy form, and set the address of leading data of the full-related data in "full-related data pointer part" of the information manage data (Step Z2). The full-related data of the drag destination cell can be obtained by adding the common condition data of the drag destination form to the form related data of the drag destination cell. In the example full-related data is obtained, which comprises related data each of which relates respectively the tagname "A" to ID data "*¥*¥P", the tagname "a" to ID data "*¥*¥P¥A, *¥*¥P¥B, *¥*¥P¥C", the tag name "A4" for ID data "*¥*¥P¥A¥a, *¥*¥P¥A¥β" and the tag name "large" to ID data "*¥*¥P¥A¥a¥A1ͺ . . . . . . . . . , *¥*¥P¥C¥Y¥C3".

The sequence subsequently makes a new full-pathname corresponding to the full-related data identified for the information based on the full-related data identified and sets the full-pathname in the "full-pathname 2 part" of the information manage data (StepZ3). In StepZ3 in the case a folder storing the information is not prepared, the folder is made.

StepZ3 is executed as the full-pathname making seqence illustrated in FIG. 41. In the seqence first the pathname and the full-pathname of the leading folder respectively as the initial value of "existing pathname" parameter and "existing full-pathname" parameter representing processed object of the process loop (Step V1). In the example "P" and "*¥*¥P" is set in "existing pathname" and "existing full-pathname" respectively.

The sequence next judges if a folder having the full-pathname obtained is prepared in the folder tree, and in the case the corresponding folder is not prepared makes a now folder by known method (Step V2).

The sequence subsequently identifies related data which has ID data registered therein, among related data constituent of the full-related data made for the drag destination cell the parent fullpathname set corresponding to the ID data including the existing fullpathname. (Step V3)

The sequence subsequently judges if related data satisfying the above condition can be identified (Step V4), and in the case the judge is obtained the sequence proceeds to StepV5 and therein updates the existing fullpathname by connecting the pathname registered in the tagname part of the identified related data to the existing fullpathname across the dividing code "¥" to return StepV2. If related data satisfying the above condition cannot be identified in StepV4, the seqenco connects the name of the information to the existing fullpathname across the dividing code "¥" (StepV6) to end.

In the example first in StepV1 "*¥*¥P" is set as the existing fullpathname and in StepV3 related data "a data name "A" for ID data "*¥*¥P"" is identified, the ID data including the existing fullpathname "*¥*¥P".

In StepvS the path name "A" set in the tagname part in the identified related data is connected to the existing fullpathname so that the existing fullpathname is updated as "*¥*¥P¥A". Thereafter again in StepV3 "a data name "a" for ID data "*¥*¥P¥Aͺ *¥*¥P¥Bͺ *¥*¥P¥C"" is identified as related data the ID data of which includes the existing fullpathname "*¥*¥P¥A". In subsequent StepV5 a pathname registered in the tagname part of the identified related data is connecter to the existing fullpathname so that the existing fullpathname is updated as "*¥*¥P¥A¥a".

Thereafter the same process is reported and at the end whereinformationr the existing fullpathname "*¥*¥P¥A¥a¥A4¥large" obtained in StepV4, related data cannot be identified the ID data of which includes the existing fullpathname in next executed StepV3, the existing fullpathname "*¥*¥P¥A¥a¥A4¥large¥Report2" of the information is obtained by connecting the name of the information "Report2" to the existing fullpathname "*¥*¥P¥A¥a¥A 4M¥lrge".

Furthermore in the example, the folder the full-pathname of which is "*¥*¥P¥A¥a" does not contain a folder the name of which is "A4", and therefore in StepZ2 the folder the name of which is "A4" is provided nowly in the folder the full-pathname of which is "**¥*¥P¥A¥a" by a publicly known method, and furthermore a folder the name of which is "large" is provided newly in the folder the full name of which is "A4", so that the information is contained in the folder the name of which is "large".

The seqence subsequently updates the full-pathname "*¥*¥ReportFolder¥Report2" to the full-pathname "*¥*¥P¥A¥a¥A4¥large¥Report 2" which is made as described above and is registered in the "full-pathname2 part" of the information manage data and then registers the new full-pathname in the "full-pathname part" of the information manage data (StepZ3). Thereafter the environment contrail program accesses the information using the now full-pathname.

The seqence sets the address of the leading data of the full-related data made in StepZ2 in the "attribute manage data pointer" of the information manage data (StepZ4). In addition attribute manage data can be made by the method described above based on a fullpathname made in StepZ3.

Figure 42:
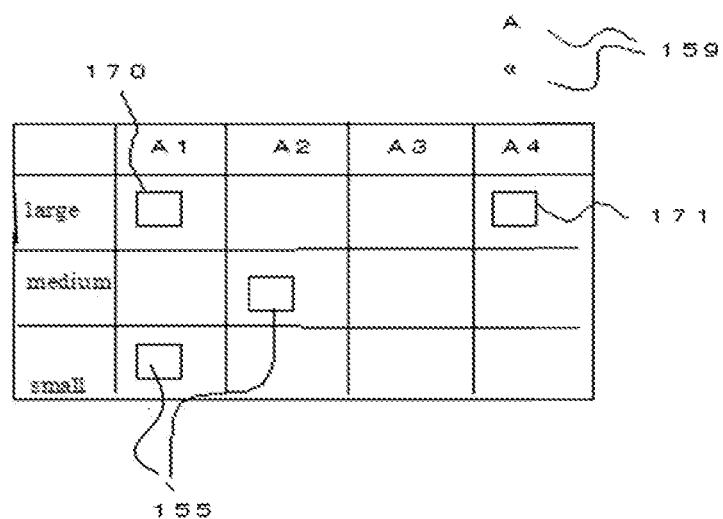
FIG. 42 depicts an open-form on which an icon of dragged information is displayed in the system of the embodiment.

The seqence finally executes StepQ4 and StepQ5 of the form making/displaying seqence to display again the form to which the drag operation is given on the form manage application screen 33 reflecting the information storing operation (Step Z5). In StepQ4 executed in StepZ5 the drag destination cell is selected as the locating cell of the information for which the same fullpathname as the information attribute mange data is identified so that in the case other information is not registered in the cell the icon 171 of the information is displayed in the cell (FIG. 42).

When open operation is given to the icon of the information displayed in the cell, the cell data of the cell is identified based on the open operation position and the information manage data of the information is identified as the leading data of the cell information manage data chain registered in the cell data, so that the file information screen of the corresponding information is opened on the form manage application screen 33 based on the full-pathname registered in the information manage data.

In addition, under a restriction for users that different tagname-chains constituent of a hierarchy form cannot have a same tagname, the process by the system can be simplified as below.

The step of Step N1 which provides ID data to each constituent passname of parent fullpathname set given to tagname-chain data is saved, further as the process giving condition data to first tagname-chain data (Step N2) second tagname-chain data different from the first tagname-chain data is identified, among the constituent tagnames of which only specified tagnames the number of which is less than a specified number are included as a constituent pathname or constituent pathnames of the parent fullpathname set of the first tagname-chain data, and further related data in the tagname part of which the above determined tagname or tagnames is/are registered as the condition data of the first tagname-chain data.

The second tagname-chain data can be identified by comparing repeatedly each constituent tagname of tagname-chain data other than the first tagname-chain data with each constituent pathname of the parent fullpathname set of the first tagname-chain data.

Information attribute manage data of each information can be made by connecting the related data with pathnames constituent of the tagname-chain data made among the pathnames of the information. ID data is not registered in related data obtained for each cell in the icon field 41 of a form and related data constituent of the information attribute manage data, so that the judgment of the specified relation between related data can be performed by judging a specified rotation between the registered tagnames.

Figure 43:
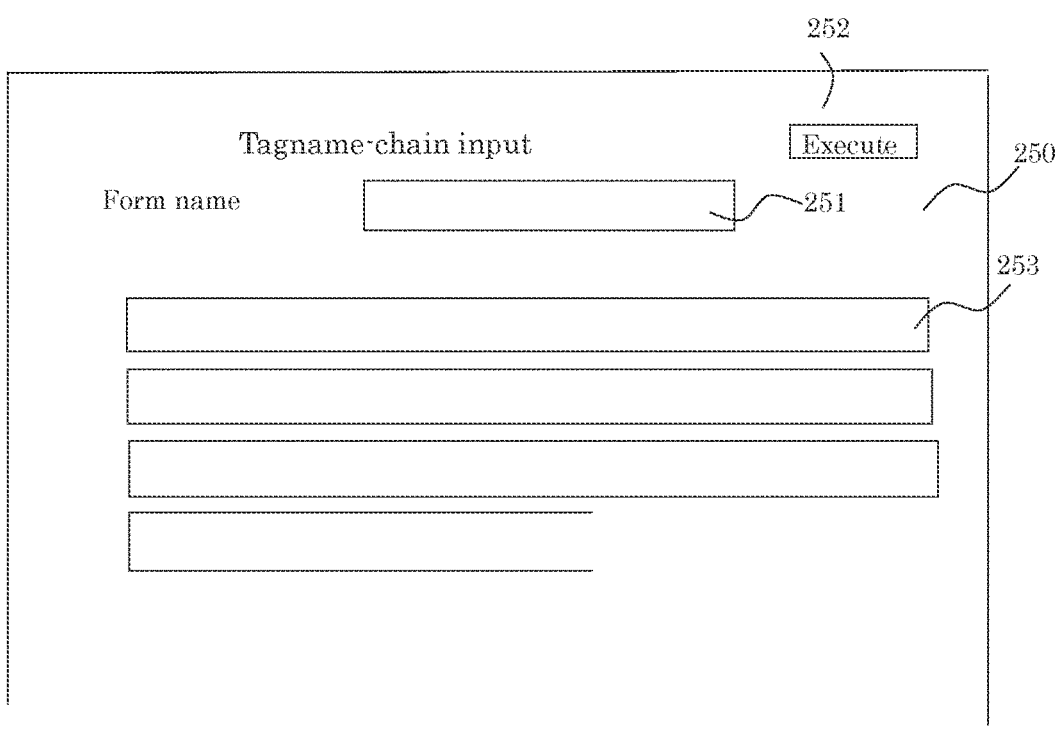
FIG. 43 depicts the tagname-chain input screen in the system of the embodiment.

A hierarchy form can be made based on input of tagname-chain data using a specialized input means. First when a user opens the form manage application screen 33 and designates "form make" button 71 in the function menu 70 of the form manage application screen 33, the system displays a tagname-chain input screen 250 on the form manage application screen 33 (FIG. 43).

In the top of the tagname-chain input screen 250 a form name input field 251 is provided, and a plurality of input block 253 are provided. In each input block 253 a hierarchy rank input field 255, a locating-direction field 256 and a tagname-chain input field 257 are provided in sequence and a condition tagname input field 258 is provided.

Figure 44:
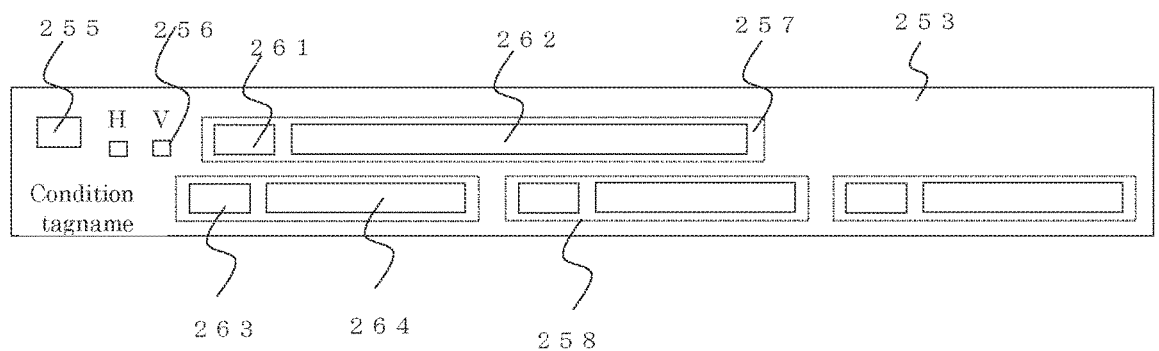
FIG. 44 depicts an configuration of input fields within each input-block constituent of the tagname-chain input screen in the system of the embodiment.

In the tagname-chain input field 257, an item name input field 261 and a tagname input field 262 are provided in sequence, and in the condition tagname input field 258 an item name input field 263 and tagname input field 264 are provided in sequence. The configuration of all input fields in a input block 253 is illustrated in FIG. 44.

Each input block 253 is provided foe each user viewpoint of the classification. Within a tagname-chain input field 257 of each input block 253, an item name that is the name of the corresponding viewpoint is written in an item name input field 261, and an tagname or tagnames that is/area classification name is/are written in a tagname input field 262. Usually a plurality of tagname are written in a tagname input field 262, and the set of tagnames is named a tagname-chain. As an item name a name proper to each input block 253 is to be input. In addition an item name is not needed to be written in the condition that the same tagname is not written in plurality of tagname input field 257.

Furthermore in the item name input field 263 in the condition tagname input field 258 in each input block 253, an item name of a condition for a classification is written as a tagname-chain in the same input block 253, and in the tagname input field 264 in the condition tagname input field 258 the tagname of the condition is written. Herein input in plurality of condition tagname fields 258 each of which is included in an input block are interpreted as a product and input of a condition tagname field 258 are interpreted as a sum.

Furthermore in the hierarchy rank input field 255 in each input block 253 locating order of the corresponding tagname-chain is written. A locating-direction field 256 consists of a pair of a horizontal direction checkbox and a vertical direction checkbox, and a user chocks the checkbox corresponding to the direction the tagname-chain is located on the form.

In addition locating position of an input tagname-chain in a form and locating order of the form win which the tagname-chain is located can be determined by the system, and therein the input of them can be saved.

Figure 45:
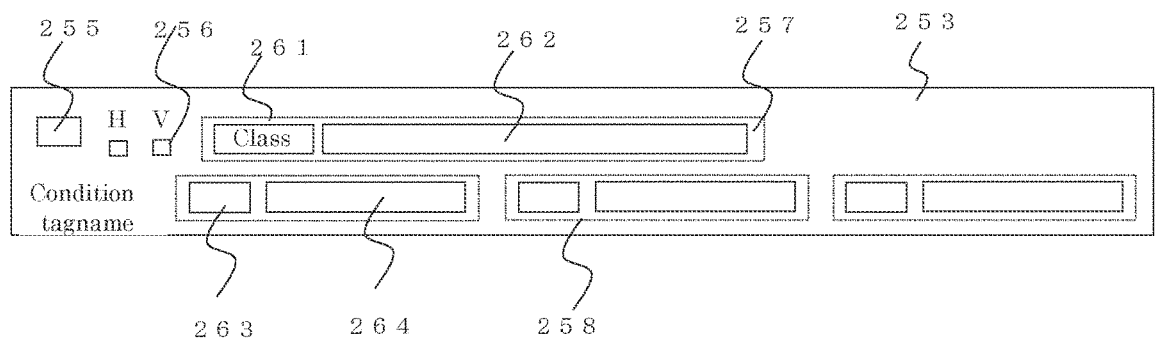
FIG. 45 depicts an example of input in an input-block in the system of the embodiment.

In classifying equivalent to the above example, a user inputs a text "total manage" in the form name input field 251, and within the input block 253 assigned to classification {A,B,C}, he inputs "field" as a corresponding item name in the item name input field 261 in the tagname-chain input field 257 and inputs a tagname "A", "B", and "C" in sequence in the tagname input field 262 (FIG. 45). As the classification {A, B, C} has no classification condition, nothing is input in the condition tagname input field 258 in the corresponding the input block 253.

Figure 46:
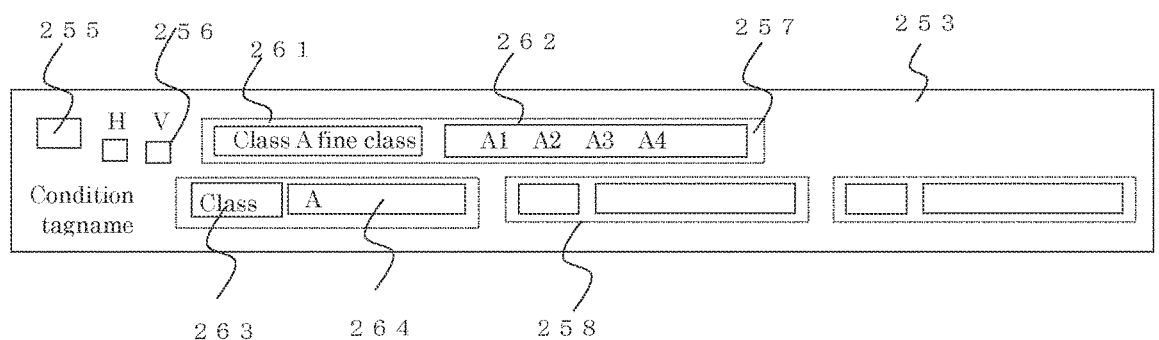
FIG. 46 depicts an example of input in another input-block in the system of the embodiment.
Figure 4:
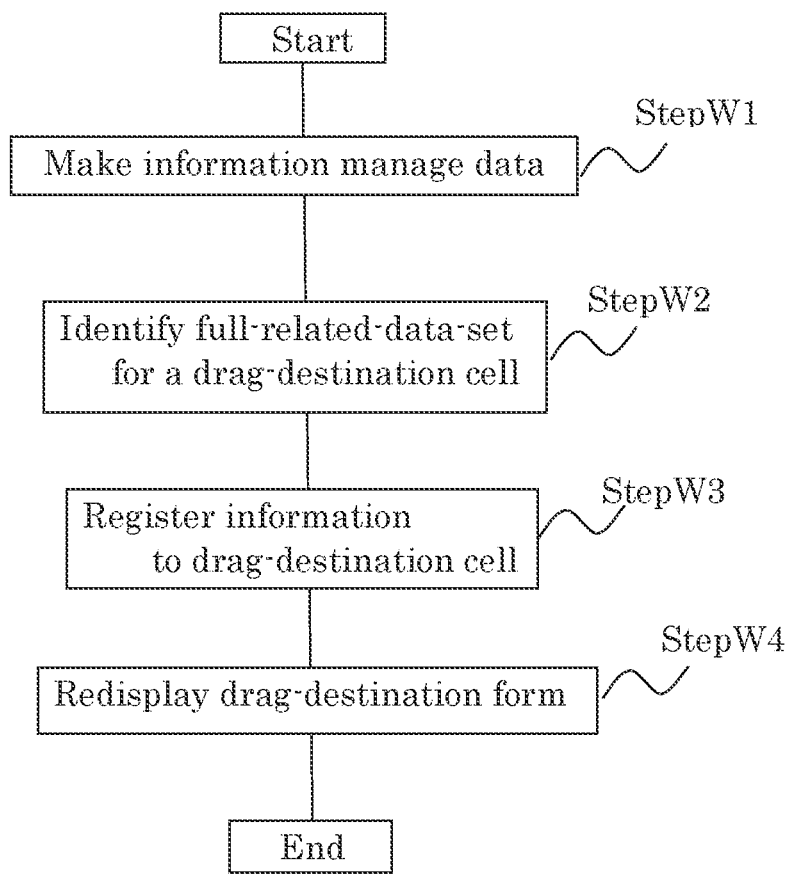

Furthermore within a input block 253 assigned to a classification {A1,A2,A3,A4} "fieldA detail" is written as an item name as an item name in the item name input field 261 in the tagname-chain input field 257, a tagname "A1", "A2", "A3" and "A4" in sequence in the tagname input field 262 (FIG. 45). Furthermore within the input block 253, "A" in written as a classification condition in the tagname input field 264 in the condition tagname input field 258, and "field" is written in the item name input field 263 as the corresponding item name (FIG. 46).

Herein it is inhibited to input a same item name in different tagname-chain input fields 257 and to input a same tagname repeatedly in a tagname input field 262. A user can input an item name into a item name input field 261 and an item name input field 263 and a tagname into a tagname input field 262 and a tagname input field 264 by method publicly known using character inputting feature of the apparatus, wherein in a tagname input field 262 a tagname is written across a space code from the adjacent tagname.

The user designating an execute button 252 after all input in the tagname-chain input screen 250, the system executes form-transform process as below. The sequence first makes general manage data (FIG. 8) and set in its "name part" the name of the desirod hierarchy form obtained from the form name input field 251 of the screen. The system also makes tagname-chain data based on the input on the tagname-chain input screen 250. The tagname-chain data has the same format (FIG. 10) as described above.

Tagname-chain data is made for each input block 253 on the tagname-chain input screen 250, in an item name part of which an input text in the item name input field 261 of each input block 253 is set. And its tagname-chain data pointer part points tagname-chain data chain obtained from input in the tagname input field 262 of the input block 253.

Furthermore input in the hierarchy rank input field 255 and designated value in locating-direction field 256 is respectively set in the hierarchy rank port and locating direction part of the corresponding tagname-chain data. If "horizontal" is designated in locating-direction field 256, "0" is set in the locating direction part, while If "vertical" is designated in locating-direction field 256, "1" is set in the part.

Character string text input in a tagname input field 262 is divided by space codes included in it into plural tagnames, each tagname generated is respectively set in the data part of tagname data (FIG. 13), which is made for each tagname, and tagname data made is connected in sequence by its "connecting pointer" according to the locating order in the tagname input field 262 to forme tagname data chain.

Furthermore one condition data is made based on one condition tagname input field 258 in each condition tagname input field 258. Condition data is made according to the format of related data illustrated in FIG. 21, in the item name part of which input text in the item name input field 263 in the corresponding condition tagname input field 258. And its tagname data pointer points the tag name data chain obtained from the input text in the tagname input field 264 in the corresponding condition tagname input field 258. The condition data made is pointed by the condition data pointer.

In addition in the case plural condition tagname input fields 258 have input, condition data obtained from a field or fields 258 having input are connected in sequence as condition data chain by its connecting pointer, the loading data of which is pointed by the condition data pointer of the corresponding tagname-chain data.

Tagname-chain data made as above are connected in sequence in order of time when it is made, by its connecting pointer to form a tagname-chain data chain, theaddress of the leading data of which is set in "tagname-chain data pointer part".

Hereafter the sequence of step L2 and tha steps followingit of the form-transforming process described above are executed, so that in the example a form showed Condition data is displayed on the form manage application screen 33. The form showed in FIG. 47 is the same as the leading form of the hierarchy form showed in FIG. 36 except that item name character strings 175 are written.

In the sequence of step L2 and the stops following it, item names input related to tagname-chains on the tagname-chain input screen 250 is refored as the ID data that is data identifying the corresponding tagname-chain. In addition "0" is set in the "hierarchy rank part" of the form data made.

Figure 47:
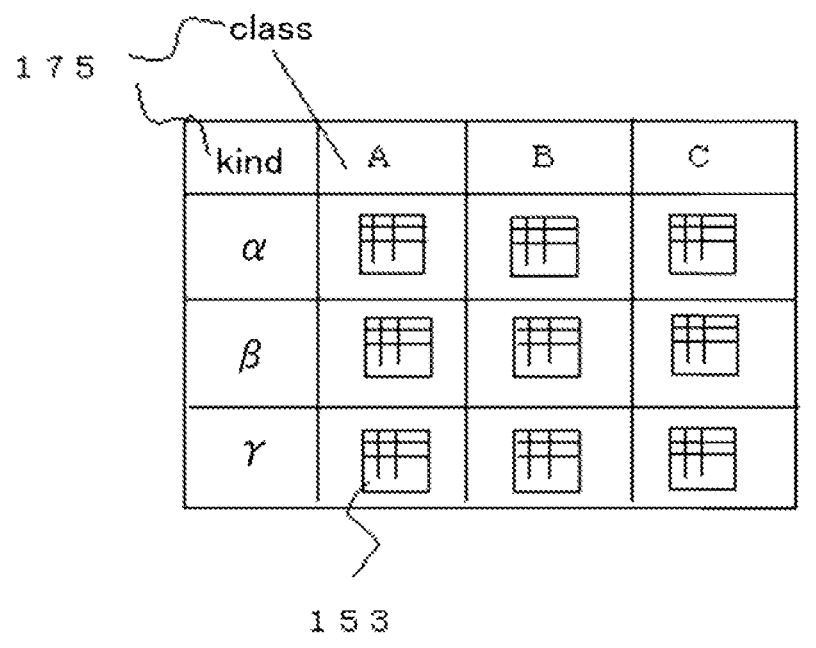

When open-designation is given to a cell in the icon field 41 or the form showed in FIG. 47 displayed on the form manage application screen 33, the system obtains the full-related data for the cell as described above, successively selects form-sourcc tagname-chain data of the open-form by the form-source tagname-chain data selecting seqence based on the full-related data, and makes form data wherein the selected tagname-chain is located in a determined method to display the corresponding open-form on the form manage application screen 33 based on the form data. In the "hierarchy rank part" of the form manage data a number obtained by adding "1" to the set value of the "hierarchy rank part" of the parent form which the open-designation is given.

Here in step P4 of the form-source tagname-chain data selecting seqence tagname-chains which have the samo hierarchy rank as the hierarchy rank of the open-form set are selected and allocated in index fields of the form by a determined method.

In the leading form of the present example, open-designation to a cell in the icon field 41 corresponding to the index "A" and "a" makes a form showed in FIG. 48(a) opened. The form showed in FIG. 48(a) is made according to the same format as the form showed in FIG. 39 except that item name character strings are written.

Now when an icon of information named "Report3" is dragged to the cell in the icon field 41 corresponding to the index "A3" and "large" in the form showed in FIG. 48 (a) displayed on the form manage application screen 33. The sequence showed in FIG. 41 is executed, the information being stored in the folder the full-pathname of which is "*¥*¥Report Folder.

In the sequence the system first makes the information manage data on which the full-pathname of the information is registered, and sets the full-pathname "*£*¥Report Folder¥report2" given to the information herebefore in the "full-pathname part" of it (Step W1). Each information manage data made for information to which storing oporation is given is connoctod one after another by its "connecting pointer" to form u information manage data chain, the address of the loading data of the chain is set in the "information manage data pointer" of the general manage data.

The sequence subsequently identifies the full-related data for the drag destination cell to be pointed by the "attributebute manage data pointer par" of the information manago data (Step W2).

Step W3 selects as the process of Step Q4 above the drag destination cell for which the samo full-related data is identified as the full-related data registerd in the information manage data to add the information manage data of the selected information to the cell information manage data chain of the selected cell.

Next Step W4 displays again the form on which the drag operation is given in the form manage application screen 33 reflecting the information storing operation as the process of Step Q5 described above. In the cxamplo the form shown in FIG. 48(a) is displayed again with the icon 177 of the information displayed (FIG. 48(b)),as the drag destination cell has no other information stored before, the cell corresponding to index "A3" and index "large".

When the user gives open operation to the icon of the information displayed in the cell, the corresponding cell data is identified based on the open operation position and thereafter the information manage data is identified as the leading data of the cell information manage data chain of the identified cell data. Subsequently the file information screen of the information is opened on the form manage application screen 33, the information being identified by the full-pathname registered in the information manage data.

The present invontion uses a program or software for implementing the above functions of the present invention. This software can be installed into the system of the present invention through an arbitrary medium, for example, an accumulatipn medium or online. Therefore, embodiments of the present invontion include an act an act of delivering an accumulation medium having stored thereon software for implementing the present invention for business purposes and an act of installing the software into the system by online.

The invention claimed is:

1. A method in an information managing apparatus, for viewing information stored in a specified folder tree on a hierarchy form composed by a plurality of forms in such a way that an open-operation for a cell as an opening-cell on a form of the hierarchy form as a parent form opens another form of the hierarchy form as an open form, said method comprising the steps of:

in response to specifying a folder-tree by a user's operation on a display screen of the information managing apparatus, obtaining a child-folder-name-chain for each folder belonging to the folder-tree, the child-folder-name-chain being a sequence of the names of the child folders directly contained in the folder, each child-folder-name-chain being provided with a fullpathname of a parent folder of the child folders;

obtaining tagname-chains, each of which is as a sequence of tagnames obtained by merging a plurality of child-folder-name-chains or is obtained as a single child-folder-name-chain which does not merge with one or more other child-folder-name-chains, each tagname-chain being provided with the fullpathnames of the parent folders of the corresponding child-folder-name-chains;

providing a first tagname-chain of the tagname-chains as a condition tagname with a tagname belonging to another second tagname-chain, the condition tagname being identified based on the fullpathnames of the parent folders;

making forms composing a hierarchy form by locating the tagname-chains outside of the cells on the forms in such a way that the first tagname-chain provided as the condition tagname with the tagname belonging to the second tagname-chain is located only on open forms each of which is to be opened by specifying a corresponding opening-cell on the parent form by the user's operation on the display screen, the cell being located in a specified position relative to the tagname specified as the condition tagname; and displaying an icon of information stored in the folder-tree related to a cell of the open form on the display screen, the full-pathname of which is in a specified relationship with a set of related tagnames, each of the related tagnames being located in a specified position relative to the cell and the opening-cell on the parent form.

2. The method of claim 1, further comprising the steps of:

making the top form of the hierarchy form wherein tagname-chains selected among the tagname-chains provided with no condition tagname are located;

memorizing the tagname-chains which are not located on the top form as the residual tagname-chains;

in response to giving an open operation to a cell on the top form by the user's operation on the display screen, obtaining tagnames as the related tagnames for the cell, each of the related-tagnames being located in a specified position relative to the cell on the form;

selecting tagname_chains as the second selected tagname-chains among the obtained tagname-chains, the condition tagname provided to each of the second selected tagname_chains being in a specified relationship with the related-tagnames;

and making an open form, wherein the tagname_chains obtained by adding the second selected tagname-chains to the residual tagname-chains are located.

3. The method of claim 1, further comprising the steps of, making related data which relates each tagname (a first tagname) of the related-tagnames to tagname-chain-ID data representing the tagname-chain containing the first tagname therein;

relating second tagname-chain-ID data to a second tagname specified as the condition tagname so as to obtain the condition data, the second tagname-chain-ID data representing the second tagname-chain containing the second tagname;

selecting tagname-chains located on the open form, the condition data provided to each of which is in a specified relationship with the related data identified for the opening cell;

making attribute manage data which relates tagname-chain-ID data to each constituent pathname of the fullpathname of information, the tagname-chain represented by the tagname-chain-ID data being identified as a tagname-chain having the parent-folder-fullpathnames which contains therein the fullpathname of the parent-pathname of the constituent pathname, each of the parent-folder-fullpathnames being a fullpathname of a parent folder, names of child folders of which are merged into the tagname-chain; and displaying the open form on the display screen, related to a cell of which the icon of the information is displayed, the related-data obtained for both the cell and the opening cell being the same as the set of attribute manage data of the information.

4. An information managing apparatus, for viewing information stored in a specified folder-tree on a hierarchy form composed by a plurality of forms in such a way that an open-operation for a cell as an opening-cell on a form of the hierarchy form as a parent form opens another form of the hierarchy form as an open form, said information managing apparatus comprising:

a memory configured to store a program; and
a processor configured to execute the program and control the information managing apparatus to:

in response to specifying a folder-tree by a user's operation on a display screen of the information managing apparatus, obtain a child-folder-name-chain for each folder belonging to the folder-tree, the child-folder-name-chain being a sequence of the names of the child folders directly contained in the folder, each child-folder-name-chain being provided with a fullpathname of a parent folder of the child folders;

obtain tagname-chains, each of which is as a sequence of tagnames obtained by merging a plurality of child-folder-name-chains or is obtained as a single child-folder-name-chain which does not merge with one or more other child-folder-name-chains, each tagname-chain being provided with the fullpathnames of the parent folders of the corresponding child-folder-name-chains;

provide a first tagname-chain of the tagname-chains as a condition tagname with a tagname belonging to another second tagname-chain, the condition tagname being identified based on the fullpathnames of the parent folders;

make forms composing a hierarchy form by locating the tagname-chains outside of the cells on the forms in such a way that the first tagname-chain provided as the condition tagname with the tagname belonging to the second tagname-chain is located only on open forms each of which is to be opened by specifying a corresponding opening-cell on the parent form by the user's operation on the display screen, the cell being located in a specified position relative to the tagname specified as the condition tagname; and display an icon of information stored in the folder-tree related to a cell of the open form on the display screen, the full-pathname of which is in a specified relationship with a set of related tagnames, each of the related tagnames being located in a specified position relative to the cell and the opening-cell on the parent form.

5. The apparatus of claim 4, further comprising wherein the processor is further configured to execute the program and control the information managing apparatus to:

make the top form of the hierarchy form wherein tagname-chains selected among the tagname-chains provided with no condition tagname are located;

memorize the tagname-chains which are not located on the top form as the residual tagname-chains;

in response to giving an open operation to a cell on the top form by the user's operation on the display screen, obtain tagnames as the related tagnames for the cell, each of the related-tagnames being located in a specified position relative to the cell on the form;

select tagname_chains as the second selected tagname-chains among the obtained tagname-chains, the condition tagname provided to each of the second selected tagname_chains being in a specified relationship with the related-tagnames; and make an open form, wherein the tagnamechains obtained by adding the second selected tagname-chains to the residual tagname-chains are located.

6. The apparatus of claim 4, wherein the processor is further configured to execute the program and control the information managing apparatus to:

make related data which relates each tagname (a first tagname) of the related-tagnames to tagname-chain-ID data representing the tagname-chain containing the first tagname therein;

relate second tagname-chain-ID data to a second tagname specified as the condition tagname so as to obtain the condition data, the second tagname-chain-ID data representing the second tagname-chain containing the second tagname;

select tagname-chains located on the open form, the condition data provided to each of which is in a specified relationship with the related data identified for the opening cell;

make attribute manage data which relates tagname-chain-ID data to each constituent pathname of the fullpathname of information, the tagname-chain represented by the tagname-chain-ID data being identified as a tagname-chain having the parent-folder-fullpathnames which contains therein the fullpathname of the parent-pathname of the constituent pathname, each of the parent-folder-fullpathnames being a fullpathname of a parent folder, names of child folders of which are merged into the tagname-chain; and display the open form on the display screen, related to a cell of which the icon of the information is displayed, the related-data obtained for both the cell and the opening cell being the same as the set of attribute manage data of the information.

7. A non-transitory computer-readable medium storing a computer control program making a computer actualize a method in an information managing apparatus, for viewing information stored in a specified folder-tree on a hierarchy form composed by a plurality of forms in such a way that an open-operation for a cell as an opening-cell on a form of the hierarchy form as a parent form opens another form of the hierarchy form as an open form, said method comprising the steps of:

in response to specifying a folder-tree by a user's operation on a display screen of the information managing apparatus, obtaining a child-folder-name-chain for each folder belonging to the folder-tree, the child-folder-name-chain being a sequence of the names of the child folders directly contained in the folder, each child-folder-name-chain being provided with a fullpathname of a parent folder of the child folders;

obtaining tagname-chains, each of which is as a sequence of tagnames obtained by merging a plurality of child-folder-name-chains or is obtained as a single child-folder-name-chain which does not merge with one or more other child-folder-name-chains, each tagname-chain being provided with the fullpathnames of the parent folders of the corresponding child-folder-name-chains;

providing a first tagname-chain of the tagname-chains as a condition tagname with a tagname belonging to another second tagname-chain, the condition tagname being identified based on the fullpathnames of the parent folders;

making forms composing a hierarchy form by locating the tagname-chains outside of the cells on the forms in such a way that the first tagname-chain provided as the condition tagname with the tagname belonging to the second tagname-chain is located only on open forms each of which is to be opened by specifying a corresponding opening-cell on the parent form by the user's operation on the display screen, the cell being located in a specified position relative to the tagname specified as the condition tagname; and displaying an icon of information stored in the folder-tree related to a cell of the open form on the display screen, the full-pathname of which is in a specified relationship with a set of related tagnames, each of the related tagnames being located in a specified position relative to the cell and the opening-cell on the parent form.

8. The non-transitory computer-readable medium of claim 7, wherein the method further comprises the steps of:

making the top form of the hierarchy form wherein tagname-chains selected among the tagname-chains provided with no condition tagname are located;

memorizing the tagname-chains which are not located on the top form as the residual tagname-chains;

in response to giving an open operation to a cell on the top form by the user's operation on the display screen, obtaining tagnames as the related tagnames for the cell, each of the related-tagnames being located in a specified position relative to the cell on the form;

selecting tagname_chains as the second selected tagname-chains among the obtained tagname-chains, the condition tagname provided to each of the second selected tagnamechains being in a specified relationship with the related-tagnames; and making an open form, wherein the tagname_chains obtained by adding the second selected tagname-chains to the residual tagname-chains are located.

9. The non-transitory computer-readable medium of claim 7, wherein the method further comprises the steps of:

making related data which relates each tagname (a first tagname) of the related-tagnames to tagname-chain-ID data representing the tagname-chain containing the first tagname therein;

relating second tagname-chain-ID data to a second tagname specified as the condition tagname so as to obtain the condition data, the second tagname-chain-ID data representing the second tagname-chain containing the second tagname;

selecting tagname-chains located on the open form, the condition data provided to each of which is in a specified relationship with the related data identified for the opening cell;

making attribute manage data which relates tagname-chain-ID data to each constituent pathname of the fullpathname of information, the tagname-chain represented by the tagname-chain-ID data being identified as a tagname-chain having the parent-folder-fullpathnames which contains therein the fullpathname of the parent-pathname of the constituent pathname, each of the parent-folder-fullpathnames being a fullpathname of a parent folder, names of child folders of which are merged into the tagname-chain; and displaying the open form on the display screen, related to a cell of which the icon of the information is displayed, the related-data obtained for both the cell and the opening cell being the same as the set of attribute manage data of the information.

\* \* \* \* \*